US006518574B1

(12) United States Patent
Castleman

(10) Patent No.: US 6,518,574 B1
(45) **Date of Patent: *Feb. 11, 2003**

(54) FIRE DETECTOR WITH MULTIPLE SENSORS

(75) Inventor: David A. Castleman, Fresno, CA (US)

(73) Assignee: Fire Sentry Corporation, Brea, CA (US)

(*) Notice: Subject to any disclaimer, the term of this patent is extended or adjusted under 35 U.S.C. 154(b) by 40 days.

This patent is subject to a terminal disclaimer.

(21) Appl. No.: 09/649,148

(22) Filed: Aug. 25, 2000

Related U.S. Application Data

(63) Continuation-in-part of application No. 08/866,023, filed on May 30, 1997, now Pat. No. 6,153,881, which is a continuation-in-part of application No. 08/690,067, filed on Jul. 31, 1996, now Pat. No. 6,046,452, which is a continuation-in-part of application No. 08/609,740, filed on Mar. 1, 1996, now Pat. No. 5,773,826.

(60) Provisional application No. 60/151,189, filed on Aug. 27, 1999.

(30) Foreign Application Priority Data

Feb. 28, 1997 (WO) ............................ PCT/US97/033327

(51) Int. Cl.$^{7}$ .................................................. G01J 5/02

(52) U.S. Cl. ........................... 250/339.15; 250/339.05; 250/339.14

(58) Field of Search ....................... 250/339.15, 339.05, 250/339.14, 342; 340/578

(56) References Cited

U.S. PATENT DOCUMENTS

| | | | |
|---|---|---|---|
| 4,101,767 A | 7/1978 | Lennington et al. | 250/339 |
| 4,220,857 A | 9/1980 | Bright | 250/339 |
| 4,223,678 A | 9/1980 | Langer et al. | 128/419 |
| 4,455,487 A | 6/1984 | Wendt | 250/339 |
| 4,533,834 A | 8/1985 | McCormack | 250/554 |
| 4,603,255 A | 7/1986 | Henry et al. | 250/339 |
| 4,665,390 A | 5/1987 | Kern et al. | 340/587 |

(List continued on next page.)

FOREIGN PATENT DOCUMENTS

| | | |
|---|---|---|
| EP | 0 159 798 A1 | 7/1978 |
| EP | 0 175 032 A1 | 3/1986 |
| EP | 0 618 555 A2 | 10/1994 |
| GB | 2 012 092 A | 7/1979 |
| GB | 2 188 416 A | 9/1987 |
| WO | WO 98/05014 | 2/1998 |

OTHER PUBLICATIONS

Bjorklund, F.B. et al., "Fire Loss Reduction—Part I We've Only Scratched the Surface," "Fire Loss Reduction, Part II—Technology Holds the Key!," reprint from AID magazine (a publication of the National Alarm Association of America), Mar. 1986.

(List continued on next page.)

*Primary Examiner*—Georgia Epps
*Assistant Examiner*—Richard Hanig
(74) *Attorney, Agent, or Firm*—Irell & Manella LLP

(57) ABSTRACT

A process and system for flame detection includes a microprocessor-controlled detector with an array of sensors for sensing radiant energy from a fire or other heat source. A wide band infrared sensor is used as the primary detector, with near band and visible band sensors serving to detect false-alarm energy from nonfire sources. A narrow band sensor, such as a 4.3-micron sensor, is also employed in the sensor array, and assists in the detection of hydrocarbon fires. Digital signal processing is used to analyze sensed data and discriminate against false alarms. A multistage alarm system can be provided, which is selectively triggered by the microprocessor. Spectral recording and analysis of prefire data is provided for. The detector can be housed in an enclosed, sealed, removable, plastic housing that may include an integral plastic window lens.

20 Claims, 34 Drawing Sheets

U.S. PATENT DOCUMENTS

| | | | | | |
|---|---|---|---|---|---|
| 4,691,196 | A | * | 9/1987 | Kern et al. | 250/339.15 |
| 4,701,624 | A | | 10/1987 | Kern et al. | 250/554 |
| 4,742,236 | A | | 5/1988 | Kawakami et al. | 250/554 |
| 4,750,197 | A | | 6/1988 | Denekamp et al. | 379/58 |
| 4,769,775 | A | | 9/1988 | Kern et al. | 364/551.01 |
| 4,983,853 | A | | 1/1991 | Davall et al. | 250/554 |
| 5,107,128 | A | | 4/1992 | Davall et al. | 250/554 |
| 5,153,722 | A | | 10/1992 | Goedeke et al. | 358/108 |
| 5,155,468 | A | | 10/1992 | Stanley et al. | 340/501 |
| 5,311,167 | A | | 5/1994 | Plimpton et al. | 340/578 |
| 5,548,276 | A | | 8/1996 | Thomas | 340/578 |
| 5,594,421 | A | | 1/1997 | Thuillard | 340/578 |
| 5,598,099 | A | | 1/1997 | Castleman et al. | 324/456 |
| 5,773,826 | A | | 6/1998 | Castleman et al. | 250/339.15 |
| 5,959,299 | A | * | 9/1999 | Castro et al. | 250/339.15 |
| 5,995,008 | A | | 11/1999 | King et al. | 340/578 |
| 6,064,064 | A | * | 5/2000 | Castleman | 250/339.15 |
| 6,184,792 | B1 | | 2/2001 | Privalov et al. | 340/578 |

OTHER PUBLICATIONS

"Optical Fire Sensors State–of–the–Art," technical brochure of Fire Sentry Corporation, 1989–90.

* cited by examiner

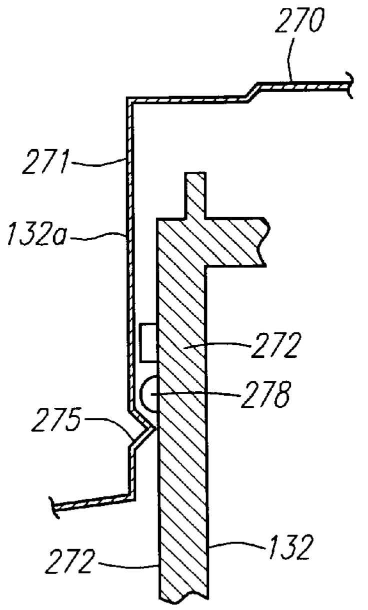
FIG. 4c
FIG. 4b
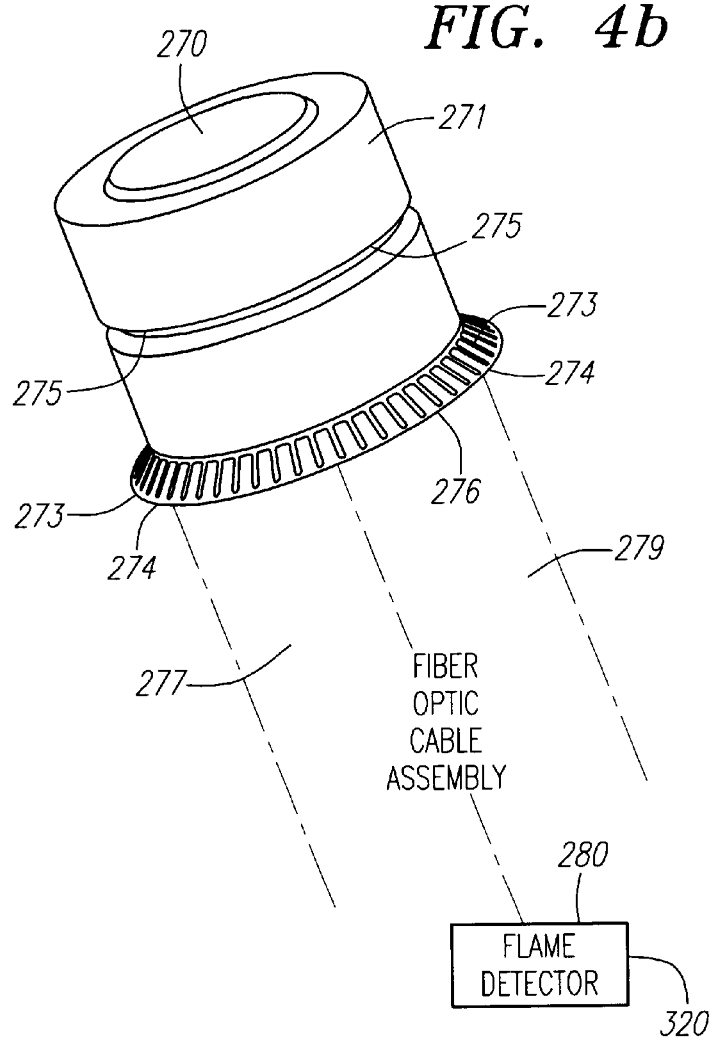
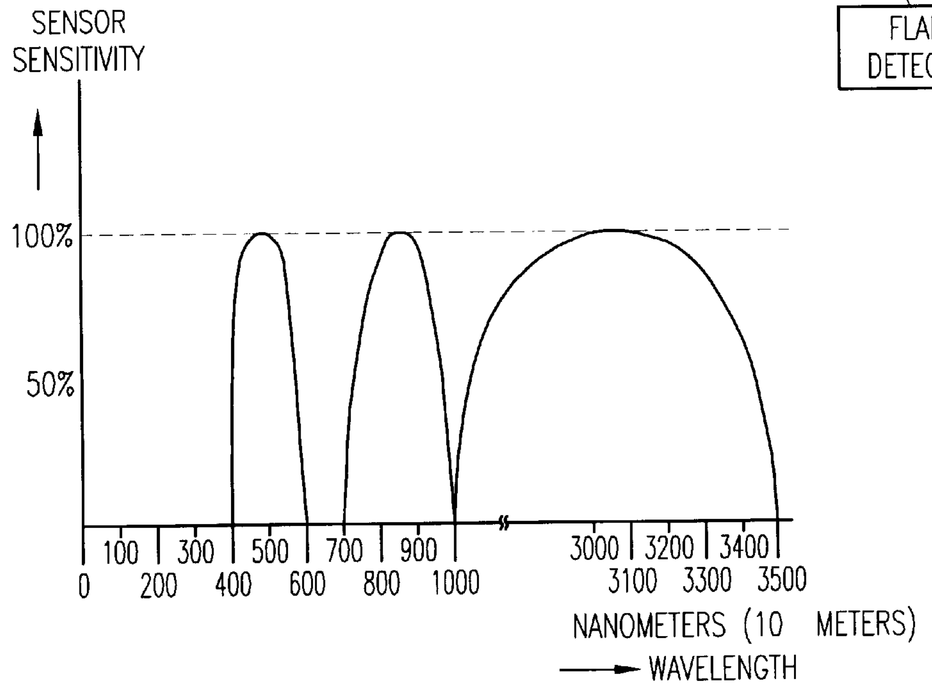
FIG. 5

FIG. 13A-1

| FIG. 13A-1 |
|---|
| FIG. 13A-2 |

| TEMPERATURE OF FIRE/FLAME IN DEGREES K (KELVIN) | TEMPERATURE OF FIRE/FLAME IN DEGREES K (CELSIUS) | TOTAL RADIANT ENERGY (WATTS/CM$^2$) | VB + NBIR + WBIR RADIANT ENERGY FROM 0.4 TO 3.5 MICRONS (W/CM$^2$) | NARROW BAND IR RADIANT ENERGY 4.3 MICRONS (WATTS/CM$^2$) | VB + NBIR + WBIR PERCENTAGE OF 0.4 TO 3.5 MICRON ENERGY | NARROW BAND IR PERCENTAGE 4.3 MICRON ENERGY | VB + NBIR + WBIR VS. NARROW BAND IR TIMES MORE ENERGY |
|---|---|---|---|---|---|---|---|
| 1020 | 746.85 | 6.136 | 2.439 | 0.199 | 39.75 | 3.24 | 12.26 |
| 1040 | 766.85 | 6.632 | 2.731 | 0.213 | 41.18 | 3.20 | 12.85 |
| 1060 | 786.85 | 7.157 | 3.047 | 0.226 | 42.58 | 3.16 | 13.46 |
| 1080 | 806.85 | 7.713 | 3.390 | 0.241 | 43.95 | 3.12 | 14.09 |
| 1100 | 826.85 | 8.300 | 3.760 | 0.255 | 45.30 | 3.08 | 14.73 |
| 1120 | 846.85 | 8.920 | 4.158 | 0.270 | 46.62 | 3.03 | 15.39 |
| 1140 | 866.85 | 9.575 | 4.587 | 0.286 | 47.91 | 2.98 | 16.06 |
| 1160 | 886.85 | 10.26 | 5.047 | 0.301 | 49.17 | 2.94 | 16.75 |
| 1180 | 906.85 | 10.99 | 5.539 | 0.317 | 50.40 | 2.89 | 17.45 |
| 1200 | 926.85 | 11.76 | 6.066 | 0.334 | 51.60 | 2.84 | 18.17 |
| 1220 | 946.85 | 12.56 | 6.628 | 0.351 | 52.78 | 2.79 | 18.91 |
| 1240 | 966.85 | 13.40 | 7.227 | 0.368 | 53.92 | 2.74 | 19.66 |
| 1260 | 986.85 | 14.29 | 7.864 | 0.385 | 55.04 | 2.69 | 20.44 |
| 1280 | 1006.85 | 15.22 | 8.541 | 0.402 | 56.13 | 2.64 | 21.23 |
| 1300 | 1026.85 | 16.19 | 9.26 | 0.420 | 57.19 | 2.60 | 22.03 |
| 1320 | 1046.85 | 17.21 | 10.02 | 0.439 | 58.22 | 2.55 | 22.86 |
| 1340 | 1066.85 | 18.28 | 10.83 | 0.457 | 59.23 | 2.50 | 23.69 |
| 1360 | 1086.85 | 19.39 | 11.68 | 0.476 | 60.21 | 2.45 | 24.56 |
| 1380 | 1106.85 | 20.56 | 12.58 | 0.495 | 61.16 | 2.41 | 25.43 |
| 1400 | 1126.85 | 21.78 | 13.52 | 0.514 | 62.09 | 2.36 | 26.32 |
| 1420 | 1146.85 | 23.05 | 14.52 | 0.533 | 62.99 | 2.31 | 27.23 |
| 1440 | 1166.85 | 24.38 | 15.57 | 0.553 | 63.87 | 2.27 | 28.16 |
| 1460 | 1186.85 | 25.76 | 16.67 | 0.573 | 64.73 | 2.22 | 29.12 |
| 1480 | 1206.85 | 27.20 | 17.83 | 0.593 | 65.56 | 2.18 | 30.07 |
| 1500 | 1226.85 | 28.70 | 19.05 | 0.613 | 66.37 | 2.14 | 31.06 |
| 1520 | 1246.85 | 30.26 | 20.32 | 0.634 | 67.16 | 2.09 | 32.07 |
| 1540 | 1266.85 | 31.89 | 21.66 | 0.655 | 67.93 | 2.05 | 33.09 |
| 1560 | 1286.85 | 33.58 | 23.06 | 0.676 | 68.67 | 2.01 | 34.13 |
| 1580 | 1306.85 | 35.33 | 24.52 | 0.697 | 69.40 | 1.97 | 35.19 |
| 1600 | 1326.85 | 37.15 | 26.05 | 0.718 | 70.10 | 1.93 | 36.28 |
| 1620 | 1346.85 | 39.05 | 27.64 | 0.739 | 70.79 | 1.89 | 37.38 |
| 1640 | 1366.85 | 41.01 | 29.31 | 0.761 | 71.46 | 1.86 | 38.50 |

| | | | | | | | |
|---|---|---|---|---|---|---|---|
| 1660 | 1386.85 | 43.05 | 31.04 | 0.783 | 72.10 | 1.82 | 39.64 |
| 1680 | 1406.85 | 45.16 | 32.85 | 0.805 | 72.74 | 1.78 | 40.80 |
| 1700 | 1426.85 | 47.35 | 34.73 | 0.827 | 73.35 | 1.75 | 41.99 |
| 1720 | 1446.85 | 49.62 | 36.69 | 0.850 | 73.95 | 1.71 | 43.20 |
| 1740 | 1466.85 | 51.97 | 38.73 | 0.872 | 74.53 | 1.68 | 44.42 |
| 1760 | 1486.85 | 54.40 | 40.85 | 0.895 | 75.09 | 1.65 | 45.65 |
| 1780 | 1506.85 | 56.91 | 43.05 | 0.918 | 75.64 | 1.61 | 46.92 |
| 1800 | 1526.85 | 59.52 | 45.34 | 0.941 | 76.18 | 1.58 | 48.22 |
| 1820 | 1546.85 | 62.21 | 47.71 | 0.964 | 76.70 | 1.55 | 49.52 |
| 1840 | 1566.85 | 64.99 | 50.17 | 0.987 | 77.21 | 1.52 | 50.83 |
| 1860 | 1586.85 | 67.86 | 52.73 | 1.010 | 77.70 | 1.49 | 52.18 |
| 1880 | 1606.85 | 70.82 | 55.37 | 1.034 | 78.18 | 1.46 | 53.55 |
| 1900 | 1626.85 | 73.89 | 58.11 | 1.057 | 78.65 | 1.43 | 54.96 |
| 1920 | 1646.85 | 77.05 | 60.95 | 1.081 | 79.10 | 1.40 | 56.38 |
| 1940 | 1666.85 | 80.31 | 63.88 | 1.105 | 79.55 | 1.38 | 57.81 |
| 1960 | 1686.85 | 83.67 | 66.92 | 1.129 | 79.98 | 1.35 | 59.29 |
| 1980 | 1706.85 | 87.14 | 70.06 | 1.153 | 80.40 | 1.32 | 60.77 |
| 2000 | 1726.85 | 90.71 | 73.30 | 1.177 | 80.81 | 1.30 | 62.26 |
| 2020 | 1746.85 | 94.40 | 76.65 | 1.201 | 81.20 | 1.27 | 63.79 |
| 2040 | 1766.85 | 98.19 | 80.11 | 1.226 | 81.59 | 1.25 | 65.32 |
| 2060 | 1786.85 | 102.1 | 83.69 | 1.250 | 81.97 | 1.23 | 66.91 |
| 2080 | 1806.85 | 106.1 | 87.38 | 1.275 | 82.34 | 1.20 | 68.50 |
| 2100 | 1826.85 | 110.3 | 91.18 | 1.300 | 82.69 | 1.18 | 70.14 |
| 2120 | 1846.85 | 114.5 | 95.10 | 1.325 | 83.04 | 1.16 | 71.77 |
| 2140 | 1866.85 | 118.9 | 99.15 | 1.349 | 83.38 | 1.14 | 73.46 |
| 2160 | 1886.85 | 123.4 | 103.3 | 1.374 | 83.72 | 1.11 | 75.15 |
| 2180 | 1906.85 | 128.0 | 107.6 | 1.400 | 84.04 | 1.09 | 76.89 |
| 2200 | 1926.85 | 132.8 | 112.0 | 1.425 | 84.35 | 1.07 | 78.61 |
| 2220 | 1946.85 | 137.7 | 116.6 | 1.450 | 84.66 | 1.05 | 80.40 |
| 2240 | 1966.85 | 142.7 | 121.3 | 1.475 | 84.96 | 1.03 | 82.17 |
| 2260 | 1986.85 | 147.9 | 126.1 | 1.501 | 85.25 | 1.02 | 83.99 |
| 2280 | 2006.85 | 153.2 | 131.0 | 1.526 | 85.53 | 1.00 | 85.86 |

FIG. 13A-2

| FIG. 13B-1 |
|---|
| FIG. 13B-2 |

FIG. 13B-1

| TEMPERATURE OF FIRE/FLAME IN DEGREES K (KELVIN) | TEMPERATURE OF FIRE/FLAME IN DEGREES C (CELSIUS) | TOTAL RADIANT ENERGY (WATTS/CM$^2$) | VB + NBIR + WBIR RADIANT ENERGY FROM 0.4 TO 3.5 MICRONS (W/CM$^2$) | NARROW BAND IR RADIANT ENERGY 4.3 MICRONS (WATTS/CM$^2$) | VB + NBIR + WBIR PERCENTAGE OF 0.4 TO 3.5 MICRON ENERGY | NARROW BAND IR PERCENTAGE 4.3 MICRON ENERGY | VB + NBIR + WBIR VS. NARROW BAND IR TIMES MORE ENERGY |
|---|---|---|---|---|---|---|---|
| 2300 | 2026.85 | 158.7 | 136.1 | 1.552 | 85.81 | 0.98 | 87.73 |
| 2320 | 2046.85 | 164.2 | 141.4 | 1.578 | 86.08 | 0.96 | 89.62 |
| 2340 | 2066.85 | 170.0 | 146.8 | 1.603 | 86.35 | 0.94 | 91.55 |
| 2360 | 2086.85 | 175.9 | 152.3 | 1.629 | 86.60 | 0.93 | 93.49 |
| 2380 | 2106.85 | 181.9 | 158.0 | 1.655 | 86.85 | 0.91 | 95.46 |
| 2400 | 2126.85 | 188.1 | 163.8 | 1.681 | 87.10 | 0.89 | 97.47 |
| 2420 | 2146.85 | 194.5 | 169.8 | 1.707 | 87.33 | 0.88 | 99.49 |
| 2440 | 2166.85 | 201.0 | 176.0 | 1.733 | 87.57 | 0.86 | 101.54 |
| 2460 | 2186.85 | 207.6 | 182.3 | 1.759 | 87.79 | 0.85 | 103.61 |
| 2480 | 2206.85 | 214.5 | 188.8 | 1.785 | 88.01 | 0.83 | 105.72 |
| 2500 | 2226.85 | 221.5 | 195.4 | 1.812 | 88.23 | 0.82 | 107.86 |
| 2520 | 2246.85 | 228.6 | 202.2 | 1.838 | 88.44 | 0.80 | 110.01 |
| 2540 | 2266.85 | 236.0 | 209.2 | 1.864 | 88.64 | 0.79 | 112.20 |
| 2560 | 2286.85 | 243.5 | 216.3 | 1.891 | 88.84 | 0.78 | 114.41 |
| 2580 | 2306.85 | 251.2 | 223.7 | 1.917 | 89.04 | 0.76 | 116.65 |
| 2600 | 2326.85 | 259.1 | 231.2 | 1.944 | 89.23 | 0.75 | 118.93 |
| 2620 | 2346.85 | 267.1 | 238.9 | 1.971 | 89.41 | 0.74 | 121.22 |
| 2640 | 2366.85 | 275.4 | 246.7 | 1.997 | 89.59 | 0.73 | 123.54 |
| 2660 | 2386.85 | 283.8 | 254.8 | 2.024 | 89.77 | 0.71 | 125.90 |
| 2680 | 2406.85 | 292.5 | 263.1 | 2.051 | 89.94 | 0.70 | 128.27 |
| 2700 | 2426.85 | 301.3 | 271.5 | 2.078 | 90.11 | 0.69 | 130.69 |
| 2720 | 2446.85 | 310.3 | 280.1 | 2.104 | 90.27 | 0.68 | 133.12 |
| 2740 | 2466.85 | 319.6 | 289.0 | 2.131 | 90.43 | 0.67 | 135.58 |
| 2760 | 2486.85 | 329.0 | 298.0 | 2.158 | 90.58 | 0.66 | 138.08 |
| 2780 | 2506.85 | 338.6 | 307.3 | 2.185 | 90.74 | 0.65 | 140.62 |
| 2800 | 2526.85 | 348.5 | 316.7 | 2.212 | 90.88 | 0.63 | 143.14 |
| 2820 | 2546.85 | 358.5 | 326.4 | 2.240 | 91.03 | 0.62 | 145.74 |
| 2840 | 2566.85 | 368.8 | 336.2 | 2.267 | 91.17 | 0.61 | 148.34 |
| 2860 | 2586.85 | 379.3 | 346.3 | 2.294 | 91.30 | 0.60 | 150.98 |
| 2880 | 2606.85 | 390.0 | 356.6 | 2.321 | 91.43 | 0.60 | 153.64 |
| 2900 | 2626.85 | 401.0 | 367.2 | 2.348 | 91.56 | 0.59 | 156.35 |
| 2920 | 2646.85 | 412.2 | 377.9 | 2.376 | 91.69 | 0.58 | 159.07 |

| | | | | | | | |
|---|---|---|---|---|---|---|---|
| 2940 | 2666.85 | 423.6 | 388.9 | 2.403 | 91.81 | 0.57 | 161.84 |
| 2960 | 2686.85 | 435.2 | 400.1 | 2.431 | 91.93 | 0.56 | 164.63 |
| 2980 | 2706.85 | 447.1 | 411.5 | 2.458 | 92.04 | 0.55 | 167.44 |
| 3000 | 2726.85 | 459.2 | 423.2 | 2.485 | 92.15 | 0.54 | 170.27 |
| 3020 | 2746.85 | 471.6 | 435.1 | 2.513 | 92.26 | 0.53 | 173.13 |
| 3040 | 2766.85 | 484.2 | 447.3 | 2.541 | 92.37 | 0.52 | 176.04 |
| 3060 | 2786.85 | 497.1 | 459.7 | 2.568 | 92.47 | 0.52 | 179.00 |
| 3080 | 2806.85 | 510.2 | 472.3 | 2.596 | 92.57 | 0.51 | 181.94 |
| 3100 | 2826.85 | 523.6 | 485.2 | 2.623 | 92.66 | 0.50 | 184.95 |
| 3120 | 2846.85 | 537.2 | 498.3 | 2.651 | 92.76 | 0.49 | 187.96 |
| 3140 | 2866.85 | 551.1 | 511.7 | 2.679 | 92.85 | 0.49 | 191.01 |
| 3160 | 2886.85 | 565.3 | 525.4 | 2.707 | 92.93 | 0.48 | 194.09 |
| 3180 | 2906.85 | 579.8 | 539.3 | 2.734 | 93.02 | 0.47 | 197.24 |
| 3200 | 2926.85 | 594.5 | 553.5 | 2.762 | 93.10 | 0.46 | 200.39 |
| 3220 | 2946.85 | 609.5 | 567.9 | 2.790 | 93.18 | 0.46 | 203.54 |
| 3240 | 2966.85 | 624.8 | 582.6 | 2.818 | 93.26 | 0.45 | 206.78 |
| 3260 | 2986.85 | 640.4 | 597.6 | 2.846 | 93.33 | 0.44 | 210.01 |
| 3280 | 3006.85 | 656.2 | 612.9 | 2.874 | 93.40 | 0.44 | 213.29 |
| 3300 | 3026.85 | 672.4 | 628.4 | 2.902 | 93.47 | 0.43 | 216.57 |
| 3320 | 3046.85 | 688.8 | 644.3 | 2.930 | 93.53 | 0.43 | 219.92 |
| 3340 | 3066.85 | 705.6 | 660.4 | 2.958 | 93.59 | 0.42 | 223.26 |
| 3360 | 3086.85 | 722.6 | 676.8 | 2.986 | 93.65 | 0.41 | 226.65 |
| 3380 | 3106.85 | 740.0 | 693.4 | 3.014 | 93.71 | 0.41 | 230.08 |
| 3400 | 3126.85 | 757.6 | 710.4 | 3.042 | 93.77 | 0.40 | 233.55 |
| 3420 | 3146.85 | 775.6 | 727.7 | 3.070 | 93.82 | 0.40 | 237.04 |
| 3440 | 3166.85 | 793.9 | 745.3 | 3.099 | 93.87 | 0.39 | 240.51 |
| 3460 | 3186.85 | 812.6 | 763.1 | 3.127 | 93.92 | 0.38 | 244.07 |
| 3480 | 3206.85 | 831.5 | 781.3 | 3.155 | 93.96 | 0.38 | 247.65 |
| 3500 | 3226.85 | 850.8 | 799.8 | 3.183 | 94.00 | 0.37 | 251.27 |
| 3520 | 3246.85 | 870.4 | 818.6 | 3.211 | 94.04 | 0.37 | 254.85 |
| 3540 | 3266.85 | 890.4 | 837.7 | 3.240 | 94.08 | 0.36 | 258.53 |
| 3560 | 3286.85 | 910.6 | 857.1 | 3.268 | 94.12 | 0.36 | 262.25 |

*FIG. 13B-2*

ALERT TYPE EVENT

FIRE PIC NUMBER: 4 FIRE EVENT DATE 5 / 30 / 96
TIME 0 : 51 : 27 AM

DETECTOR
SERIAL NUMBER A A C S 10635 VIN 8.8 VOLTS TEMPERATURE 68 F 20 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 19*

FIRE EARLY WARNING EVENT

FIRE PIC NUMBER: 2 FIRE EVENT DATE 5 / 30 / 96
TIME 0 : 46 : 13 AM

DETECTOR
SERIAL NUMBER A A C S 10635 VIN 8.8 VOLTS TEMPERATURE 66 F 19 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 20*

FIRE ALARM EVENT

FIRE PIC NUMBER: 3 FIRE EVENT DATE 5 / 30 / 96
TIME 0 : 46 : 11 AM

DETECTOR
SERIAL NUMBER A A C S 10635 VIN 8.8 VOLTS TEMPERATURE 66 F 19 C

CONTROLLER DIP SWITCH SETTINGS AT TIME OF FIRE EVENT:
4 SECONDS ALARM RESPONSE TIME
5 SECONDS LATCHING MODE FOR ALARM.
15 FEET DISTANCE FOR ALARM TO SEE 1 SQUARE FOOT GASOLINE FIRE.
30 FEET DISTANCE FOR ALERT TO SEE 2 CUBIC FOOT FIREBALL.
0.30 SECONDS ALERT RESPONSE TIME TO PAINT SPRAY FIREBALL.
5 SECONDS LATCHING MODE FOR ALERT.
1.0 SECONDS FIRE EARLY WARNING RESPONSE TIME
5 SECONDS LATCHING MODE FOR FEW.

*FIG. 21*

FIRE DETECTOR WITH MULTIPLE SENSORS

CROSS REFERENCE TO RELATED APPLICATIONS

This application is a continuing application of U.S. application Ser. No. 60/151,189, filed on Aug. 27, 1999, and is also a continuation-in-part of U.S. application Ser. No. 08/866,023, filed May 30, 1997 now issued as U.S. Pat. No. 6,153,881, which is a continuation-in-part of U.S. application Ser. No. 08/690,067, filed Jul. 31, 1996 now issued as U.S. Pat. No. 6,046,452, which is a continuation-in-part of U.S. application Ser. No. 08/609,740, filed on Mar. 1, 1996, now issued as U.S. Pat. No. 5,773,826, and is also related to PCT International Application Ser. No. PCT/US97/03327, filed on Feb. 28, 1997, now abandoned. Each of the foregoing applications is hereby incorporated by reference as if set forth fully herein.

FIELD OF THE INVENTION

The field of the present invention pertains to apparatus and methods for detecting sparks, flames, or fire. More particularly, the field of the present invention relates to a process and system for detecting a spark, flame, or fire with increased sensitivity, intelligence for discriminating against false alarms, and selective actuation of multi-stage alarm conditions.

BACKGROUND

To prevent fires, and the resulting loss of life and property, the use of flame detectors or flame detection systems is not only voluntarily adopted in many situations, but is also required by the appropriate authority for implementing the National Fire Protection Association's (NFPA) codes, standards, and regulations. Facilities faced with a constant threat of fire, such as petrochemical facilities and refineries, semiconductor fabrication plants, paint facilities, co-generation plants, aircraft hangers, silane gas storage facilities, gas turbines and power plants, gas compressor stations, munitions plants, airbag manufacturing plants, and so on are examples of environments that typically require constant monitoring and response to fires and potential fire hazard situations.

To convey the significance of the fire detection system and process proposed by this patent application, an exemplary environment, in which electrostatic coating or spraying operations are performed, is explained in some detail. However, it should be understood that the present invention may be practiced in any environment faced with a threat of fire.

Electrostatic coating or spraying is a popular technique for large scale application of paint, as for example, in a production painting line for automobiles and large appliances. Electrostatic coating or spraying involves the movement of very small droplets of electrically charged "liquid" paint or particles of electrically charged "Powder" paint from an electrically charged (40 to 120,000 volts) nozzle to the surface of a part to be coated.

While facilitating efficiency, environmental benefits, and many production advantages, electrostatic coating of parts in a production paint line, presents an environment fraught with fire hazards and safety concerns. For example, sparks are common from improperly grounded workpieces or faulty spray guns. In instances where the coating material is a paint having a volatile solvent, the danger of a fire from sparking, or arcing, is, in fact, quite serious. Fires are also a possibility if electrical arcs occur between charged objects and a grounded conductor in the vicinity of flammable vapors.

Flame detectors have routinely been located at strategic positions in spray booths, to monitor any fires that may occur and to shut down the electrostatics, paint flow to the gun, and conveyors in order to cut off the contributing factors leading to the fire.

Three primary contributing factors to a fire are: (1) fuel, such as atomized paint spray, solvents, and paint residues; (2) heat such as derived from electrostatic corona discharges, sparking, and arcing from ungrounded workpieces, and so on; and (3) oxygen. If the fuel is heated above its ignition temperature (or "flash point") in the presence of oxygen, then a fire will occur.

An electrical spark can cause the temperature of a fuel to exceed its ignition temperature. For example, in a matter of seconds, a liquid spray gun fire can result from an ungrounded workpiece producing sparks, as the spray gun normally operates at very high voltages (in the 40,000 to 120,000 volt range). An electrical spark can cause the paint (fuel) to exceed its ignition temperature. The resulting spray gun fire can quickly produce radiant thermal energy sufficient to raise the temperature of the nearby paint residue on the booth walls or floor, causing the fire to quickly spread throughout the paint booth.

A fire may self-extinguish if one of the three above mentioned factors is eliminated. Thus, if the fuel supply of the fire is cut off, the fire typically stops. If a fire fails to self-extinguish, flame detectors are expected to activate suppression agents to extinguish the fire and thereby prevent major damage.

Flame detectors, which are an integral part of industrial operations such as the one described above, must meet standards set by the NFPA, which standards are becoming increasingly stringent. Thus, increased sensitivity, faster reaction times, and fewer false alarms are not only desirable, but are now a requirement.

Previous flame detectors have had many drawbacks. The drawbacks of these previous devices have led to false alarms which unnecessarily stop production or activate fire suppression systems when no fire is present. These prior flame detectors have also failed to detect fires upon occasion, resulting in damage to the facilities in which they have been deployed and/or financial repercussions due to work stoppage or damaged inventory and equipment caused by improper release of the fire suppressant.

One drawback of the most common types of flame detectors is that they can only sense radiant energy in one or more of either the ultraviolet, visible, near band infrared (IR), or carbon dioxide ($CO_2$) 4.3 micron band spectra. Such flame detectors tend to be unreliable and can fail to distinguish false alarms, including those caused by non-fire radiant energy sources (such as industrial ovens), or controlled fire sources that are not dangerous (such as a lighter). Disrupting an automated process in response to a false alarm can, as noted, have tremendous financial setbacks.

Another drawback of previous fire detectors is their lack of reliability, which can be viewed as largely stemming from their approach to fire detection. The most advanced fire detectors available tend to involve simple microprocessor controls and processing software of roughly the same complexity as those used for controlling microwave ovens. The sensitivity levels of these previous devices are usually calibrated only once, during manufacture. However, the sensitivity levels often change as time passes, causing such conventional flame detectors to fail to detect real fires or to false alarm.

Many of the conventional flame detectors also are limited by their utilization of pyroelectric sensors, which detect only the change in radiant heat emitted from a fire. Such pyroelectric sensors depend upon temperature changes caused by radiant energy fluctuations, and are susceptible to premature aging and degraded sensitivity and stability with the passage of time. In addition, such pyroelectric sensors do not take into account natural temperature variations resulting from environmental temperature changes that occur, typically during the day, as a result of seasonal changes or prevailing climatic conditions.

Other types of conventional flame detectors identify fires by relying primarily on the ability to detect a unique narrow band spectral emissions radiated from hot $CO_2$ (carbon dioxide) fumes produced by the fire. Hot $CO_2$ gas from a fire emits a narrow band of radiant energy at a wavelength of approximately 4.3 microns. However, cold $CO_2$ (a common fire suppression agent) absorbs energy at 4.3 microns, and can therefore absorb a hot $CO_2$ spike emission generated by a fire. In such situations, conventional $CO_2$-based flame detectors can miss detecting a fire.

Another type of conventional IR flame detector monitors radiant energy in two infrared frequency bands, typically the 4.3 micron frequency band and the 3.8 micron frequency band, while others use as many as three infrared frequency bands. The dual IR frequency band flame detector commonly utilizes an analog signal subtraction technique for subtracting a reference sensor reading at approximately 3.8 microns from the sensed reading of $CO_2$ at approximately 4.3 microns. The triple IR frequency band flame detector uses an analogous technique, with an additional reference band at approximately 5 microns. These types of multi-band flame detectors can false alarm when cold $CO_2$ obscures the fire source from the flame detector, thereby misleading the detector into believing that a strong $CO_2$ emission spike from a fire is detected, when, in fact, a negative absorption spike (caused by e.g., a $CO_2$ suppression agent discharge or leak) has been detected.

Conventional flame detectors using ultraviolet ("UV") sensors also exist, but these too have drawbacks. Flame detectors with UV sensors may be sensitive to electrostatic spray gun flashes and corona discharges from waterborne coatings, which can cause false alarms and needlessly shut down production in paint spray booths. Also, because arc welding produces copious amounts of intense ultraviolet energy which can be reflected or transmitted over long distances, UV flame detectors can generate false alarms from such UV energy sources, even when the non-fire UV energy is located at a far distance from the spray booth. Moreover, after deployment, conventional UV detectors eventually can become highly de-sensitized as a result of absorbing smoke from a fire and/or solvent mist, causing the UV detector to become blinded. As a result, UV detectors can provide a false sense of security that they are operating at their optimum performance levels, when, in fact, the facility may be vulnerable to a costly fire.

As an additional disadvantage, UV flame detectors generally require a relatively clean viewing window lens for the UV sensor, and can therefore become blinded or degraded by the presence of paint or oil contaminants on the viewing window lens. Moreover, the sensing techniques utilized with conventional UV detectors usually do not take into account the effects of such types of degradation.

Besides problems with flame detection, many or all conventional flame detectors also have limitations or drawbacks relating to their housing and/or mounting that can affect their performance or longevity, in addition to being relatively expensive to manufacture. For example, most optical flame detectors have been built with metal housing made from costly aluminum, stainless steel, or similar materials. Such housings can be heavy, difficult to mount and may not be suitable for certain corrosive environments such as "wet-benches" used in semiconductor fabrication facilities for manufacturing silicon chips and the like.

Further, most or all optical flame detector housings require a window lens (necessary for high optical transmission in the spectral bands used, and typically made of glass, quartz, sapphire, etc.), but it is usually quite difficult to obtain a tight seal of the window lens to metal housings, particularly in chemical manufacturing, or integrated circuit manufacturing or other applications having extremely rigorous environmental requirements. If the flame detector is not tightly sealed, then corrosive chemicals can leak into the electronic circuitry and degrade or destroy the unit.

In flame detectors that detect UV energy, the protective window lens must be constructed from highly expensive quartz, sapphire, or other similar material that does not block UV energy. Moreover, the quartz or sapphire window lenses are typically placed in a metal detector housing, and are collectors of dust and contaminants due to the electrostatic effect of the high voltage field (around 300 to 400 volts) used in the UV detectors. To ensure that the UV detector's sensor(s) can "see through" the window lens, complex and costly "through the lens" tests are necessary. To conduct built-in "through the lens" window lens tests, a UV source tube is generally required to generate a UV test signal. Such UV source tubes require a high voltage for gas discharge sources and/or a large current for incandescent sources. Also, UV source tubes are subject to high failure rates. In sum, these self tests are expensive, require extra power and space, and are prone to breakdowns.

There is a need for a sensitive, reliable, fully enclosed, inexpensive, light-weight, intelligent, and effective method and system for detecting sparks, flames, or fire with little or no interruptions caused by false alarms.

SUMMARY OF THE INVENTION

The present invention is directed in various aspects to a sensitive, reliable, intelligent, and effective method and system for detecting sparks, flames, or fire with minimal interruptions caused by false alarms.

According to one embodiment of the present invention, a process and system for flame detection includes a sensor array for providing sensor signals, and either internal or external signal processing electronics for processing the sensor signals and generating a response, if necessary. A microprocessor-controlled detector advantageously includes at least a wide band infrared sensor and a narrow band infrared sensor, such as, e.g., a $4.3\mu$ sensor. Preferably, the wide band infrared sensor is used as the primary detector, with the narrow band infrared sensor serving to detect narrow band emission lines, such as, e.g., $4.3\mu$ emission lines from hydrocarbon fires. The detector can further include near band and visible band sensors, which serve to detect false-alarm energy from nonfire sources. The system may comprise a single or a series of detector units with wide spectrum sensing capabilities (quantum sensors) located within a desired facility such as, e.g., inside a paint spray booth.

Further embodiments and variations of the invention are also disclosed herein.

BRIEF DESCRIPTION OF THE DRAWINGS

FIG. 4*b* is a diagrammatic illustration of a fire/flame detector having a fiber optic cable assembly with a protective cover to facilitate use in confined or unaccessible areas.

FIG. 4*c* is a cross-sectional view taken along line 4*d*—4*d* through FIGS. 4 and 4*a*.

FIG. 5 is a graph illustrating the regions of sensitivity of a particular wideband sensor array in accordance with various aspects of the present invention.

FIGS. 13*a* and 13*b* depict a table comparing fire/flame temperature and radiant energy calculations in various spectral regions.

FIG. 19 is a diagram of an event log generated by the system upon detection of a fire signature warranting an “alert” condition.

FIG. 20 is a diagram of an event log generated by the system upon detection of a fire signature warranting a “fire early warning” condition.

FIG. 21 is a diagram of an event log generated by the system upon detection of a fire signature warranting an “alarm” condition.

DETAILED DESCRIPTION OF PREFERRED EMBODIMENTS

A process and system for detecting sparks, flames, or fire in accordance with a preferred embodiment of the present invention is described herein. It should be noted that the terms "fire detector," "flame detector" and "fire/flame detector" are used interchangeably in the present text and refer generally to any process and/or system for detecting sparks, flames, or fires, including explosive type fires or fireballs and other dangerous heat-energy phenomena.

A particular embodiment of a process and system for fire detection is described in conjunction with an exemplary situation of an electrostatic coating operation. However, it should be understood that the process and system may be effectively utilized in any environment facing a threat from sparks, flames, or fire. For example, the process and system may be used in such applications as petrochemical facilities and refineries, semiconductor fabrication plants, co-generation plants, aircraft hangars, gas storage facilities, gas turbines and power plants, gas compressor stations, munitions plants, airbag manufacturing plants, and so on.

Figure 1:
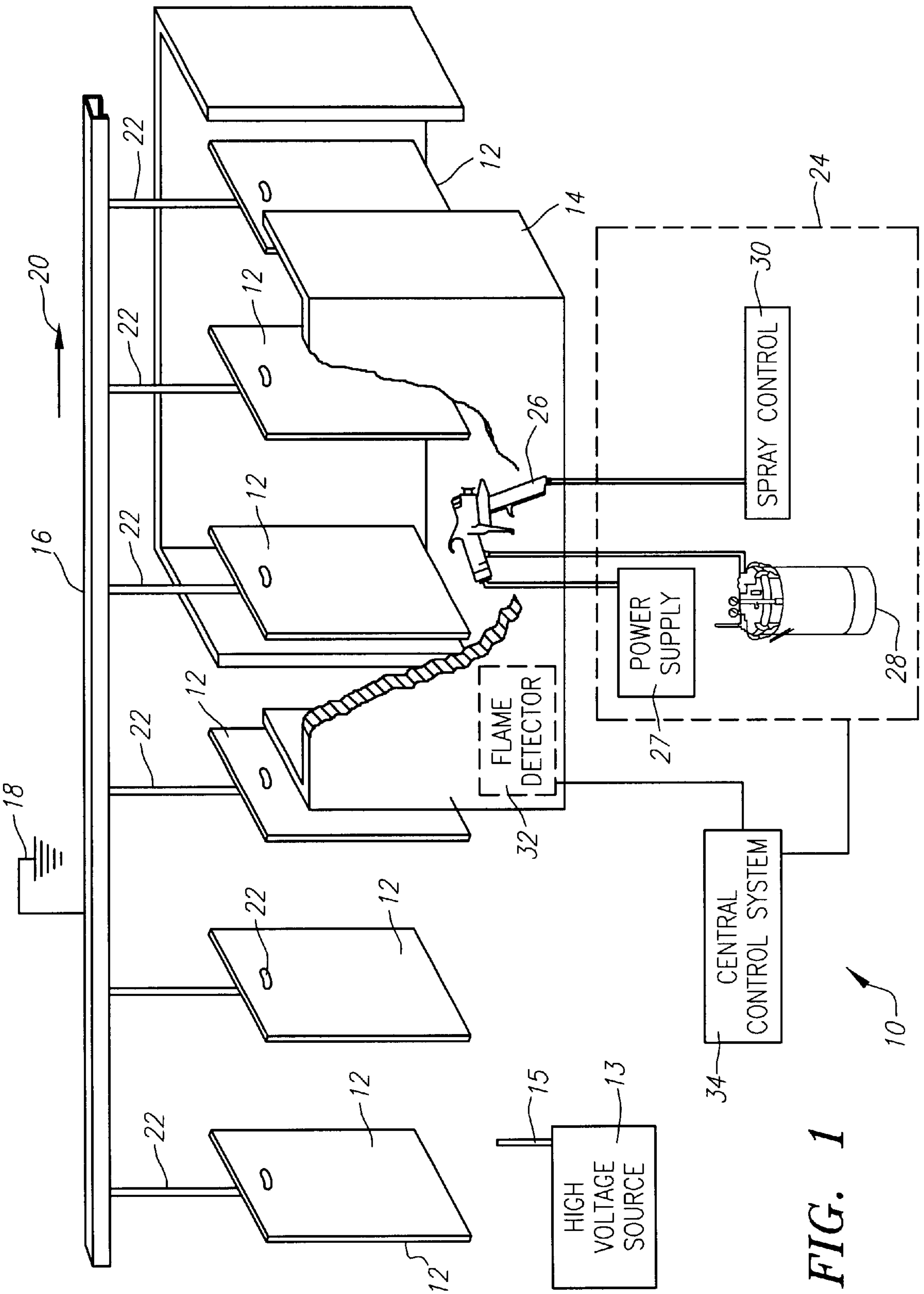
FIG. 1 is a diagrammatic illustration of an electrostatic coating booth, in which a fire detector according to the present invention may be employed.

FIG. 1 illustrates an exemplary environment 10, as for example, a coating zone, such as a spray or paint booth or enclosure, in which electrostatic coating operations are routinely performed. As illustrated in FIG. 1, parts 12 are transported through the spray booth 14 by a conveyor 16 connected to a reference potential or ground 18. The direction in which the conveyor moves is indicated by an arrow 20. The parts 12 are typically supported from the conveyor by a conductive hook-like support or hanger 22. The parts 12 are passed proximate a high voltage source 13 with a high voltage antenna 15. The high voltage source 13 may be one available from Nordson as Model number EPU-9. Electrical charge is transferred from the high voltage source, which may operate between 60,000–120,000 volts, to the parts 12 to be coated.

The electrostatic coating system illustrated in FIG. 1 represents an air electrostatic spray system of a type used in many industrial operations. A typical industrial spray system 24 includes a spray gun 26 coupled to a power supply 27, a paint supply container 28 (for example, a pressure tank), and some form of spray control mechanism 30. The spray control mechanism 30 may include an air compressor and an air regulator (not separately shown).

A single flame detector component 32 is located at a strategic position within the spray booth 14. The detector component 32 can be advantageously manufactured from a substantially explosion-proof material, as discussed in greater detail below. Depending upon the size of the spray booth 14 or other facility, a plurality of such flame detector components 32 may be strategically located throughout the spray booth 14 or other facility.

Figure 4:
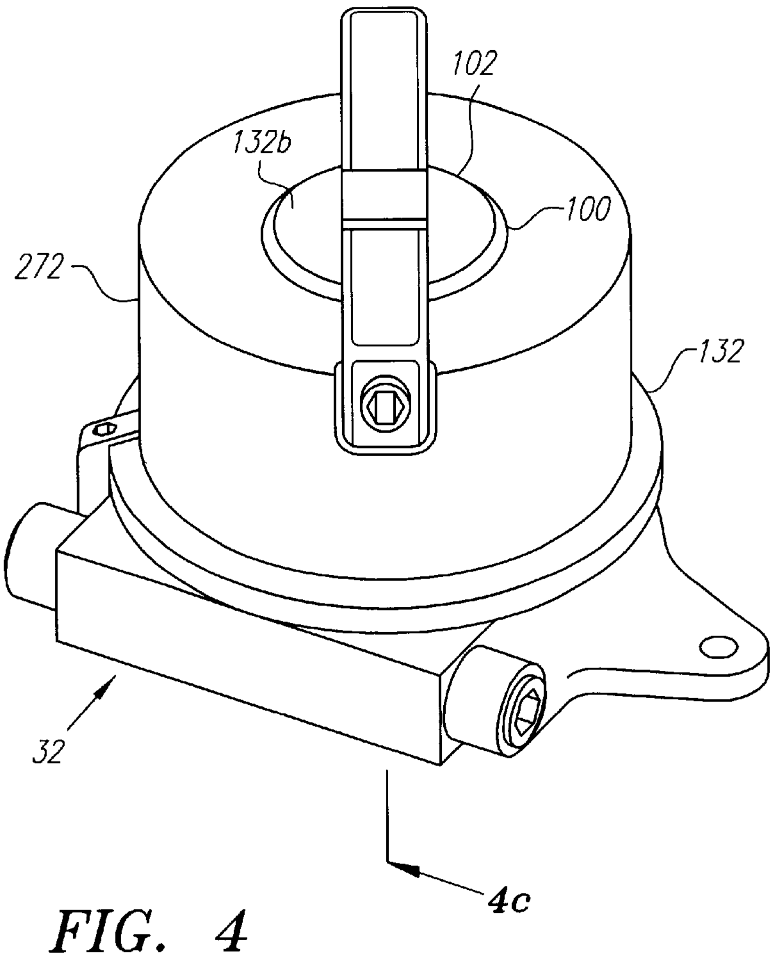
FIG. 4 is a perspective view of one housing embodiment in accordance with certain aspects of the present invention.

Referring also to FIG. 4, the flame detector 32 embodying features in accordance with a preferred embodiment of the present invention is sensitive to radiant energy in the visible (VIS) band, near band infrared (NIR), and wide band infrared (including middle band infrared (MIR)) spectra. The flame detector 32 preferably has a spectrum sensitivity for infrared energy, within a range from roughly 700 to 5000 nanometers (0.7 to 5 microns), and for visible energy, within a range from approximately 400 to 700 nanometers. The flame detector 32 is preferably enclosed within a protective housing 132. The type of housing 132 (i.e., shape, material and/or configuration) may vary depending upon application and such things as environmental factors. Various housings are discussed in more detail hereinafter.

The housing 132 of the flame detector 32 is, in a particular embodiment, constructed with a viewing window **132*b* disposed over the sensors of the flame detector. The viewing window 132*b* is advantageously provided where one or more IR sensors (by itself or in conjunction with other sensors) are used so that the flame detector may detect IR frequency bands. In such embodiments, the viewing window 132*b* would be comprised of an IR-transparent material. In such embodiments, the viewing window 132*b*** may be quartz, sapphire, glass or a plastic material such as hydrocarbon or fluorocarbon polymer, for example. Other embodiments of housings are also disclosed herein that do not utilize a viewing window that is constructed from a material that is different from the housing material.

In one embodiment, the flame detector 32 has a protective cover **132*a* disposed over it that is conformed to fit snugly over the protective housing 132. The protective cover 132*a* is preferably constructed from a relatively inexpensive material such as a plastic, such as polypropylene or polyvinyl chloride, that is transmissive with respect to IR and visible wavelengths. Thus, the protective cover 132*a* may be easily disposed, recycled, or reused, as desired. To avoid accumulation of paint and grime on a viewing window 132*b*, the protective cover 132*a* can be configured to slip easily over the housing 132 of the flame detector 32**.

Figure 2:
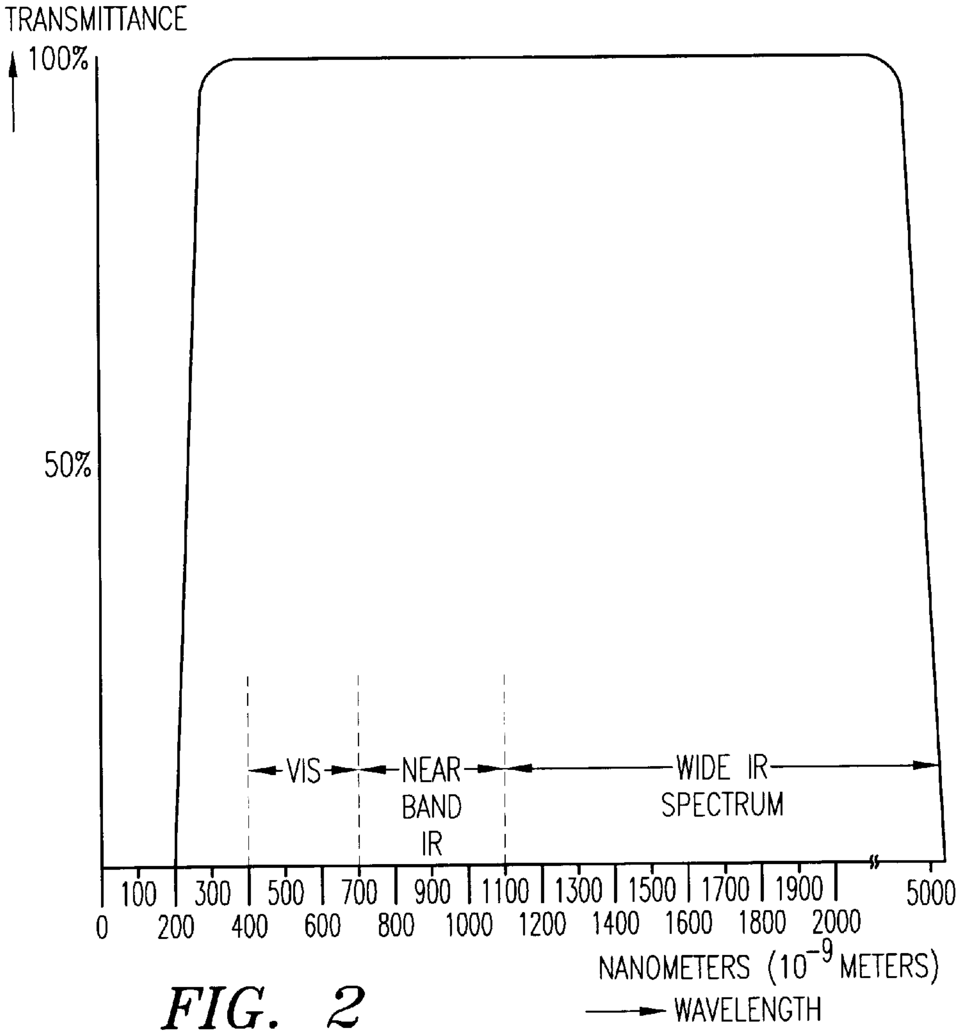
FIG. 2 is a graphical representation of the wide spectrum sensitivity afforded by the process and system of FIG. 1, in which the protective cover has the same transmittance characteristics as the detector.
Figure 4A:
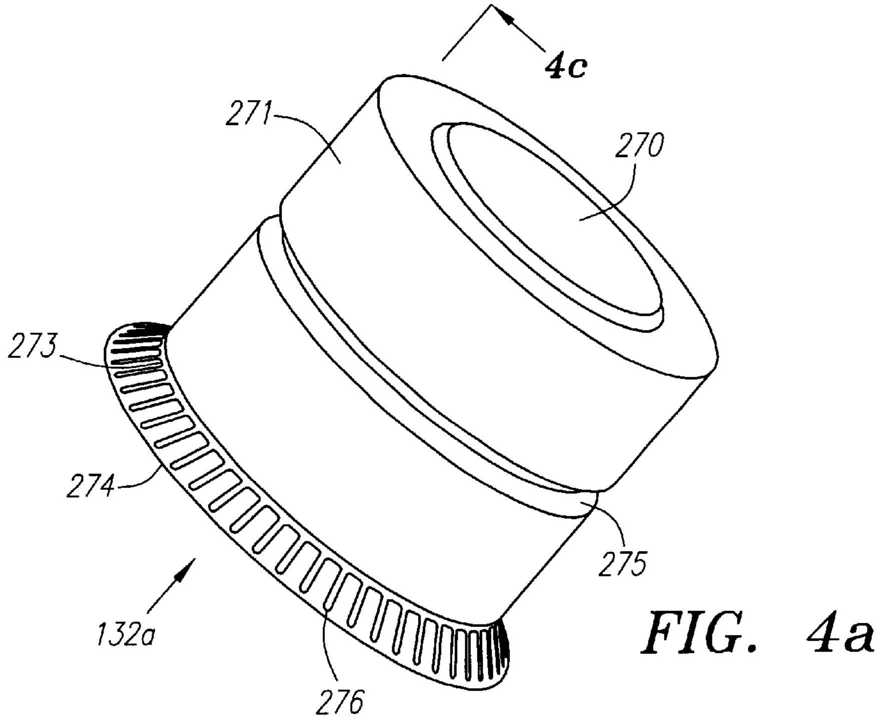
FIG. 4*a* is a perspective view of a protective cover with wide spectrum transmittance characteristics.

So as not to obstruct the wide spectrum sensitivity of the flame detector 32, the protective cover **132*a* (see FIG. 4*a*) preferably has wide spectrum transmittance characteristics that enable optimum sensing of any flame, spark or ignition that may occur. The transmittance characteristics of the protective cover 132*a* are also illustrated in FIG. 2**.

Referring to FIGS. 4, **4*a*, and 4*c*, the protective cover 132*a*, which appears somewhat like a top hat, is preferably configured to conform around a cylindrical protruding portion 272 of the housing 132 of the flame detector 32. In order to prevent accumulation of spray paint, grime, oil contaminants, or the like on a viewing window 132*b* of the flame detector housing 132, the protective cover 132*a* should completely cover the viewing window 132*b*. Preferably, the protective cover 132*a* has a planar face 270 and a cylindrical body 271. The cylindrical body 271 extends sufficiently along the protruding portion 272 and is sufficiently detached from the protruding portion 272 to prevent any movement of airborne paint particles toward the viewing window 132*b***.

As specifically illustrated in FIGS. 4 and **4*a*, the cylindrical body 271, at its base 273, terminates in a perpendicularly projecting flange 274. The flange 274 also serves to prevent airborne paint particles from moving toward the viewing window 132*b*. A centrally located groove 275 runs along its circumference, almost contacting the protruding portion 272 of the housing 132 of the flame detector 32, which serves to further prevent airborne paint particles from reaching the viewing window 132*b*. Slight pressure applied on the protective cover 132*a*, to ease the protective cover 132*a* over the housing 132 of the flame detector 32, causes the groove 275 to slide over a locking mechanism 278 of the housing 132 of the flame detector 32 (best illustrated in FIG. 4*c*). The groove 275 serves to hold the protective cover 132*a***, albeit flexibly, in place.

The flange 274 has a plurality of reinforcing members 276 projecting outwardly toward its outer periphery. The reinforcing members 276 preferably lend the flange 274 enough rigidity to allow a person to easily pull it off the flame detector housing 32 when replacing the flame detector 32.

The protective cover **132*a* may be constructed from any suitable material having the required transmittance characteristics. The material used in the illustrated embodiment is relatively inexpensive, has some rigidity, yet is also resilient. In the illustrated embodiment of the protective cover 132*a*, a clear polyvinyl chloride (PVC), with an "ORVIS®-K" coating to serve as an anti-static agent, is used. The protective cover 132***a* is preferably fabricated from clear PVC with a starting gauge of 20 mil, which is vacuum drawn over a machined, metal mold to yield thin, flexible protective covers. The protective cover 132*a* may alternatively be fabricated from materials such as LEXAN®, which may be injection molded. Other plastics with similar transmittance characteristics may alternatively be used. The illustrated protective cover 132*a* may be easily disposed, recycled, or reused after cleaning, as desired.

Alternatively, the protective cover 132*a* may be configured as a bag or a planar surface in any shape or form necessary to cover the viewing window 132*b*, with a string or wire to fasten the protective cover 132*a* to the protruding portion 272 of the housing 132 of the flame detector 32. Additionally, although the protective cover is preferably constructed from a light weight, inexpensive and disposable material, any material that transmits radiant energy having wavelengths between 700–5000 nanometers is appropriate.

Referring now to an embodiment shown in FIG. 4*b*, the protective cover 132*a* may vary in dimensions to suit various applications. Flame detectors are routinely used in confined areas, such as cabinets, processing equipment (including mixers of explosive materials), extruders, and the like. For example, a small, almost miniature, version of the protective cover 132*a*, as illustrated in FIG. 4*b*, may be used at a viewing end 277 of a fiber optic cable 279, which is attached at a second end 280 to a flame detector 320. Use of the fiber optic cable 279 can facilitate remote location of the flame detector 320 and enable transmission of the radiant energy patterns detected to the flame detector 320.

Sensor data captured by the flame detector 32 can be relayed to a central control system 34 (see FIG. 1), which, in paint spray booth applications, may be located outside the spray booth 14. The central control system 34 may take the form of a computer with a central microprocessing unit, a display monitor, a suitable memory, and printing capabilities. The central control system 34 may coordinate functioning of the flame detectors 32 with other detection systems, as for ungrounded parts or the like.

The housing 132 of the flame detector 32 also can be constructed from polypropylene, which is inert to harsh chemical environments and beneficial for transmittance of infrared spectra. In addition to these advantages, use of polypropylene may permit the housing to be heat-sealed so as to create a sealed, watertight environment. The housing may incorporate structural elements or be otherwise reinforced to enable it to withstand explosions and to give it an explosion proof rating. Potting resins can be added to reduce cavities that typically trap gases or fumes.

Figure 11:
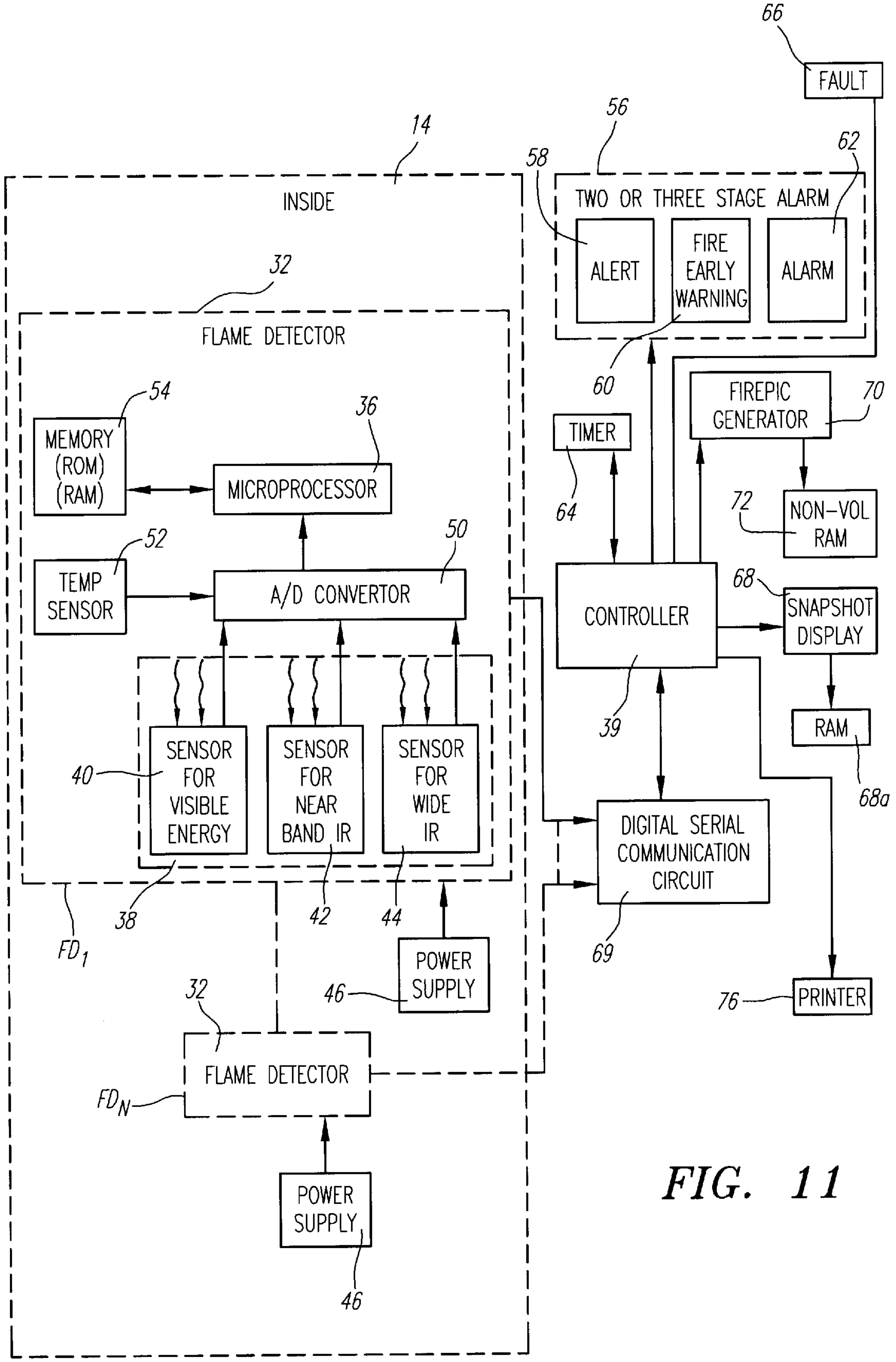
FIG. 11 is a block diagram representation of one embodiment of a flame/fire detection system in accordance with various aspects of the present invention, wherein a single or a series of flame detector components are located inside a desired facility, such as a paint booth, and a controller component of the system is located outside the facility for processing data captured by the sensors.
Figure 12:
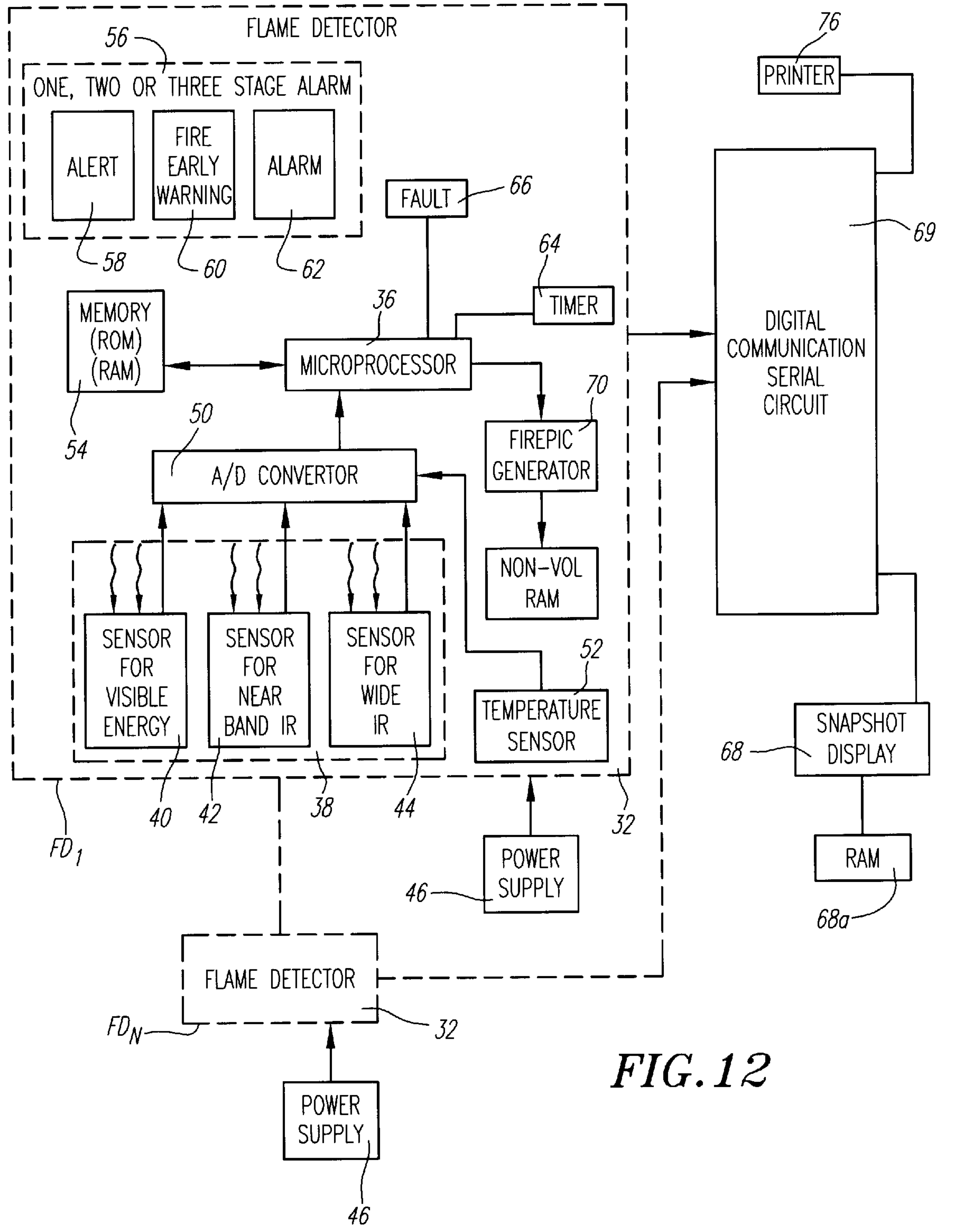
FIG. 12 is a block diagram representation of an alternative embodiment of a flame/fire detection system, wherein a single or a series of detectors incorporate a microprocessor and process data captured by the system in the detector component.

The flame detector 32 preferably operates by searching for radiant energy characteristics or patterns of a flame or fire. A continuous stream of spectral data from a sensor array 38 (as illustrated in FIG. 11 or 12 and described hereinafter) may be analyzed by a controller (microprocessor, or microcomputer) unit 39 or the controller (or microprocessor, or microcomputer) 36. In a preferred embodiment, an Intel 8051 microprocessor or microcomputer is utilized.

Figure 6:
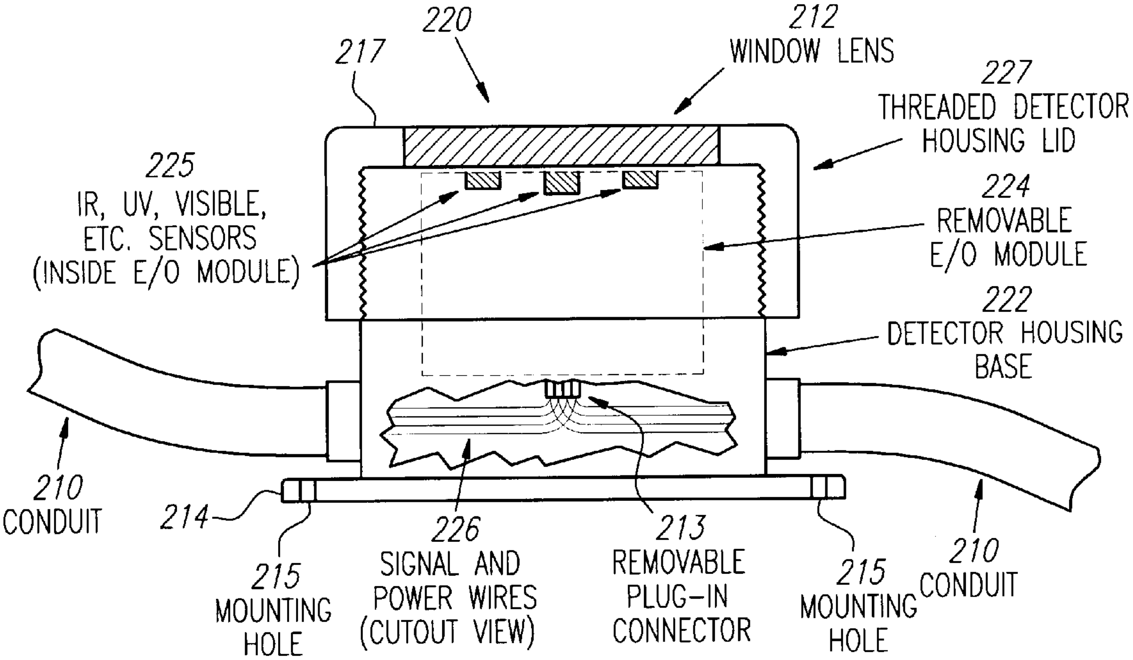
FIG. 6 is a diagrammatic illustration of an enclosed, removable, self-contained module for optical fire/flame detectors.

In another embodiment, a removable, enclosed, self-contained electro-optical module 220, illustrated in FIG. 6, is used for optical fire/flame detection. The electro-optics and electronics of the optical fire/flame detector 220 (whether analog, digital, or a combination thereof) preferably comprise one or more sensors operating in one or more of the ultraviolet band, visible band, near band infrared, wide band infrared, or narrow band infrared (such as a 4.3 micron narrow band IR).

FIG. 6 shows a surface-mountable flame detector 220 constructed according to the present invention, having a structure particularly well suited to ease of replacement of the electronics and electro-optical components of the flame detector without having to re-mount an entirely new flame detection unit. The flame detector 220 comprises a detector housing base 222 having a relatively flat back portion or plate 214 which may be placed flush against a surface to which the flame detector 220 is mounted (e.g., a wall). The back plate 214 of the detector housing base 222 has mounting holes 215 placed at appropriate locations to secure the detector housing base 222 to the mounting surface, and may be mounted to a swivel assembly or hard-mounted to a surface.

The detector housing base 222 is connected to one or more conduits 210 which contain signal and power wires 226, as illustrated in FIG. 6 through the cut-away portion of the detector housing base 222. The signal and power wires 226 are connected to a removable plug-in connector 213. The detector housing base 222 is preferably cylindrical in shape, and has circular threadings 216 around its outer, upper periphery, as illustrated in FIG. 6. A threaded detector housing lid 227, having a cylindrical shape, is adapted to fit over the detector housing base 222 and has threadings on its interior portion that allow it to be placed snugly over the detector housing base 222 in a manner similar to a threaded nut and screw. The detector housing lid 227 has a solid, relatively flat upper surface or plate 217 on one side so as to enclose an inner detector module 224 when the detector housing lid 227 is placed securely over the detector housing base 222.

The inner detector module 224 comprises the electronics and electro-optics, including the sensors 225 of the flame detector 220. The inner detector module 224 from a physical standpoint comprises an enclosed chamber in which the sensitive electronics reside, and can be self-contained in the sense that the flame detection circuitry and other components reside within the enclosed chamber. In the alternative, the sensors are enclosed within the enclosed chamber and the processing circuitry can be external to the enclosed chamber. The inner detector module 224 is physically attached directly to the detector housing lid 227, and more specifically to the upper plate 217 of the detector housing lid 227, such that when the detector housing lid 227 is removed the inner detector module 224 removes along with it. The sensors 225 are preferably located adjacent to the upper plate 217, as illustrated in FIG. 6.

The detector housing lid 227 may optionally be provided with a viewing window 212. Alternatively, the detector housing lid 227 need not have a viewing window 212. In such a case, the upper plate 217 of the detector housing lid 227 (and possibly the entire detector housing lid 227 as well as the detector housing base 222) is preferably comprised of a material that has low bulk adsorption characteristics for radiant energy having frequency components between approximately 400–5000 nanometers, such as glass, polypropylene or other suitable plastic material.

If it is desired to replace the flame detection unit 220 to perform maintenance or tests on the unit, or because of a functional problem in the sensors or circuitry, or for any other reason, the electronics and electro-optical components may be relatively easily replaced by unscrewing the detector housing lid 227 and replacing it with another detector housing lid 227. Because the inner detector module 224 is connected to the detector housing lid 227, the key components of the flame detector can be relatively quickly and easily replaced without having to re-mount the flame detector to the surface. The same detector housing base 222 that was used for the old detector housing lid 227 continues to remain operable for the new one. The removable plug-in connector 213 also facilitates rapid and relatively easy substitution of the new unit for the old one.

There are a number of advantages associated with the housing structure of the flame detector embodiment shown in FIG. 6. For example, sensitive detector electronics and electro-optics which form a part of the inner detector module 224 are better protected from handling-induced electrostatic discharge and physical handling damage. Also, as noted above, the critical components of the flame detector 220 can be replaced easily and quickly in the field without removing or dismantling the detector housing base 222, which would otherwise necessitate detaching the back plate 214 from the surface to which it is mounted as well as detaching the attached conduit(s) 210. Because the sensitive electronics are largely protected within the inner detector module 224, the installation process can in many instances be quickly and easily performed, once the detector housing base 222 is secured and connected to the conduit piping. Benefits may also be achieved in testing, storing and shipping the flame detector 220 with less concern for electrostatic discharge damage at either the factory or the distributor/integrator facility.

The detector housing lid 227 and detector housing base 222 can be of any shape or size, so long as the detector housing lid 227 fits securely within the detector housing base 222. Further, the detector housing lid 227 and detector housing base 222 need not necessarily be threaded so as to attach by screwing together, but may also snap together or be secured by other suitable or conventional means. Also, the detector housing lid 227 and detector housing base 222 can be made from plastic, metal, or any other suitable material, or any combination thereof.

Figure 7A:
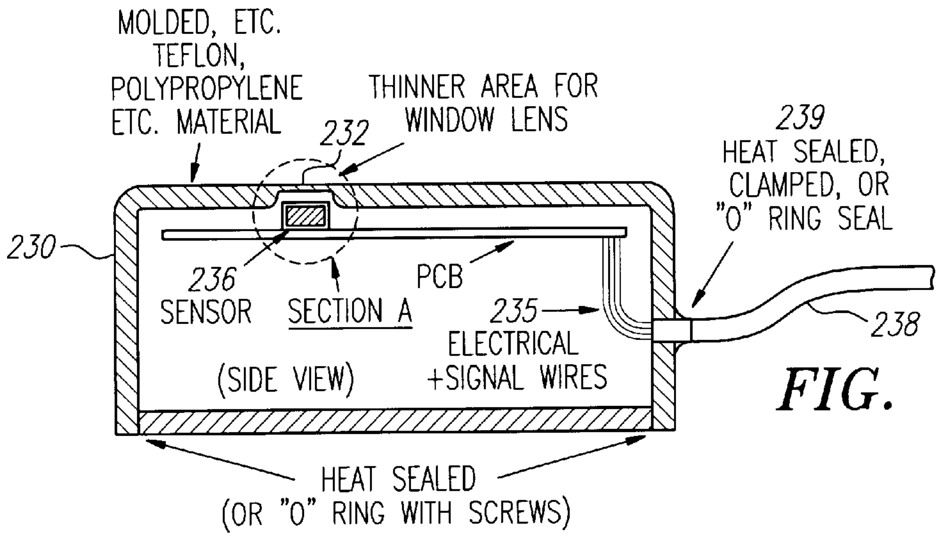
FIG. 7*a* is a diagrammatic side view illustration of a plastic, sealed housing with an integral window lens.
Figure 7B:
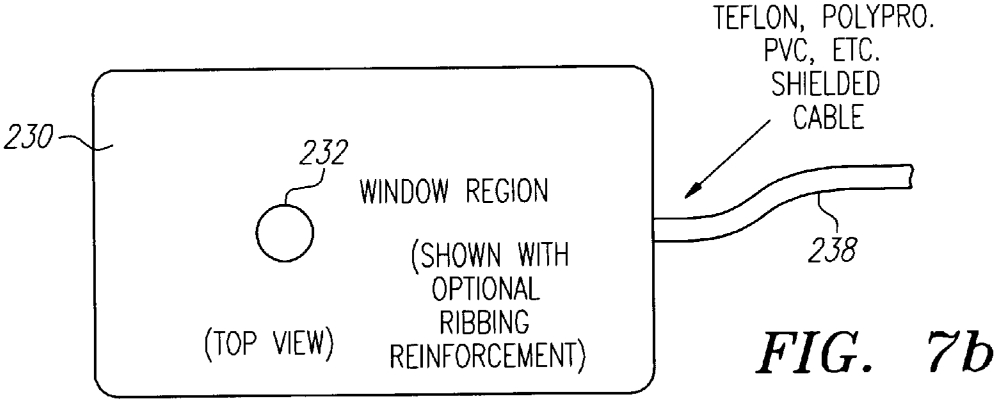
FIG. 7*b* is a top view of the housing of FIG. 7*a*.

A second embodiment of a flame detector with a housing is illustrated in various angles, cross-sectionals and details in FIGS. 7*a*, 7*b*, 8, 9 and 10. Referring first to FIG. 7*a*, a self-contained, sealed housing 230 encloses the electronics and electro-optical components of a flame detector. At least one printed circuit board (PCB) 233 is mounted to one or more walls of the sealed housing 230. On the PCB 233 integrated chips could be mounted which comprise the electronic circuitry and/or electro-optical circuitry of the flame detector. Also on the PCB 233 a sensor 236 or array of sensors for detecting radiant light can be mounted. The sealed housing 232 can be made from a variety of materials and may comprise a window region 232 that is formed of thinner housing material or material different from the housing. Advantageously, the window region 232 is integral with the housing 230, thereby allowing the housing 230 to be constructed of lighter and less costly material than conventional metal housings. Depending upon the environment in which the detector will be used, different materials may be used to construct the housing. For example, in environments that may subject the housing to corrosive chemicals, such as acids, polypropylene may be utilized. In environments in which greasy hydrocarbons are present such as an oil rig, Teflon may be appropriate. In other environments, ceramic or metal housings may be desirable. In addition, the housing may be constructed of a first material and then coated with a second material that provides the best protection for the device in the intended environment.

As a result of the fact that no UV sensors are necessary to practice the present invention, the window region 232 of the housing 230 need not be a quartz or sapphire lens as is required in flame detectors that rely upon UV sensors. Historically, quartz or sapphire windows have been necessary with UV sensors because these two materials have low bulk absorption characteristics for UV wavelengths. However, since the present invention utilizes infrared and visible wavelengths, any material that does not significantly absorb the desired IR and visible wavelengths can be used as a window for the IR sensors. In addition some materials such as Teflon or polypropylene are resistant to the accumulation of contaminants. Accordingly, the housing 230 is preferably constructed of a corrosion-resistant and contamination-resistant material such as Teflon or polypropylene, or some similar material or hybrid. Use of such a contamination-resistant material largely eliminates the need for conventional "through the lens" testing as is commonly required for prior flame detectors (particularly those using UV sensors) having a glass, quartz or sapphire window lens that is not contamination-resistant.

Further, use of a wideband infrared sensor or sensor array (spanning a light frequency band from about 0.7 microns to 5 microns) as a primary sensor in the flame detector, and elimination of UV sensors, results in a construction wherein the wideband infrared sensors are able to effectively "see through" the housing 230 due to the longer wavelengths detected by such sensors. The wide band infrared sensor or sensors should be able to "see through" most contaminants because most contaminants do not absorb significant amounts of infrared energy.

Therefore, the flame detector housing 230 can be manufactured from a material such as polypropylene, polyvinyl chloride, ABS plastic, Teflon, glass, fiberglass, spun glass, or a combination of several materials and/or additives. The integral window region 232 can be made from the same material as the housing 230, so that sealing and mounting problems associated with prior art flame detectors that required quartz, or sapphire window lenses can be provided. The housing 230 may be heat sealed or sealed with an "O" ring 239, as illustrated in FIG. 7*a*. A shielded cable 238 may be welded or otherwise connected to the housing 230, as further described hereinafter in more detail with respect to FIG. 10.

Figure 8:
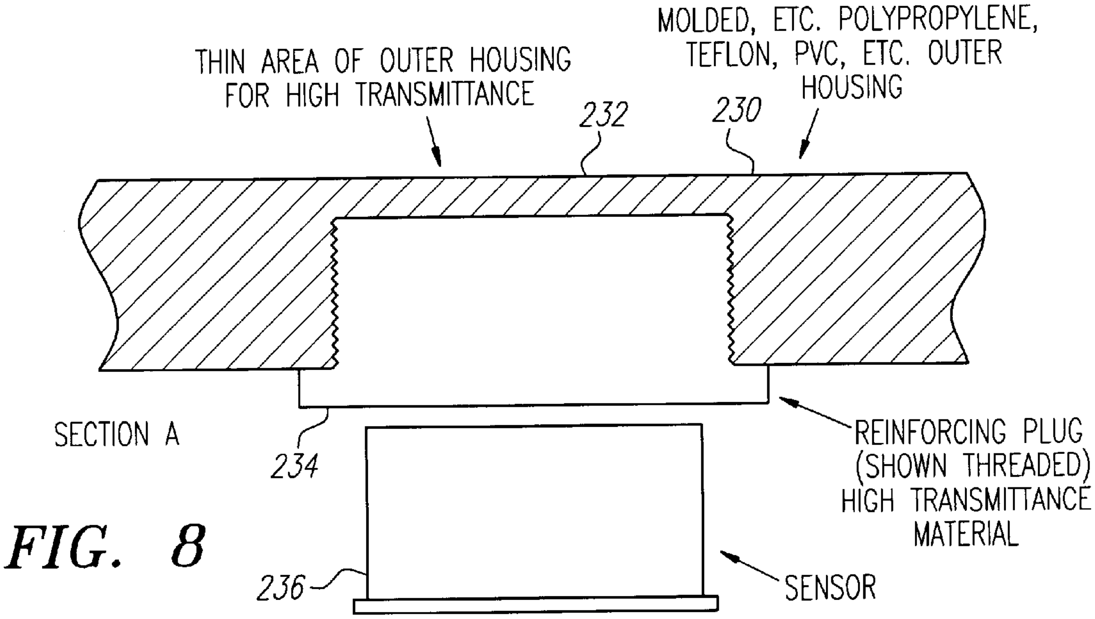
FIG. 8 is a diagrammatic illustration of a side view of a plastic, sealed housing with a thin window-lens area for high transmittance.

In an alternate embodiment, shown in FIG. 8, the detector housing 230 can be constructed from a combination of polypropylene, polyvinyl chloride, ABS plastic, Teflon, fiberglass, spun glass, quartz, glass, sapphire, etc., or a combination of several materials and/or additives. The outer integral window region 232 of the housing 230 can be made from the same material as the housing body 230 and reinforced under the window region 232 with a suitable material such as polypropylene or glass, so that sealing and mounting problems associated with conventional glass, quartz, or sapphire window lenses are eliminated.

A Teflon housing 230 with a thin area immediately adjacent to the window lens area 232 is used for the embodiment shown in FIG. 8. Because the bulk absorption of Teflon is relatively high for longer (infrared) wavelengths, the area of the window region 232 is preferably thin so that the absorption of the desired wavelengths is minimized. A reinforcing plug 234 of low absorption material can be screwed in, snapped in, molded in (e.g., in the injection molding process), heat welded, or otherwise attached to the housing 230 as shown in FIG. 8 in the hollow space caused by the thin window region 232, such that the thin window region 232 is more resistant to puncture or physical damage.

The reinforcing plug can be constructed from any material having low bulk absorption characteristics for the desired wavelengths, including the materials mentioned above.

Figure 9:
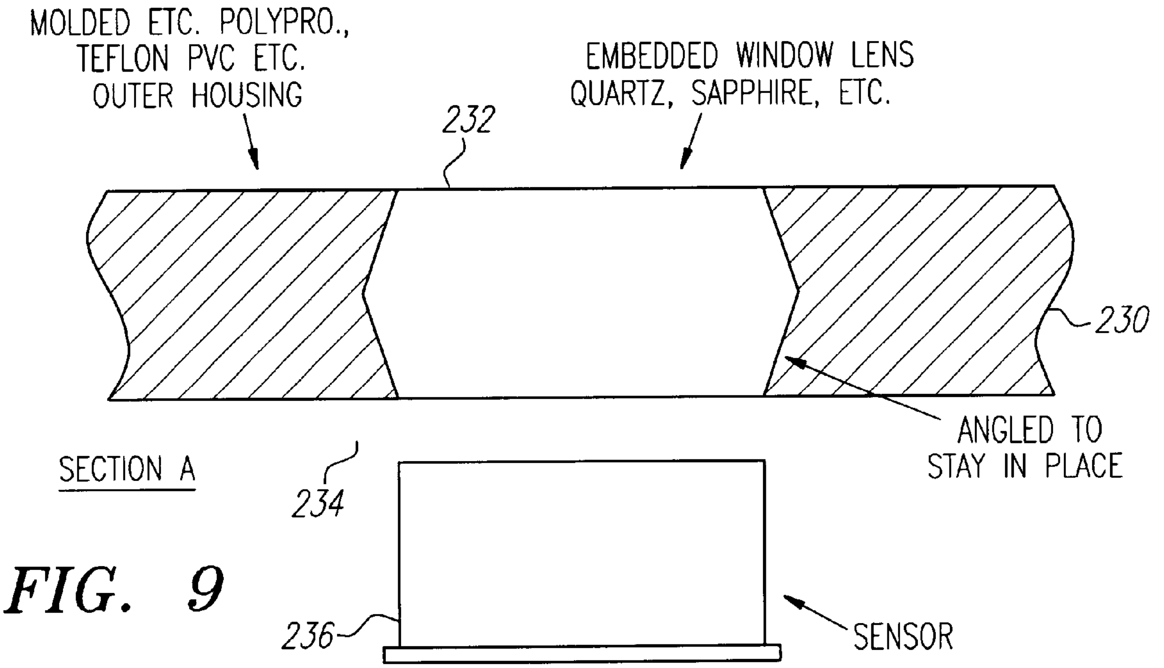
FIG. 9 is a diagrammatic illustration of a side view of a plastic, sealed housing with an embedded window lens made of such materials as quartz or sapphire.

In another alternate embodiment, illustrated in FIG. 9, the detector housing 230 is made from a combination of polypropylene, polyvinyl chloride, ABS plastic, Teflon, fiberglass, spun glass, quartz, glass, sapphire, etc., or a combination of several materials and/or additives. The window region 232 can be made from any different material, which material is secured or embedded (e.g., by heat sealing) into the plastic housing 230 during the injection molding process, or is heat sealed into the material after the housing fabrication. Thus, problems associated with sealing and mounting problems glass, quartz, or sapphire window lenses are eliminated.

As discussed above, few contaminants will adhere to the housing 230 when constructed of Teflon, polypropylene or another of the preferred corrosion-resistant and contamination-resistant materials. The use of such contaminant-resistant materials, without the need for a window lens of sapphire, quartz or other UV-transparent material, is made possible by the present flame detectors which do not require UV detectors. The housing for the present flame detectors are easier to maintain than conventional types of flame detectors, particularly those detectors that use UV sensors, which require regular and frequent cleaning of the sensor window lens to remove contaminants. In addition, because plastics are generally lighter than metal, quartz and sapphire, mounting and installation costs can be reduced. The preferred, light-weight, low-cost, sealed, plastic detector housing 230 is constructed so as to fall within NEMA 4, 12, etc. outdoor ratings and hazardous ratings such as Class I and II and Divisions 1 and 2. These ratings are necessary for operating the optical detector in a hazardous, corrosive, and/or outdoor environment.

In another embodiment, the self-contained housing 230 is sealed using one or more "O" rings and screws, rivets, etc. The preferred method of sealing is heat sealing, which melts the housing materials (e.g., plastic or glass) into essentially one solid piece. The optical flame/fire detectors can use various sensors 236, including wide band IR, nearband IR, visible band, or narrow band IR (such as 4.3 micron infrared, for example), with one or more IR rejection bands for multiple frequency IR detection. The optical transmittance of the window region 232 should be high enough for the selected sensors 236 to sense radiant energy in their respective light frequency detection bands.

The window region 232 for an all-plastic or all fiberglass detector housing 230 for example, can be thinner than the rest of the housing 230 so as to decrease the bulk absorption losses of the window region. In a an embodiment using a combination of wide band IR, near band IR and visible light sensors, preferably the window region 232 has a low bulk absorption for wavelengths in the range of approximately 0.4 to 5 microns, or about 400 to 5000 nanometers. Preferably, various reinforcement techniques may be used such as ribbing or braces, or the high-optical-transmittance plug described previously with respect to FIG. 8.

As an additional advantage, manufacture of the housing 230 from a material such as polypropylene, Teflon, fiberglass and the like (with or without additives, if desired) can render the preferred detector housing 230 resistant to corrosion and/or acid. The detector housing 230 can be machined out of the bulk material, injection molded or blow molded, for example, and is preferably heat sealed to ensure complete isolation of the internal electro-optics and electronic from any corrosive elements that could leak through conventional sealing techniques such as "O" rings and screws.

Figure 10:
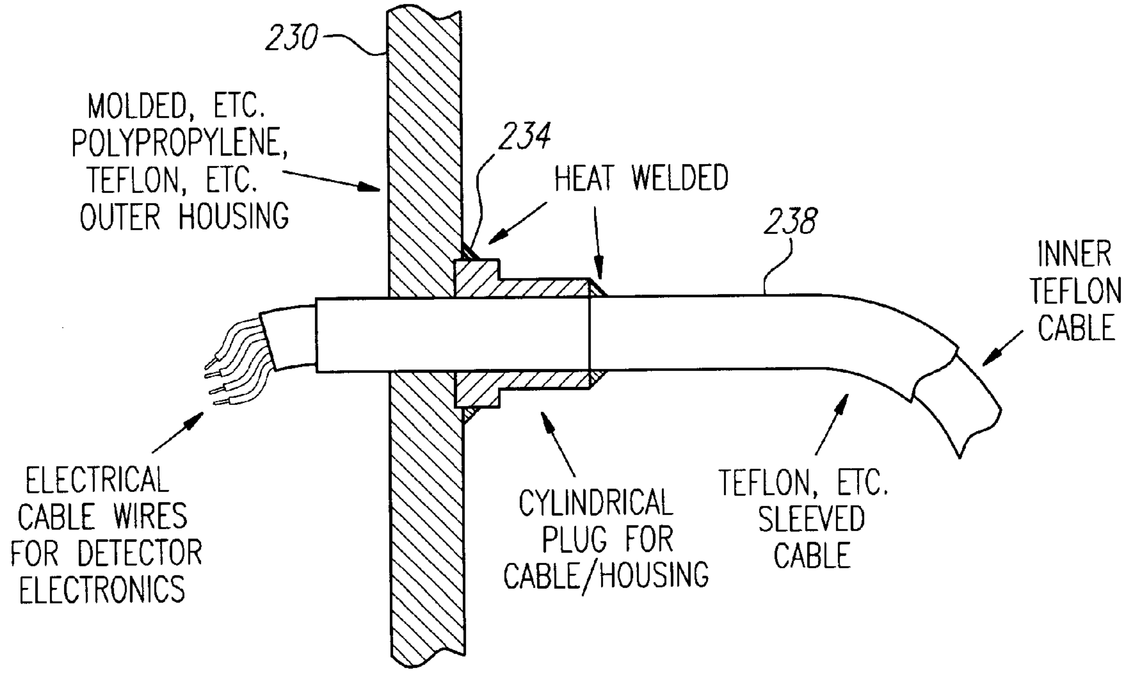
FIG. 10 is a diagrammatic illustration of a side view of housing that is heat welded to a plastic cable.

A power and signal cable 238 connects to the housing 230 and can be made from the same material as the housing 230. The power/signal cable 238 can be sealed to the housing 230 with clamps or "O" rings, for example, or can be heat sealed to the housing 230 itself, as illustrated in FIG. 10. For example, in an embodiment in which the housing 230 and power/signal cable 238 are made from polypropylene, the housing/cable interface can be heat sealed for optimum sealing because the cable 238 and housing 230 can be melted into an integral piece. In addition, in an acidic environment such as a semiconductor wet-process bench, one or more protective sleeves are advantageously placed around the power/signal cable 238 to add further protection to the electronic wires enclosed within the power/signal cable 238.

There is currently a need to deploy fire/flame detectors in hostile, caustic, acidic environments, both indoors and outdoors. In a preferred embodiment suitable for many such environments, a flame detector is physically installed within a wall, workbench, or similar structure. Preferably, the flame detector housing is such as described for any of the embodiments shown in FIGS. 7*a*, 7*b*, 8, 9 and 10. For example, a self-contained, sealed flame detector housing made of polypropylene can be installed inside the corrosive compartments of a semiconductor clean-room chemical wet-process bench. Installing a sealed, corrosion-proof, plastic-housed optical fire/flame detector inside the wet bench compartments has the advantage of reducing exposure to contaminants and placing the detector closer to the potential fire source for improved fire response. Also, the flame detector housing itself is less likely to become a repository of miscellaneous contaminants present in the worksite.

A sealed, corrosion-proof, plastic-housed optical fire/flame detector can similarly be used on an offshore oil platform where maintenance costs are high and low weight is important. Preferably, the housing is constructed from or coated with Teflon, which is highly resistant to the accumulation of oil deposits. In addition, because the flame detector does not require frequent maintenance, i.e., window-lens cleaning, as do conventional fire detectors, substantial cost savings from reduced maintenance can be realized.

FIGS. 11 and 12 are block diagrams depicting embodiments of a flame detector utilizing wide band IR detection. In accordance with one embodiment of the present system, a single flame detector 32 located at a particular location, indicated by reference letters FD1, or a plurality of flame detectors, located at a plurality of different locations, indicated by reference letter FDN, may be located, for example, inside the spray booth 14 (see FIG. 1). A power supply 46, typically operating at 24 volts, supplies power to the flame detector 32.

In addition to the sensor array 38, the flame detector 32 may include an analog to digital (A/D) converter 50, which receives a continuous stream of analog sensor signals from each of the sensors 40, 42, 44 of the sensor array 38, and converts the analog signals into digital signals for storage and selective processing by a microprocessor 36 or a controller 39, or both. A temperature sensor 52 located within the flame detector 32 serves to indicate ambient temperature values for calibration purposes. A memory component 54 within the flame detector 32 comprises ROM (Read Only Memory) and RAM (Random Access Memory) for temporary and permanent storage of data, as for storing instructions for the microprocessor 36, for performing intermediate calculations, or the like. In a preferred embodiment, the sensor array 38 preferably has a sensor 40 for sensing radiant energy within the visible band spectrum, a sensor 42 for sensing radiant energy within the near band infrared spectrum, and a sensor 44 for sensing radiant energy within a wide band infrared (WBIR, or MIR) spectrum.

Referring now to FIG. 2, the first sensor 40 searches for and detects radiant energy within the visible band range extending from about 400 nanometers to approximately 700 nanometers, indicated in FIG. 2 by the frequency band designated as "VIS." The second sensor 42 searches for and detects radiant energy within the near band infrared range extending from roughly 700 nanometers to about 1100 nanometers, indicated in FIG. 2 by the frequency band designated as "NEAR BAND IR." The third sensor 44 searches for and detects radiant energy within a wide band infrared range extending from about 700 nanometers to about 5000 nanometers, indicated in FIG. 2 by the frequency band designated as "WIDE IR SPECTRUM."

In a preferred embodiment, wide band IR (WBIR) is used as the primary sensor in the optical fire/flame detectors. The WBIR sensor preferably detects radiant energy over a spectral band from about the end of the visible spectrum (about 0.7 microns) to the band comprising the longer IR wavelengths (up to about 3.5 microns). The WBIR sensor 44 can, however, be susceptible to various false-alarm sources, including sunlight, bright lights, ovens, and other sources of wideband IR radiation. In order to successfully use WBIR as the primary sensor without false alarms from broadband energy sources, information obtained from sensing energy in the visible band (VB) (from about 0.4 to 0.7 microns) and/or the near band IR (NBIR) (from about 0.7 to about 1.5 microns) is used in conjunction with signal processing algorithms to prevent false triggering. A preferred process and system therefore comprises an "intelligent" multi-spectral approach to optical fire/flame detection.

In a preferred embodiment, compensating digital signal processing algorithms are performed in the optical fire/flame detectors by the microprocessor 36 or controller 39 to distinguish between actual fires and non-fire energy sources. Such algorithms preferably include time correlation of the sensor signals along with VB and NBIR energy bands and a comparison of relative energy levels in the different energy bands.

In order to rapidly detect all types of fires, whether hydrocarbon and nonhydrocarbon in nature, a preferred optical fire/flame detector senses energy over a wide, continuous spectral band of infrared radiant energy. Preferably, the energy band observed by the fire/flame detector covers the range from about 0.4 to about 5 microns (i.e., spectral ranges in the VB, NBIR, and WBIR) to ensure that virtually all types of fires are detected. This spectral range constitutes the bulk of the radiant heat energy generated by an unwanted fire, including, for example, burning polypropylene or PVC plastic.

Figure 17:
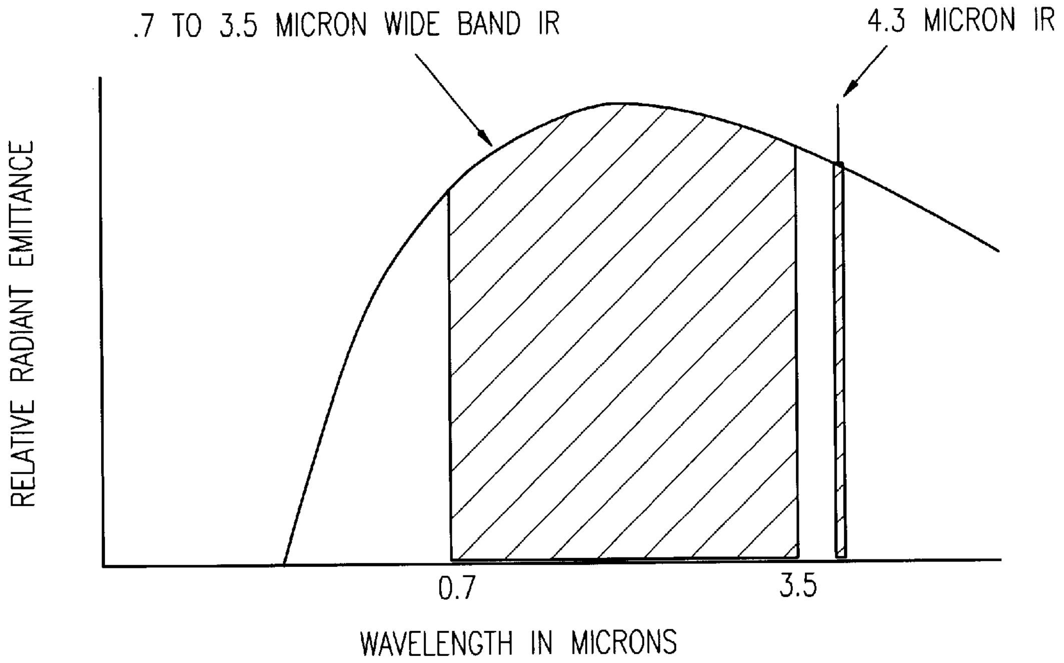
FIG. 17 is a graph illustrating relative radiant emittance at various wavelengths for a 2500 K degree fire.

FIG. 17 is a graph illustrating the energy emitted at various wavelengths by an exemplary fire source. As shown in FIG. 17, a large portion of the energy emitted by a typical fire occurs at wavelengths other than the 4.3 micron range. Accordingly, fire detections that rely solely on observing a $CO_2$ spike in the narrow 4.3 micron band are in effect observing only a small fraction of a fire's total energy radiation. In contrast, the preferred fire/flame detector observes a much wider portion of the energy emitted by a fire. However, because non-fire sources such as sunlight and artificial light may also be observed by the fire/flame detector, a mechanism for discrimination between fire and non-fire energy sources is desireable.

The discriminator in the fire/flame detector can be programmed or otherwise configured to make advantageous use of known or observed characteristics of different types of fires, in order to more readily distinguish fire and non-fire energy sources. By way of general background, all materials that burn in the condition known as an unwanted fire, which can be described as uncontrolled rapid oxidation, emit wideband blackbody radiant energy and molecular narrow band line emissions, such as the 4.3 micron $CO_2$ spike. (The term blackbody refers to a material's emissivity, and not its color.) The blackbody radiant emissions of a fire are always present and predictable because they are a function of the temperature of the materials being consumed by the fire, the temperature of the fire's gaseous flames and solid particulates, and the average emissivity of the flames, particulates, and burning material. Radiant emissions are the transfer of heat from one body to another without a temperature change in the medium; they are electromagnetic in nature and travel at the speed of light. They are, for example, the physical mechanism that transfers energy (heat) from the sun to the earth through airless outer space.

Blackbody radiant emissions are the primary reason that a fire feels hot at a distance. Because Kirchoff's Law states that a good emitter is also a good absorber for each wavelength, a blackbody may be defined as an ideal body that completely absorbs all radiant energy striking it, and therefore, appears perfectly black at all wavelengths. Emissivity may be defined as the ratio of an object's radiance to that emitted by a blackbody radiator at the same temperature and at the same wavelength. A perfect blackbody has an emissivity of one. Highly reflective surfaces have a low emissivity, but most materials that burn easily have emissivities of 0.5 or greater. The radiation emitted by a blackbody is referred to as Planck's Blackbody Radiation Law.

Figure 14:
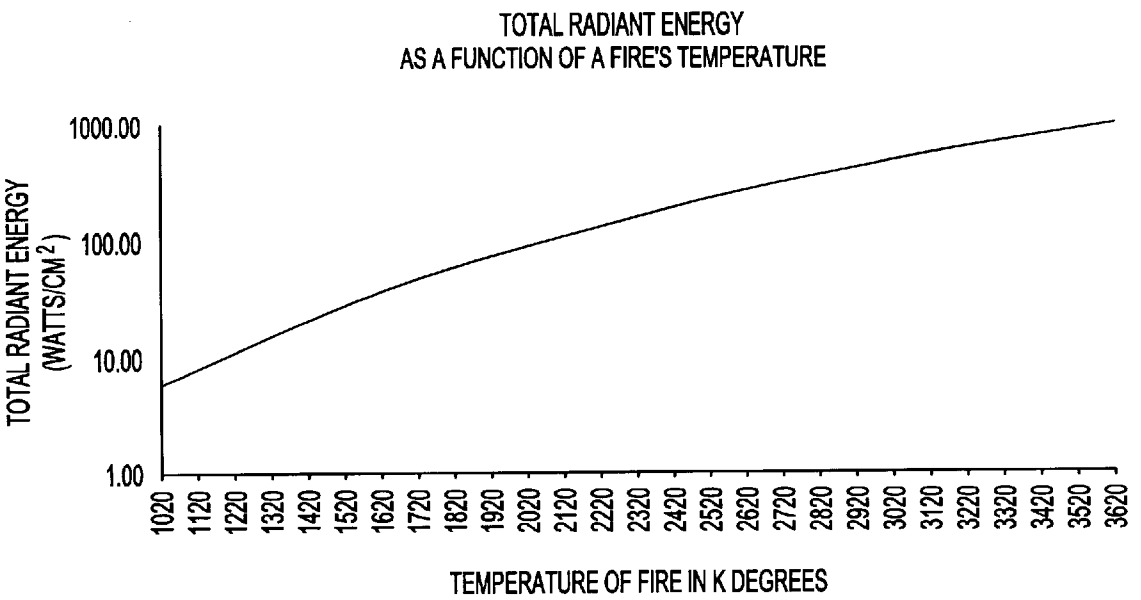
FIG. 14 is a graph of radiant energy as a function of fire temperature.
Figure 15:
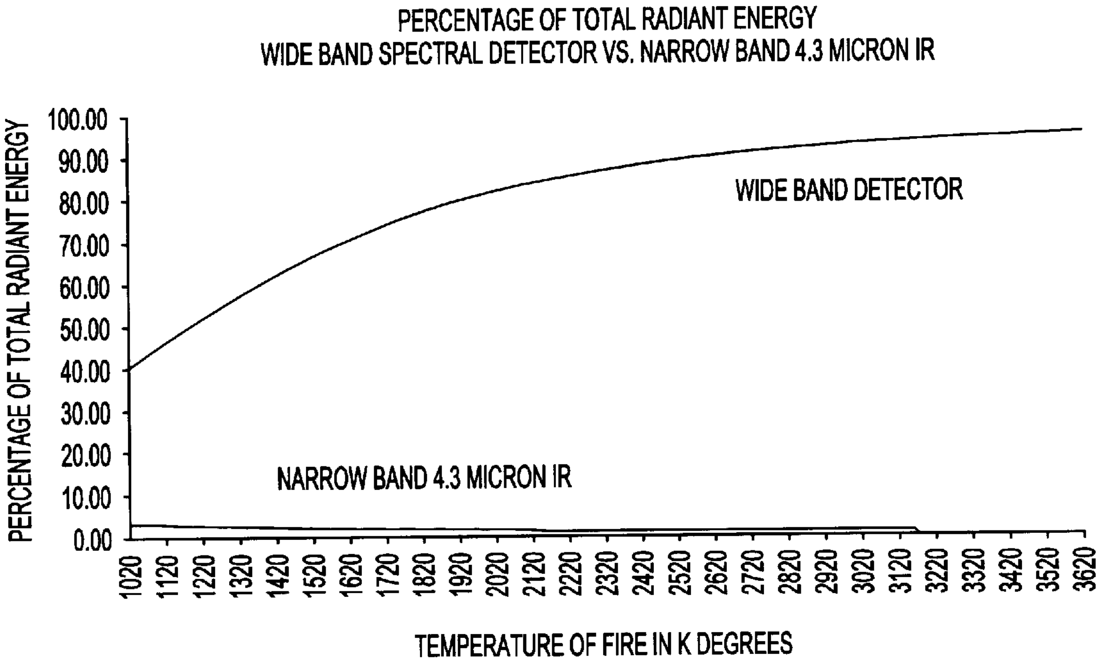
FIGS. 15 and 16 are graphs comparing a detected radiant energy for a wide band spectral detector versus a narrow band 4.3 micron infrared detector as a function of fire temperature.
Figure 16:
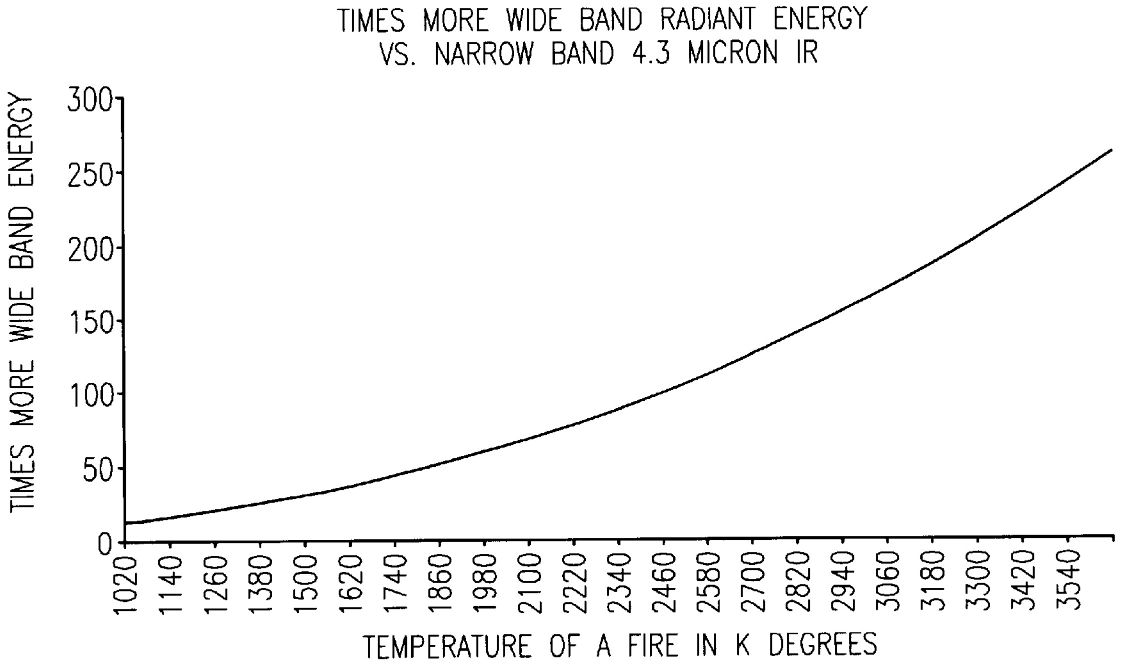

FIGS. 13*a*, 13*b*, 14, 15 and 16 can be used to compare the amount of energy emitted at different energy bands by fires of different temperatures, and therefore the amount of energy that can be detected by sensors operating at different energy bands. FIGS. 13*a* and 13*b* are tables containing data comparing the heat of a fire (in degrees Kelvin), its total radiant energy (in watts/$cm^2$) over the visible, nearband IR and wideband IR ranges, its radiant energy in the narrowband IR range, and the relative percentages of narrowband versus the composite of nearband IR, visible and wideband IR. FIGS. 14, 15 and 16 are graphs illustrating the information in the table of FIGS. 13*a* and 13*b*. The table and graphs of FIGS. 13*a*, 13*b*, 14, 15 and 16 indicate that a fire emits far more energy in the wideband energy spectra than in the narrowband IR band.

FIG. 14 is a graph showing total radiant energy as a function of a fire's temperature. As shown in FIG. 14, the total radiant energy generally increases as a function of the fire's temperature. FIGS. 15 and 16 compare in different aspects the amount of the fire's energy observable by a wideband detector versus a narrowband detector. FIG. 15 compares the percentage of radiant energy detected by a wideband detector and a narrowband detector as a function of the fire's temperature, while FIG. 16 is a graph showing a plot of the relative increase in energy detected by a wideband detector over a narrowband detector, as a function of the fire's temperature.

The information appearing in FIGS. 13*a*, 13*b*, 14, 15 and 16 has been derived as follows. First, the formula for calculating the total heat radiation at all wavelengths from a perfect blackbody is known as the Stefan-Boltzmann Law:

$$W=\sigma T^4 \quad (1)$$

where W is the total radiation emitted in watts/$m^2$, T is the absolute temperature in ° K. (degrees Kelvin), and σ is the Stefan-Boltzmann constant, $5.67\times10^{-8}$ watt/$m^2K^4$. The Stefan-Boltzmann Law indicates that the total radiant emitted energy from a surface is proportional to the fourth power of its absolute temperature; consequently, the hotter the body is, the greater the wide-band infrared radiation that is emitted. To obtain a more precise value of W, the total radiant blackbody energy emitted using equation (1), W can be multiplied by the average emissivity of the burning materials, which can be approximated by 0.5.

Planck's Radiation Law may be used to calculate the continuous radiant energy distribution among the various wavelengths. For all the wavelengths from 0 to 100 microns, the radiated energy should be equal to the total radiated energy calculated by the Stefan-Boltzmann Law. The detected percentage of radiated energy is found by calculating the energy in the wavelength span covered by an optical fire detector with the total energy radiated by the fire using the Stefan-Boltzmann Law. Planck's formula for calculating the total radiated energy between first and second wavelengths λ1 and λ2 is as follows:

$$W_{\lambda1\text{-}\lambda2}=\int((2\pi hc^2)d\lambda)\lambda^5(e^{hc/\lambda(kT)}-1)) \quad (2)$$

where h=Planck's constant, $6.63\times10^{-34}$ joule-sec., c=speed of light, $3.00\times10^{10}$ cm/sec., λ=wavelength in cm (10–2 meters), T=absolute temperature in degrees Kelvin, and k=Boltzmann constant, $1.38\times10^{-23}$ joules/° K.

Using equation (2) and integrating over the wavelength range from 0.4 to 3.5 microns, it can be determined that an "ideal" optical fire detector with a wide band spectral range of 0.4 to 3.5 microns is theoretically capable of sensing, for example, about 88.23% of the total radiated energy at a fire/flame temperature of 2500 degrees Kelvin (K) (2226.85 degrees Celsius), as appears in the information contained in the tables of FIGS. 13*a* and 13*b*. For reference, the temperature of a typical clean burning flame generally varies from between 1400 and 3500 degrees K.

There is another kind of infrared (IR) radiation that is discontinuous and made up of individual, very narrow emission lines. An example is the line spectrum produced by a heated gas, such as carbon dioxide, which is a by-product of hydrocarbon fires. This phenomenon is related to the excitation or heating of certain types of gases. The atoms or molecules of a gas have certain natural frequencies of vibration and rotation depending upon their structure, bonding forces, and masses. If certain gases are suitably excited (i.e., heated), they will emit a line emission spectrum characteristic of the particular gas. Such gases can also absorb radiation in the same line spectrum (i.e., according to application of Kirchoff's Law). For $CO_2$ gas, these narrow band line emissions and absorption regions include the 4.3 micron band. Nonhydrocarbon fires, however, such as silane and hydrogen fires, do not produce $CO_2$ gas as a by-product because no carbon atoms are involved in the combustion process.

Thus, fires that are not oxidizing carbon based materials may not emit $CO_2$ gas or have a narrow band line emission at 4.3 microns. The $CO_2$ gas emission line from an uncontrolled fire is therefore unpredictable. Moreover, the total radiant energy of line emissions represents a very small fraction of the total blackbody radiant energy and does not measurably affect the total radiant energy output. Using Planck's Radiation Law, Equation (2), with a wavelength range from 4.2 to 4.4 microns to calculate the energy in the 4.3 micron band, the percentage of Planckian blackbody energy is about 0.82% at a fire/flame temperature of 2500 degrees K (see FIGS. 13*a* and 13*b*). Thus, optical fire detectors that rely primarily on the 4.3 micron narrow band to sense fires can fail to detect nonhydrocarbon fires, and do not present a proportional measure of energy consumed during a fire, as they often can see less than one percent of the fire's total radiated energy.

Besides observing radiant energy over a given spectral band, a fire/flame detector can also observe the changes in radiant energy over time to make a better determination of whether a fire is occurring, as opposed to a non-fire event that may otherwise result in a false alarm trigger. Further characteristics of a fire can therefore be used to improve the detection ability of the fire/flame detector.

For example, it has been observed by the inventors that the wide, continuous band of blackbody radiant energy pulsates as the fire's rising thermal energy causes the burning material(s) to further outgas, consuming more oxygen in rapid, irregular, exothermic chemical reactions. As the temperature of the fire further rises, the radiant blackbody energy correspondingly increases and the carbon particulates, if the fire is a hydrocarbon type (i.e., a fire involving hydrogen and carbon), remain after the other outgassing components are consumed. These hot carbon particles also radiate blackbody emissions and their emissivity is high.

A calm, controlled fire, such as a candle burning in still air, radiates a constant blackbody radiant heat of the gaseous flame and particulates that can be felt within about one foot of the flame. In contrast, for an uncontrolled, unwanted fire, especially a growing fire, the radiant heat that is felt by the hand at a distance is pulsating and irregular. It has been observed by the inventors that most threatening fires tend to pulsate at a rate of approximately 2 to 100 Hertz. This flickering or pulsating causes ripples to occur at a similar rate in the detected blackbody energy.

The differences between uncontrolled, unwanted fires and calm, controlled fires or non-fire energy sources can be advantageously used by the fire/flame detector to discriminate between fire situations which call for a response and situations which call for no response or merely continued monitoring. For example, the discriminator in the fire/flame detector may observe the frequency and regularity at which the detected radiant energy is pulsating, and thereby weed out potential false alarm situations. For example, if the fire/flame detector observes that the detected energy has a time-varying component between 2 and 100 Hertz, the discriminator may conclude that a potential unwanted fire situation exists. If, on the other hand, the fire/flame detector observes that the detected energy has no time-varying component, or has one or more time-varying components outside of the 2 to 10 Hertz frequency band, then the discriminator may conclude that it is unlikely that a fire situation exists. The discriminator may combine this information with other information to arrive at a final conclusion of whether a potential unwanted fire situation exists.

The ultimate criteria used to determine whether a fire situation exists can largely depend upon the application in which the fire/flame detector is employed. The fire/flame detector is therefore advantageously configured with a programmable microprocessor so that the discrimination mechanism can be tailored to each particular environment.

The discriminator can also be programmed with "false alarm profiles" to further assist in distinguishing between fire and non-fire situations. To accomplish this type of programming, the output of the fire/flame detector sensors is measured in response to various non-fire or non-dangerous flame sources anticipated to occur in the area where the fire/flame detector will be deployed. For example, the response of the fire/flame detector sensors to an oven, flashlight or a lit match may be measured and recorded. The energy profile resulting from the oven, flashlight, lit match or other non-dangerous fire source can be stored in a memory within the fire/flame detector. After the detector is deployed, and when a potential fire situation later occurs, the fire/flame detector can compare the current energy profile with the stored "false alarm" profiles and can prevent itself from declaring a fire situation if a close match is found.

Figure 3:
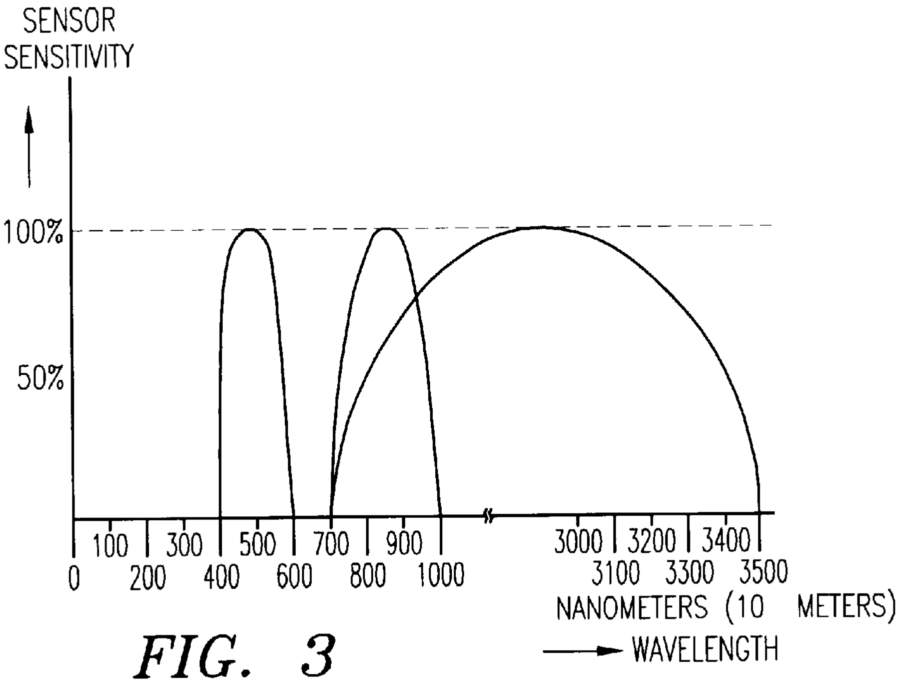
FIG. 3 is a graphical representation of the sensitivity of a flame detector having wide band IR, near band IR and visible band sensors.

Referring now to FIGS. 3 and 5, sensor sensitivities and sensor types that are used in a fire/flame detector 32 are illustrated. It should be understood that a variety of different sensors may be used in different configurations to accomplish the same or equivalent purpose. In accordance with one illustrated embodiment (FIG. 3), suitable silicon (Si) photodiode sensors are used for detecting radiant energy within the visible band and near band infrared spectrums. The wavelength (in nanometers) of the radiant energy is indicated along the x-axis and the sensor sensitivity in relative percentage is indicated on the y-axis. For a wide infrared spectrum, a suitable lead sulfide (PbS) sensor can be used. With reference specifically to FIG. 5, in accordance with an alternative embodiment, a Germanium photodiode sensor may be sandwiched on top of the lead sulfide (PbS) sensor.

In accordance with the embodiment illustrated in FIG. 11, sensor digital data (once converted by the A/D converter) is continuously transmitted to the controller 39. The controller 39 analyses the sensor digital data and determines if there is any sign of sparks, flames, or fire (whether or not visible to the human eye). The controller 39 therefore acts in this embodiment as a discriminator so as to discriminate between an unwanted and/or uncontrolled fire, and a non-fire or controlled fire source.

To this end, the controller 39 compares the radiant energy sensed by the visible band and nearband IR sensors against the radiant energy sensed by the wideband IR sensor. The radiant energy sensed by the visible band and nearband IR sensors can be from nonfire sources such as electrical lights, reflected and/or direct sunlight modulated by such things as tree branches or leaves in a breeze, reflected sunlight off water, steady-state IR sources such as infrared curing ovens, and the like. The radiant energy sensed by the wideband IR sensor is indicative of blackbody radiation. The relative levels of visible/nearband IR energy versus wideband IR energy, and the time relationship of those energy levels, can be analyzed by the controller 39 in order to determine the presence or lack of presence of a fire.

In a preferred embodiment, the radiant energy sensed by the visible band and nearband IR sensors (i.e., the A/D sampled outputs of the visible band and nearband IR sensors) is digitally subtracted from the radiant energy sensed by a wide band IR sensor (i.e., the A/D sampled output of the wideband IR sensor), resulting in a "compensated" measured energy level. The compensated measured energy level is compared against a predetermined threshold level. If the predetermined threshold level is exceeded, a possible fire situation is declared. The visible, nearband IR and wideband IR sensor outputs are then compared against false alarm profiles to verify that known false alarm sources have not caused the measured energy level to exceed the threshold.

As described further hereinafter, multiple threshold levels for comparison may be established, with each threshold level resulting in a different response or action by the fire/flame detector.

Figure 28:
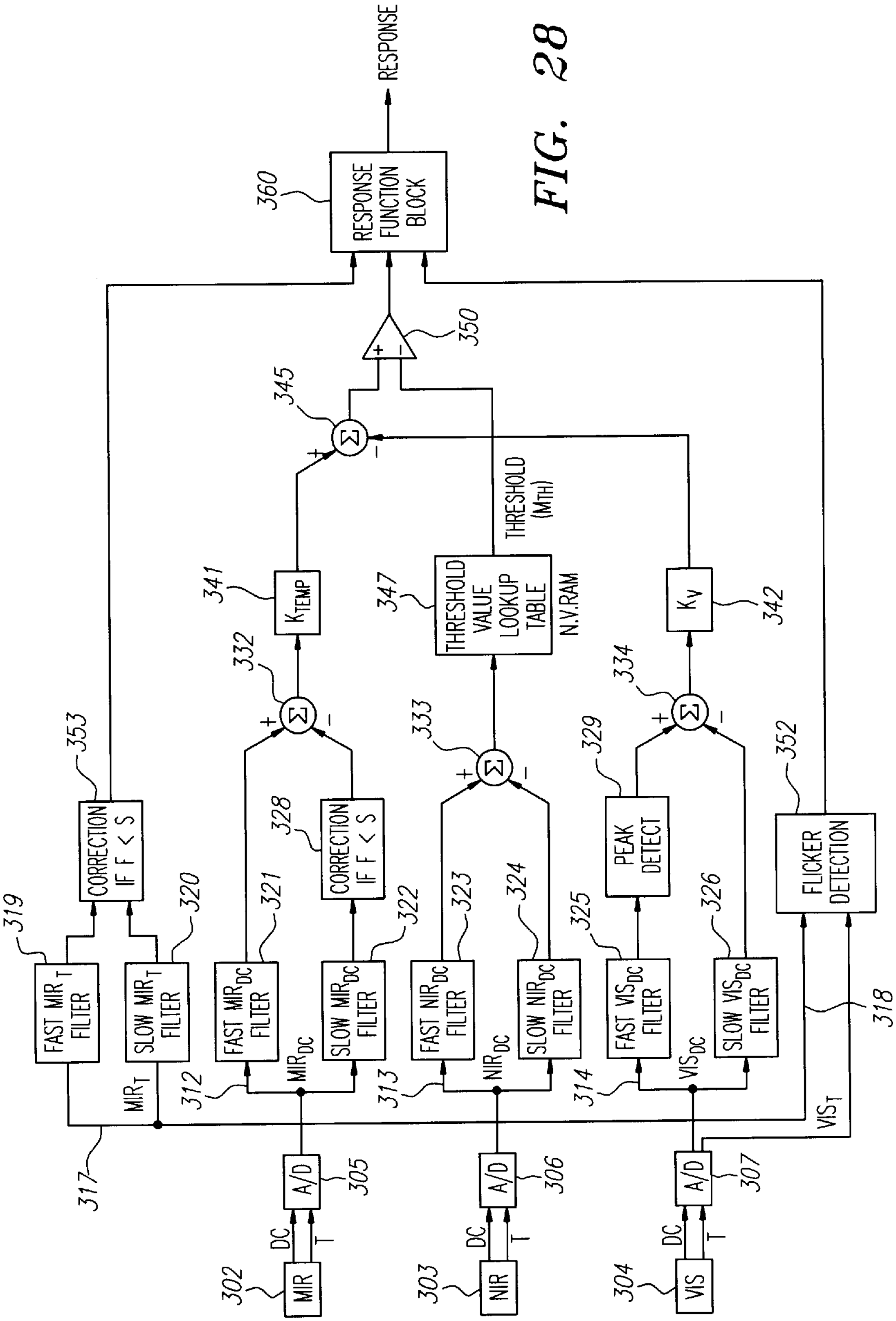
FIG. 28 is a functional diagram illustrating a preferred fire discrimination algorithm.

A preferred mechanism for discriminating between fires potentially requiring a responsive action and other radiant energy sources (including non-fires or certain types of controlled fire or energy sources) may be described with reference to FIGS. 28 through 34. FIG. 28 is a functional diagram illustrating the basic steps of the discrimination technique. While this technique is explained with reference to an embodiment which takes advantage of microprocessor processing speed and power, it will be understood that some or all of the functions described can be implemented, if desired, using analog circuitry or a combination of digital and analog circuitry.

Figure 34:
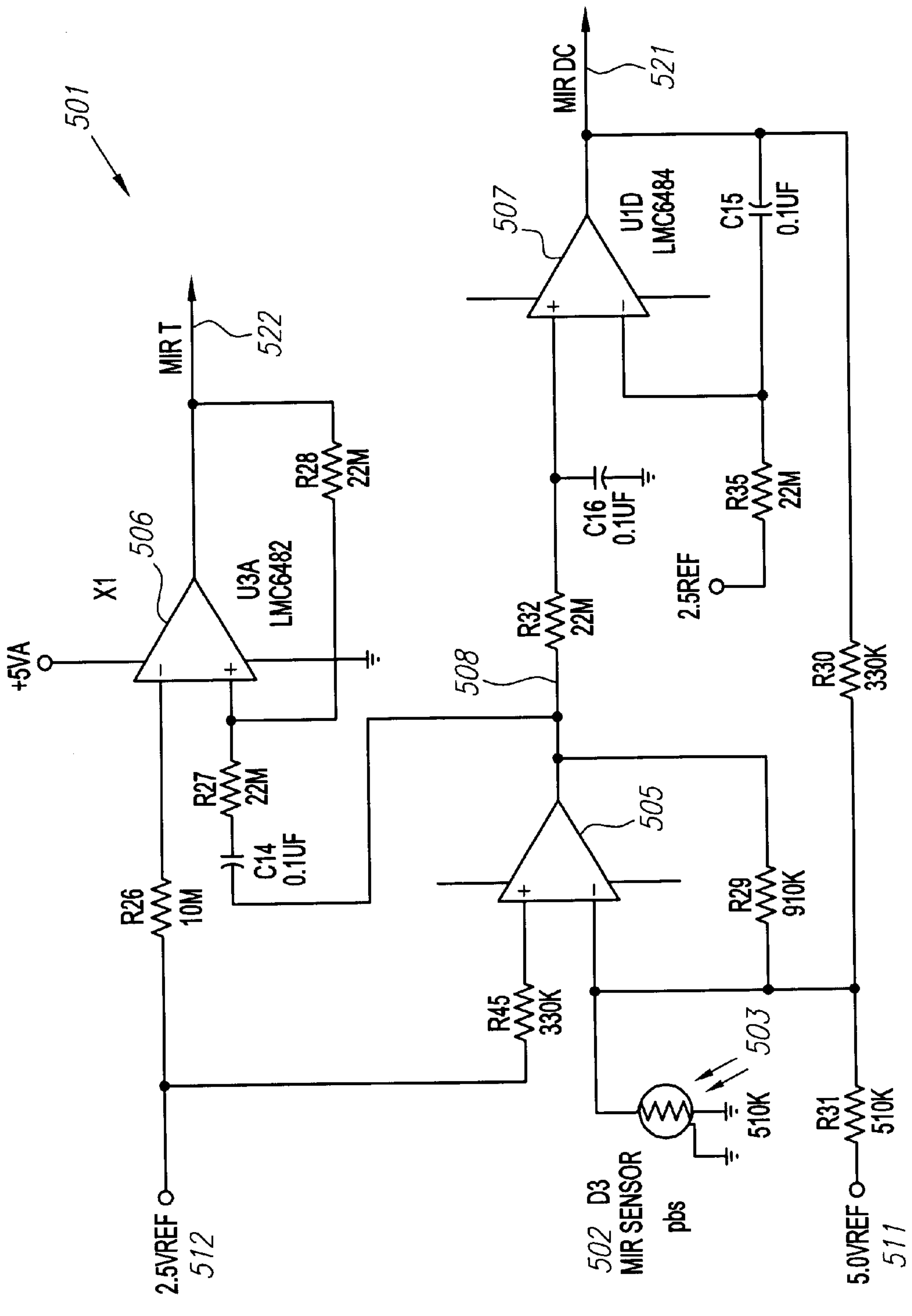
FIG. 34 is a diagram of a circuit for processing a sensor input signal.

FIG. 34 shows a circuit for processing a sensor input signal and, more particularly, a circuit for processing an output from a wide band IR sensor 502 (such as a lead sulfide (PbS) sensor) and generating a first signal 521 indicative of a DC level of the sensor output and a second signal 522 indicative of a transient level of the sensor output. The wide band IR sensor 502 acts similar to a variable resistor, having a resistance that depends on the amount of radiant energy detected in the wide band IR range. The output of the wide band IR sensor 502 is provided to an amplifier 505 which is biased using a 2.5 volt reference signal 512 and a 5 volt reference signal 511 with suitable resistance values as shown in FIG. 3*r*. The amplifier 505 produces a first amplified signal 508 that is low pass filtered by the collective action of resistor R32 and capacitor C16, and then integrated and scaled using amplifier 507 to arrive at a wide band IR DC output signal 521, designated $MIR_{DC}$ herein.

The first amplified signal 508 is also high pass filtered using capacitor C14 and then amplified by amplifier 506, which essentially acts as a buffer, to arrive at a wide band IR transient output signal 522, designated $MIR_T$ herein. The circuit 501 of FIG. 34 thereby outputs both a wide band IR DC output signal 521 and a wide band IR transient output signal 522. It will be understood that the wide band sensor is sometimes referred to in the text and the drawings as "WBIR" and at other times as "MIR", and likewise with the output signal(s) from the wide band IR sensor; however, the designations WBIR and MIR are used interchangeably herein and are not intended to refer to different aspects of the described embodiments.

A circuit similar to the circuit shown in FIG. 34 is provided for processing the output of the near band IR detector and producing two signals indicative of a DC level and transient level, respectively, of the near band IR detector output, except the component values of the elements of the circuit would be altered to match the characteristics of the near band IR sensor as may be readily accomplished by one skilled in the art. Likewise, a circuit similar to the circuit shown in FIG. 34 is provided for processing the output of the visible band detector and producing two signals indicative of a DC level and transient level, respectively, of the visible band detector output, except the component values of the elements of the circuit would be altered to match the characteristics of the visible band sensor.

FIG. 28 shows a wide band IR sensor 302 outputting a wide band IR DC signal and a wide band IR transient signal, a near band IR sensor 303 outputting an near band IR DC signal and a near band IR transient signal, and a visible band sensor 304 outputting a visible band DC signal and a visible band IR signal. Each of the DC and transient signals for the wide band IR sensor 302, near band IR sensor 303, and visible band sensor 304 is sampled and converted into the digital domain by A/D converters 306, 307 and 308, respectively. (In a preferred embodiment, a single A/D converter is shared among all three sensors 302, 303 and 304.)

The A/D converters 306, 307 and 308 output digitally sampled sensor signals 312, 313 and 314, which are designated in FIG. 28 as $MIR_{DC}$, $NIR_{DC}$, and $VIS_{DC}$, respectively, each representing the "raw" DC component of the DC signal from the corresponding sensor 302, 303 or 304. The A/D converters 306, 307 and 308 also output digitally sampled sensor signals 317 and 318, which are designated in FIG. 28 as $MIR_T$ and $VIS_T$, respectively, each representing the "transient" component of the transient signal from corresponding sensor 302 or 304.

The $MIR_{DC}$ signal 312 is provided to a "fast" digital filter 321 and to a "slow" digital filter 322. Likewise, the $NIR_{DC}$ signal 313 is provided to a "fast" digital filter 323 and to a "slow" digital filter 324, and the $VIS_{DC}$ signal 314 is provided to a "fast" digital filter 325 and to a "slow" digital filter 326. In each case, the "fast" digital filter has a relatively fast time constant, and the "slow" digital filter has a relatively slow time constant. In each case, the slow digital filter outputs a slow filtered signal that (with adjustment or correction, in some cases) is used as a "baseline" for comparison against a fast filtered signal that is output from the fast digital filter. The "fast" digital filter and "slow" digital filter may each comprise a low pass filter, with the low pass filter of the "fast" digital filter having a higher cutoff frequency than that of the "slow" digital filter.

Figure 29:
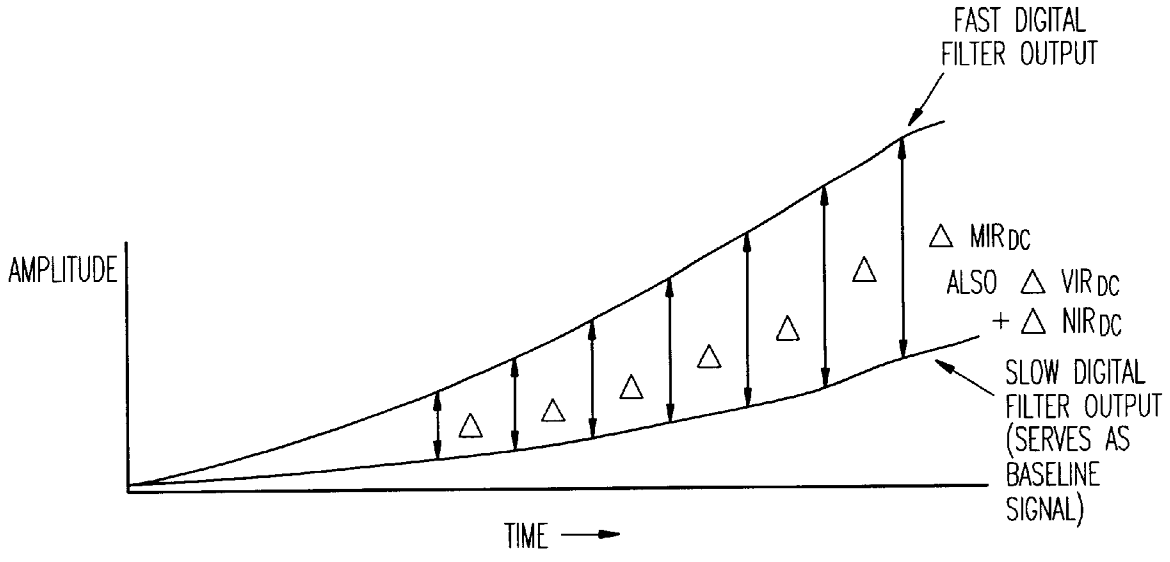
FIG. 29 is a graph showing filtered sensor outputs after processing through two filters with different time response characteristics.

Subtractors 332, 333 and 334 operate to generate comparison signals between the fast filtered signal and the slow filtered signal for each of the digitized sensor signals, with the adjustments as noted below. FIG. 29 is a graph illustrating the output of any one of the subtractors 332, 333 or 334. At predetermined intervals of time (although it may be done continuously as well), the slow filtered signal is subtracted from the fast filtered signal to arrive at a difference signal designated as ΔMIR, ΔNIR and ΔVIS for subtractors 332, 333 and 334, respectively. In essence, the slow filtered signal represents a steady state or DC baseline for comparison, and the fast filtered signal represents a more rapidly occurring change in the radiant energy detected by the particular sensor. The difference signals ΔMIR, ΔNIR and ΔVIS therefore represent the change in radiant energy for each of the particular energy bands with respect to a measured baseline that varies gradually over time.

Figure 30:
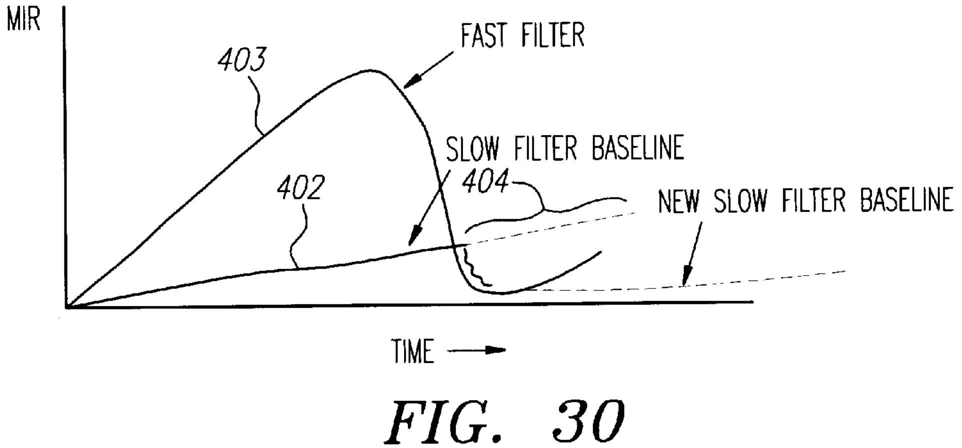
FIG. 30 is a graph showing a compensation made to a slow filter output of the wide band IR sensor.

In two situations the output of a slow or fast digital filter is adjusted prior to being applied to a substractor. First, a compensation is made in compensation function block 328 to the output of the slow digital filter 322 of the wide band IR sensor input. In compensation function block 328, the output of the slow digital filter 322 is forced to the same value as the output of the fast digital filter 321 if the output of the fast digital filter 321 is less than the output of the slow digital filter 322. This effect is illustrated in FIG. 30, which is a graph showing a plot of a slow filter output signal 402 and a fast filter output signal 403. The dotted line portion 404 indicates what the output of the slow filter would have been without the compensation provided by the compensation function block 428, and is present where the output of the fast digital filter 321 is less than the output of the slow digital filter 322. The output of compensation function block 428 is sent to the subtractor 332.

One purpose of compensation function block 428 is to ensure the output of subtractor 332 will always be positive, which will ensure proper monitoring where a fire suddenly loses energy (such as where it is doused with fire suppressant) or else a source of wide band IR radiant energy is removed from the view of the WBIR (or MIR) sensor. Thus, the fire detector will be able to more easily determine if a temporarily suppressed fire is going to self-extinguish or is starting to regrow, in which case further treatment may be required.

A second compensation is made in compensation function block 329. This second compensation function block 329 is connected to the output of the fast digital filter 325 associated with the visible band sensor input and can be used to reject false alarm sources such as flashlights. Compensation function block 329 provides the equivalent of a peak detection function which holds the output of the fast digital filter 325 at its peak and thereafter allows it to steadily decline. The compensation function block 329 may be realized as an asymmetrical digital filter with a fast rise time and slow decay time.

Figure 31:
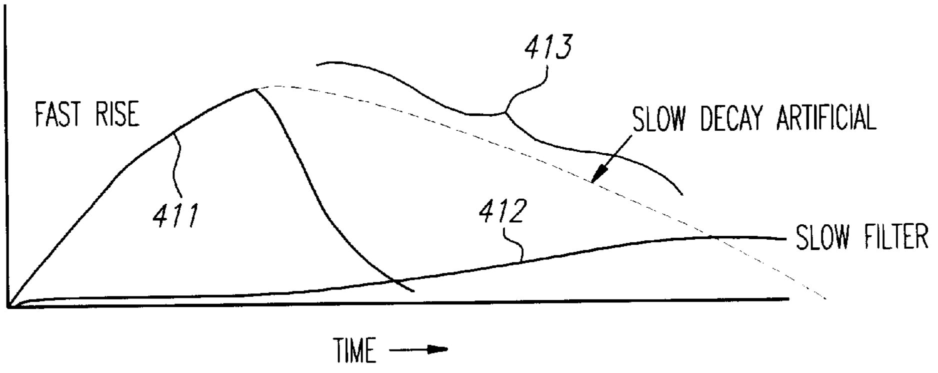
FIG. 31 is a diagram illustrating the effect of asymmetrical digital filtering on the visible band sensor output for the purpose of rejecting certain false alarm sources such as a flashlight.

FIG. 31 is a graph illustrating the effect of asymmetrical digital filtering on the fast digital filter output of the visible band sensor. In FIG. 31, a plot of the fast digital filter output signal 411 is shown along with a plot of the slow digital filter output signal 412. The dotted line portion 413 indicates the output of the fast digital filter after asymmetrical filtering carried out by the compensation function block 329. As can be seen in FIG. 31, the signal after asymmetrical filtering decays more slowly than the actual output of the fast digital filter. By such asymmetrical filtering, the fire detector in essence creates an "artificial" visible light that lingers when an actual visible light is shut off. In this manner, false alarms caused by flashlights or other man-made electrical or battery light sources can in many instances be avoided. The output of the compensation function block 329 (referred to as the "flashlight rejection" algorithm) is provided to subtractor 334.

The output of subtractor 332 (associated with the wide band IR sensor input signal) is connected to a temperature coefficient block 341 which adjusts the difference signal ΔMIR by a coefficient to compensate for ambient temperature fluctuations. This compensation is made where, for example, a lead-sulfide (PbS) based wide band IR sensor is used, because such sensors are sensitive to temperature variations. The near band IR sensor and visible band sensor may be constructed of silicon, and therefore, on the other hand, would be largely temperature independent.

The temperature compensated difference signal $M\Delta_T$ is compared against the difference signal relating to the visible band sensor. However, because the visible band sensor input signal and wide band IR input signal are in terms of different units, a unit conversion adjustment is made to the visible band difference signal ΔVIS in unit conversion function block 342. The temperature compensated difference signal $M\Delta_T$ is thus compared by use of a subtractor 345 against the unit converted visible band difference signal $V\Delta_C$, to arrive at a compensated energy value $M\Delta_T'$ which generally provides an indication of wide band radiant energy less visible radiant energy, with the adjustments for certain false alarm sources as noted above.

The near band IR difference signal ΔNIR output from subtractor 333 is used to set a threshold for comparison against the compensated energy value $M\Delta_T'$. The output of subtractor 333 is applied to a threshold value lookup table 347 (which may be stored, for example, in non-volatile RAM). The threshold value output from the threshold lookup table 347 preferably changes as a step function of ΔNIR, with a change in ΔNIR leading to a proportional change (usually a fractional change) in the selected threshold value output from threshold value lookup table 347.

The compensated energy value $M\Delta_T'$ is compared against the selected threshold value $M_{TH}$ by a subtractor (or comparator) 350. A response function block 360 monitors the output of the subtractor 350 and declares a suitable early warning, alert or alarm condition in response to the compensated energy value $M\Delta_T'$ exceeding the selected threshold value $M_{TH}$, indicating that a certain "dangerous" or potentially dangerous amount of radiant energy has been detected.

Figure 32:
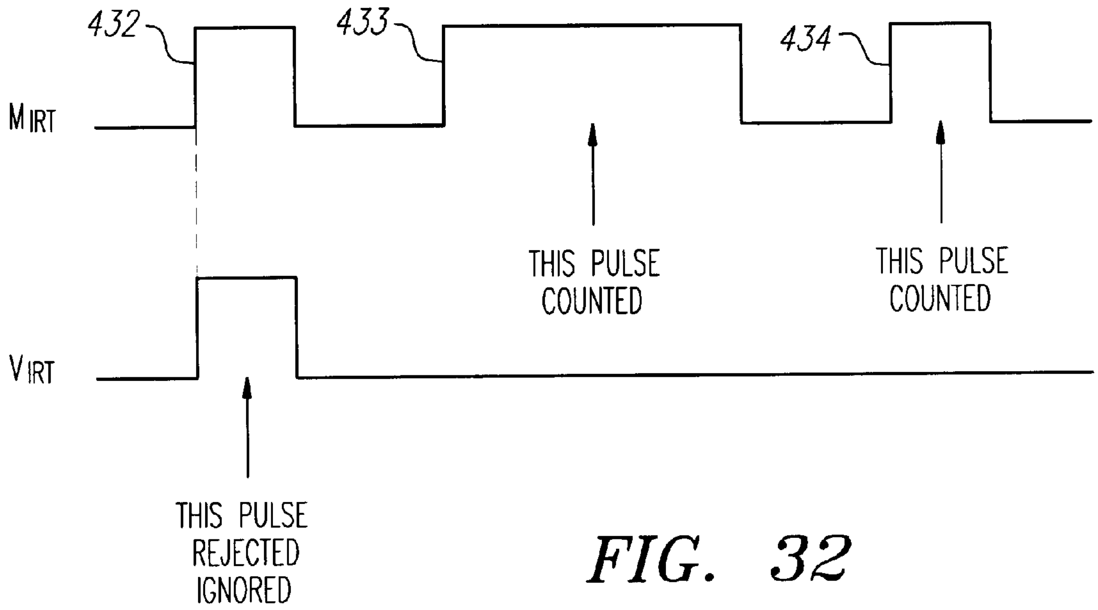
FIG. 32 is a diagram illustrating operation of a flicker detection algorithm for rejection of other false alarm sources.

The response function block 360 preferably makes a response decision based not only on the output of subtractor 350, but also on certain false alarm rejectors that are built in to the system. Two particular such false alarm rejectors are shown in FIG. 28. First, a flicker pulse count detector 352 is utilized to provide an indication that the radiant energy source is flickering or pulsating in a "chaotic" manner typical of uncontrolled or growing fire sources. FIG. 32 is a diagram illustrating operation of a flicker detection algorithm in accordance with various aspects of the present invention. According to a preferred flicker detection algorithm, a "flicker" is detected by comparing positive transitions in the digitized transient wide band IR signal ($MIRT_)$ 317 against positive transitions in the digitized transient visible band signal ($VIS_T$) 318. Each positive transition of the digitized transient wide band IR signal 317 is counted as a "flicker", unless the digitized transient visible band signal 318 also has a positive transition at about the same time.

If both of the digitized transient wide band IR signal 317 and the digitized transient visible band signal 318 have a positive transition at about the same time (within a certain programmable tolerance), then the event is not deemed a "flicker," regardless of how wide the respective pulses turn out to be. Thus, in FIG. 32, a first pulse (positive transition) 432 in the digitized transient wide band IR signal 317 is not counted as a valid flicker event, but a second pulse (positive transition) 433 and a third pulse (positive transition) 434 are counted as valid flicker events.

According to the false alarm rejection technique embodied in the flicker pulse count detector 352, a certain number (e.g., two) of valid flicker pulses must be counted in each consecutive time frame (e.g., two seconds) (which may, if desired, be a sliding time frame) or else the flicker pulse count detector 352 outputs a value of "FALSE" indicating that the detected energy pattern does not appear to conform to an uncontrolled or growing fire situation. If, on the other hand, the flicker pulse count detector 352 detects at least two valid flicker pulses in each consecutive time frame, and if it does so for a predetermined number of consecutive time frames (spanning, e.g., ten seconds), then the flicker detection algorithm is satisfied and the flicker pulse count detector 352 outputs a value of "TRUE," indicating that the detected energy pattern could be caused by an uncontrolled or growing fire.

The above process performed by the flicker pulse count detector 352 is known as flicker pulse count aging because it monitors the flickering nature of the detected radiant energy over time. If the flickering is not maintained for a sufficient amount of time (e.g., ten seconds), then the flicker pulse count detector 352 provides an indication that the energy source may not be an actual fire for which a responsive action is advisable. In one aspect, the flicker pulse count detector 352 may be viewed as applying a digital bandpass filter that outputs a "TRUE" value when valid flickers occur within a certain rate range.

In addition to the flicker pulse count detector 352, another false alarm rejector is a wide band IR peak energy pulse detector 353 that serves to weed out false alarm sources producing wide band IR energy of a steadily growing nature such as industrial ovens. As shown in FIG. 28, the digitized transient wide band IR signal ($MIR_T$) is provided to a "fast" digital filter 319 and a "slow" digital filter 320, in a manner analogous to the digitized DC wide band IR signal ($MIR_{DC}$). The output of the "fast" digital filter 319 and the "slow" digital filter 320 are sent to the wide band IR peak energy pulse detector 353, which qualifies a fire by looking for a narrow peak in the transient wide band IR signal.

Figure 33:
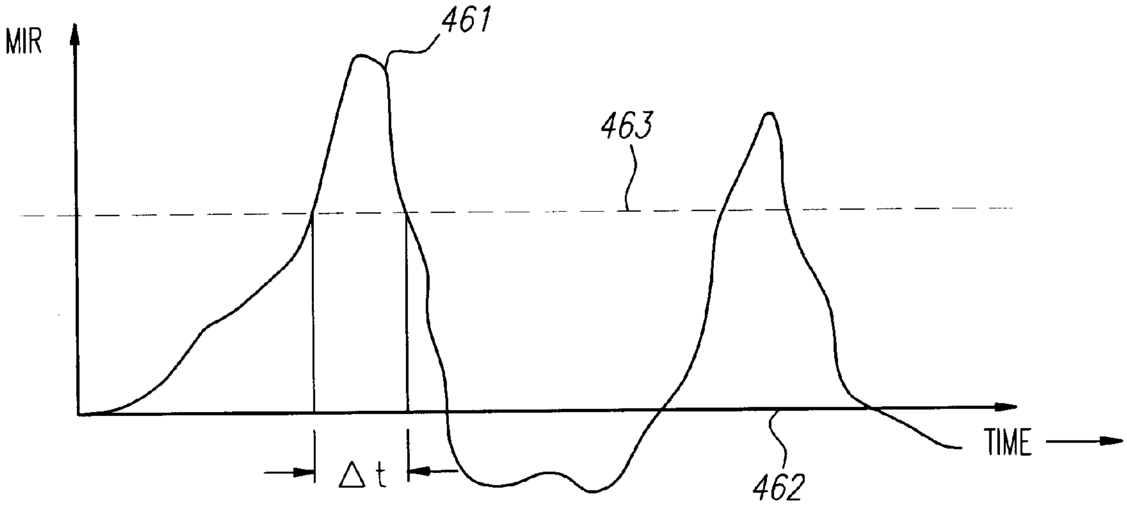
FIG. 33 is a diagram illustrating an algorithm for rejecting false alarm sources such as industrial ovens.

FIG. 33 is a diagram illustrating a wideband peak energy pulse detection algorithm, and shows a wide band IR fast filter output signal 461 (such as may be output from the "fast" digital filter 319) plotted over time on a graph along with a wide band IR slow filter output signal 462 (such as may be output from the "slow" digital filter 320). FIG. 33 also shows a peak energy pulse detection threshold level 463 that varies over time such that it remains a preset amount above the slow filter output signal 462.

Each time the wide band IR fast filter output signal 461 exceeds the peak energy pulse detection threshold level 463, the amount of time it spends above the peak energy pulse detection threshold level 463 is measured to arrive at a peak pulse width Δt. If the peak pulse width Δt is "narrow"—i.e., less than a predefined narrowness criteria, then the peak is deemed a "valid" narrow peak. If a valid narrow peak has occurred within a predetermined amount of time (e.g., two seconds), then the wide band IR peak energy pulse detection algorithm has been satisfied, and the wide band IR peak energy pulse detector 353 outputs a "TRUE" value indicating that the detected wide band IR energy may conform to an uncontrolled or growing fire. Otherwise, the wide band IR peak energy pulse detector 353 outputs a "FALSE" value.

The wide band IR peak energy pulse detector 353 operates under the assumption that uncontrolled or growing fires tend to have rapid or narrow spikes of broadband radiant energy, and that such spikes of broadband radiant energy can be observed using the wide band IR sensor. Thus, wide band IR energy profiles that fail to display such characteristics are assumed to be related to non-fire or controlled fire sources. The wide band IR peak energy pulse detector 353 need not be used in all fire detection applications and may, for example, be employed only when the fire detector is placed in any environment having sources of wide band IR radiant energy such as industrial ovens.

Referring again to FIG. 28, the response function block 360 makes a response decision based on the output of subtractor 350, as well as the flicker pulse count detector 352 and the wide band IR peak energy pulse detector 353 if those false alarm rejectors are employed. If the subtractor 350 indicates that the compensated energy value $M\Delta_T'$ exceeds the selected threshold value $M_{TH}$, then a certain amount of dangerous or potentially dangerous radiant energy has been detected. The response function block 360 then, if desired, uses the outputs of the flicker pulse count detector 352 and the wide band IR peak energy pulse detector 353 to weed out false alarms. For example, the response function block 360 may require that both the outputs of the flicker pulse count detector 352 and the wide band IR peak energy pulse detector 353 be "TRUE" in order to declare a certain status level, such as an "ALARM" situation calling for an appropriate response.

In addition, the fire detector may be provided with a second threshold level ($M_{TH2}$) against which the compensated energy value $M\Delta_T'$ is compared, in order to support various types of multi-stage responses. In this manner, the fire detector can have a threshold value corresponding to different energy levels, such as 3 kW and 13 kW, for example. The second threshold level may be implemented by using a second threshold lookup table (which can be integrated with the first threshold lookup table) and a second subtractor connected to the second threshold level $M_{TH2}$ and to the compensated energy value $M\Delta_T'$.

The response function block 360 may or may not use the false alarm rejectors for arriving at a fire detection decision. For example, it may be desired to program the fire detector to respond rapidly to a 3 kW fire. In such a case, the response function block 360 could issue an appropriate response by observing when the compensated energy value $M\Delta_T'$ exceeds the threshold level of 3 kW, while disregarding the outputs provided by the flicker pulse count detector 352 and the wide band IR peak energy pulse detector 353. The response function block 360 may be programmed to provide a different type of response to a 13 kW fire. In such a case, the response function block 360 may be programmed to observe not only when the compensated energy value $M\Delta_T'$ exceeds the second threshold level of 13 kW, but also to issue a response only when the outputs provided by the flicker pulse count detector 352 and the wide band IR peak energy pulse detector 353 are also both TRUE.

In addition, the fire detector could be provided to circuitry analogous to that shown in FIG. 28 for processsing the digitized transient wide band IR signal 317 and comparing the detected transient wide band IR energy to a threshold level (such as 3 kW), after compensation for the transient visible band energy in a manner similar to that shown for the DC wide band IR and visible band signals in FIG. 28.

In an alternative embodiment, mathematical techniques such as Fast Fourier Transforms (FFT's) are used to separate the temporal radiant energy spectral response of the WBIR, NBIR, and VB spectra into the individual Fourier components, thereby transforming the spectral radiant energy received as a function of time into a representation of radiant energy received as a function of frequency. By subtracting the individual frequency components of the nonfire sources from the individual frequency component of a real fire, a compensated energy level can be obtained, which is then used to eliminate potential false alarm sources as described above.

In more detail, FFT's can be used to obtain individual Fourier components for each of the WBIR, NBIR and VB sensors at each a plurality of predetermined frequencies (such as 2, 5, 7 and 10 Hertz, for example). The magnitudes of WBIR frequency components are compared for each of the predetermined frequencies against the magnitudes of the VB frequency components, to arrive at a first set of energy level comparison values. Similarly, the magnitudes of WBIR frequency components are compared for each of the predetermined frequencies against the magnitudes of the NIR frequency components, to arrive at a second set of energy level comparison values. The first set of energy level comparison values and second set of energy comparison values may be applied to a lookup table to determine whether the profile matches that of a fire or potential fire situation.

Use of a wideband IR sensor as the primary sensor realizes several benefits, particularly where use of a UV sensor is eliminated. First, the fire/flame detector may be housed in a self-contained, low-cost plastic, polypropylene, Teflon or fiberglass housing, whereas UV-based sensors require relatively expensive sapphire or quartz window lenses. Being able to use such a housing also eliminates problems found in UV-based sensors relating to sealing the UV sensor window. A similar advantage may be experienced over narrow band IR sensors. Because impurities in the housing material can have a significant impact on the quality of detection of a narrow band IR sensor, materials such as polypropylene, Teflon or plastic may be unacceptable for use as a housing and/or window with such narrow band IR sensors, but will, in contrast, have far less impact on a wide band IR sensor which does not rely on one narrow IR band or a few narrow bands for fire detection.

As another significant benefit, a WBIR-based fire/flame detector according to the present invention can detect most any type of hydrocarbon (propane, butane, gasoline, etc.) and nonhydrocarbon-based fires (such as silane, hydrogen, sodium azide, etc.). In contrast, narrow band IR detectors typically only look for the $CO_2$ spike emission line output centered at approximately 4.3 microns, which is best generated by a well-oxygenated, clean-burning, hydrocarbon fire (such as a propane flame). UV-based sensors are subject to "blindness" caused by cold $CO_2$ suppressant gas and/or black smoke generated by a polypropylene fire. Such detectors can also be blinded by chemicals, acetones, vapors and gases in the atmospheres, or by contaminants that foul the window lens such as oil, paint residue (e.g., liquid and powder), dirt, etc. With WBIR as the primary sensor, the fire/flame detector can "see through" most contaminants because the longer infrared wavelengths of WBIR can penetrate them, with the exception of certain contaminants such as thick black paint, or thick layers of contaminants.

In addition, a wide band IR sensor can have a significantly improved field of view over a narrow band IR sensor. Narrow band IR sensors require relatively precise filtering (such as may be carried out by a Fabry-Perot filter) tuned by the thickness of a material used in the sensor. When an energy source (such as a fire) is located at an angle to the narrow band IR sensor, the radiant energy emitted by the source strikes the sensor material at an angle and travels through a greater amount of the sensor material. This results in a distortion that makes the radiant energy appear to be located at a different wavelength than it actually is, and can cause a narrow band IR sensor to fail to detect a fire. Conventional narrow band IR sensors avoid this problem by maintaining a relatively tight field of view, such as 90°, for the sensor. A wide band IR sensor, on the other hand, can detect fires while having a 120° or even greater field of view.

Using wide band IR can reduce maintenance problems because frequent, costly, manual window-lens cleaning of the UV lens can be eliminated. The flame/fire detector can also be made more rugged, reliable, and trouble-free without a UV sensor, which is typically made of UV transmitting glass or quartz.

As an additional benefit to relying on wideband IR as the primary sensory input, the need for UV "through the lens" testing is eliminated. Each UV test source generally requires extra circuitry, which is usually high-voltage circuitry that can be susceptible to reliability problems. Such high-voltage circuitry is unnecessary where no UV sensor is used.

It will be understood that while a preferred embodiment is described with respect to use of three sensors (i.e., a visible band sensor, a nearband IR sensor, and a wideband IR sensor), other sensor arrangements can be used to obtain the same or equivalent results. For example, a fire/flame detector may use a number of sensors each operating over a distinct narrow energy band range, and sum up the sensor outputs so as to obtain an indicia of total blackbody energy. While such a design would be more complicated due to the greater number of sensors, the same principles of fire/flame detection as previously described would apply to such a configuration.

In accordance with a particular embodiment as illustrated in FIG. 11, sensor data is A/D converted and the resulting digital data is transmitted to the controller 39. The controller 39 analyses the sensor digital data and determines if there is any sign of sparks, flames, or fire. Upon detecting an "alert," a "fire early warning," or an "alarm" condition, the controller 39 selectively triggers one or more of three individual relays within an alarm unit 56 (one-, two-, or three-stage). In accordance with one embodiment, a three-stage version of the multi-stage alarm unit 56 comprises an "alert" relay 58, a "fire early warning" relay 60, and an "alarm" relay 62. Alternatively, in accordance with another embodiment, a two-stage version of the multi-stage alarm unit 56 comprises only the "alert" relay 58 and the "alarm" relay 62. Each of the relays may be coupled to distinctive LED indicators, audible alarms, or the like.

In accordance with one approach, the controller 39 compares the sensor digital data against programmed threshold values (of characteristics of fire signatures or false alarm models), to determine if the observed data indicates a cause for concern. The controller 39, upon detecting characteristics that warrant an "alert" condition, triggers the "alert" relay. Likewise, the controller 39, upon detecting characteristics that warrant a "fire early warning" condition (in the three-stage embodiment) or an "alarm" condition, triggers either the "fire early warning" (in the three-stage embodiment) relay 60 or the "alarm" relay 62. The appropriate relay may in turn trigger an associated LED indicator or audible alarm. A timer 64 is set in every instance to either reject false alarm situations or allow the flame or fire sufficient time to self-extinguish. Only upon detecting an "alarm" condition, and that also after a predetermined time limit, are the suppression agents activated.

In accordance with the general operation, the present system typically observes a fire in as little as 16 milliseconds (but can be less than one millisecond), then verifies the fire condition multiple times to ensure its existence. Following this exercise, the system (in the three-stage alarm embodiment) declares a "fire early warning" condition. For example, if the fire is a spray gun fire, the present system declares an "alert" condition to cause shutdown of the spray gun paint flow, electrostatics, and conveyor 16. The present system continues to monitor the fire condition during a predetermined limit of time to allow it to self-extinguish. In the event the fire persists, the system declares an "alarm" condition and activates release of suppression agents to quell the fire.

Alternatively, the system (in the two-stage alarm embodiment) looks for any sign of fire (small) and reports it so that personnel on the monitored facility can immediately respond to it. If the fire continues to grow, the system activates the "alarm" condition to activate release of the suppression agents to quell the fire.

The following discussion relates to a preferred embodiment, in which multiple levels of responses are provided for different responsive actions in the optical fire/flame detector based upon both the type of fire and the radiant wide band continuous spectral output of the fire. There are different types of fires, including explosive fires; fast-burning, "fireball" fires; slow-burning, flickering fires; large, growing fires; etc. Different kinds of responsive actions may need to be taken depending upon the type of fire.

In a particular embodiment, WBIR is used as the primary sensor in a multispectral sensor array of an optical fire/flame detector with digital signal processing in the electrostatic finishing industry. In this industry, spray guns are used to apply paint coatings in an electrostatic paint line or booth. Such spray guns apply approximately 100,000 volts to the atomized paint (e.g., liquid or powder). Because of the possibility of a malfunctioning spray gun or an improperly grounded part, arcing can occur, which can quickly ignite the paint mist, resulting in a "fireball"-type fire. The majority of the time, if the fireball is detected within one-half second and the paint flow and electrostatics are immediately shut down, the fire will self-extinguish. In a paint line or booth, paint mist accumulates on the detector's window lens, even with air shields. While this might blind a UV sensor, the preferred WBIR-based fire/flame detector is far less affected by accumulated paint.

In another preferred embodiment, WBIR is used as the primary sensor in a multispectral array including NBIR and VB sensors and digital signal processing in semiconductor clean-room applications such as, e.g., chemical wet benches. An acid-proof, plastic housing can be used because WBIR (and NBIR and VB) can see through the plastic integral window, allowing all types and classes of hydrocarbon and nonhydrocarbon fires to be detected.

By way of example, the following are different responsive actions for different types of fires: For an explosive type fire, the action taken could be to signal for the release of a high-speed water jet in several milliseconds in order to suppress the explosive fire. In a "fireball" fire, such as occurs, e.g., in a paint-booth spray-gun fire, the action taken is usually to shut off the paint flow and the electrostatic high-voltage supply to the spray gun, which will usually self-extinguish the fireball. For a slow-burning, flickering fire, such as a solvent rag burning in a paint spray booth or a solvent fire in a polypropylene chemical wet bench, the action may be to warn the operator with lights and/or sound annunciators only, as a suppression release would be premature and could damage costly product. For a large, growing fire, the action may be to warn the operator with annunciators and signal for a release of suppression agent. Also, different types of suppression agent may be released depending upon the type of fire.

Another type of multilevel response to a fire is illustrated by the following example. Suppose a small, solvent rag ignites spontaneously in an automatic paint spray booth. The preferred, multilevel-response optical fire/flame detector detects the slow-burning, small flickering fire and signals a first-stage-level response (such as "Fire Early Warning" stage). The first-level response signals strobe lights and audio annunciators to warn the operator. No suppression agent would be released at the first level, as the fire might self-extinguish or be extinguished manually with a portable extinguisher, thereby averting a costly cleanup and process shutdown. Also, as discussed below, the preferred detector can record the spectral history of the first-level fire to aid in diagnosing the cause of the fire, especially if it should self-extinguish without being discovered.

If the fire were to ignite the paint overspray and generate a fireball fire, the second-stage level would be declared ("Alert" stage), which could be to shut down the paint flow and electrostatics to the spray guns. If the fireball did not self-extinguish, and instead ignited the paint residue on the booth floor and began growing into a larger, dangerous fire, the preferred, multilevel optical fire detector would sense the radiant output (using the WBIR sensors) of the fire, and when the fire exceeded a certain energy criteria, would signal for release of suppression agents ("Alarm" stage).

The following is another example of a multilevel response to a fire that is possible in a preferred embodiment. Suppose a solvent chemical leaks inside a semiconductor process wet bench and is ignited by an electrical spark. The preferred, multilevel optical fire detector detects the small, flickering fire, and when it grows to certain criteria (such as, e.g., 3 kW) energy level, a first-stage response level is advantageously declared. The first-level response signals strobe lights and audio annunciators to warn the operator that a hidden fire is occurring inside the wet bench. Also, the detector preferably digitally records the spectral history of the first-level fire, as discussed in greater detail below, to aid in diagnosing the cause of the fire, especially if it should self-extinguish without being discovered. This can assist the operator in future fire prevention.

When a first-level response is declared, the operator has the option of manually extinguishing the fire and/or completing the process, or waiting to see if the fire will self-extinguish because of the limited supply of solvent and/or the high air flow "blowing out" the fire without a costly suppression release. In this regard, it has been estimated that about 80% of wet-bench fires self-extinguish. Allowing the fire a chance to self-extinguish can therefore save many thousands of dollars by avoiding the release of fire suppressants and the consequent negative effects on the materials at the manufacturing site (such as computer chips fabricated on large wet-benches).

If the fire continues to burn, consuming more solvent fuel, and rises in temperature to ignite the polypropylene bench material, the preferred multilevel detector will signal a second-stage response when the fire's energy level reaches a preset level (such as, e.g., a 13 kW energy level threshold), which will cause activation of lights and/or sound to alert the operator, and the second-stage response will signal for a suppression release. The preferred WBIR detector is capable of "seeing through" the suppression agent and continuing to signal for suppression until the fire is extinguished. Should the fire "reflash" later, the WBIR detector can again respond.

The fire detector may make response level declarations based on radiant energy output and fire signal characteristics, in addition to using temporal information such as the relative rate of growth or periodic fluctuations of the energy level in each of the observed spectral bands. Once the fire has been detected, spectral data from the fire (including the time period just before the fire detection) can be digitally recorded and analyzed at a later time.

In accordance with another feature of the present invention, the microcomputer (otherwise referred to as controller or microprocessor) 36 and the controller verify proper operation of each other, and upon detecting any sign of failure, trigger the fault relay 66.

In a preferred embodiment, a real-time graphical display of the digital sensor data detected by the flame detector 32 is generated and viewed at a "SnapShot™" display 68. The digital sensor data is represented in the form of relative spectral intensities versus present time. The "Snapshot" display is preferably viewed with an IBM compatible personal computer (with an RS-232 interface port). An associated memory (RAM) 68*a* may store a particular display.

Figure 18:
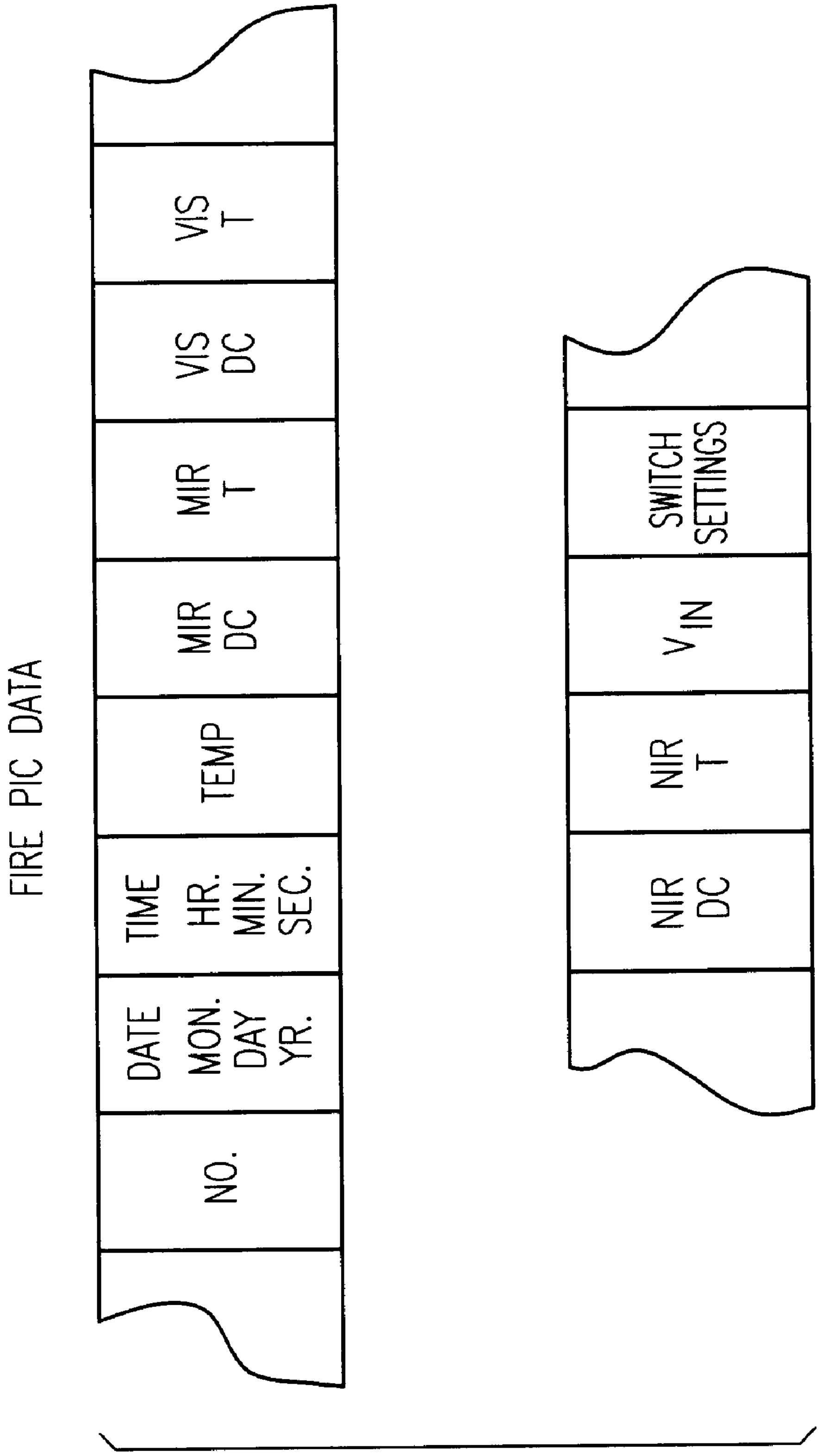
FIG. 18 is an illustration of a record and fields of data that may be stored upon occurrence of a fire.
Figure 19A:
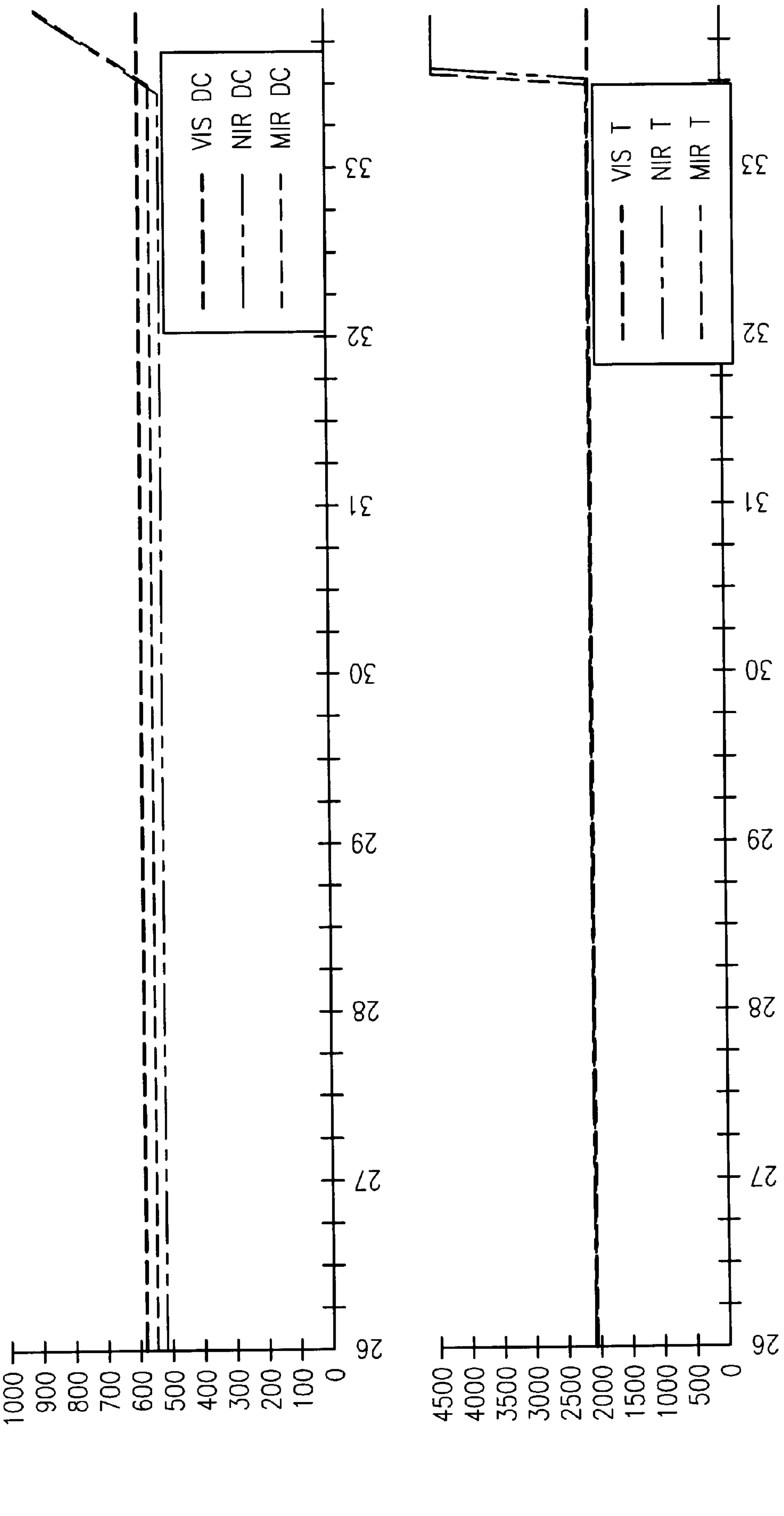
FIG. 19*a* is an exemplary fire signature which upon observation would result in an “alert” condition being declared.
Figure 20A:
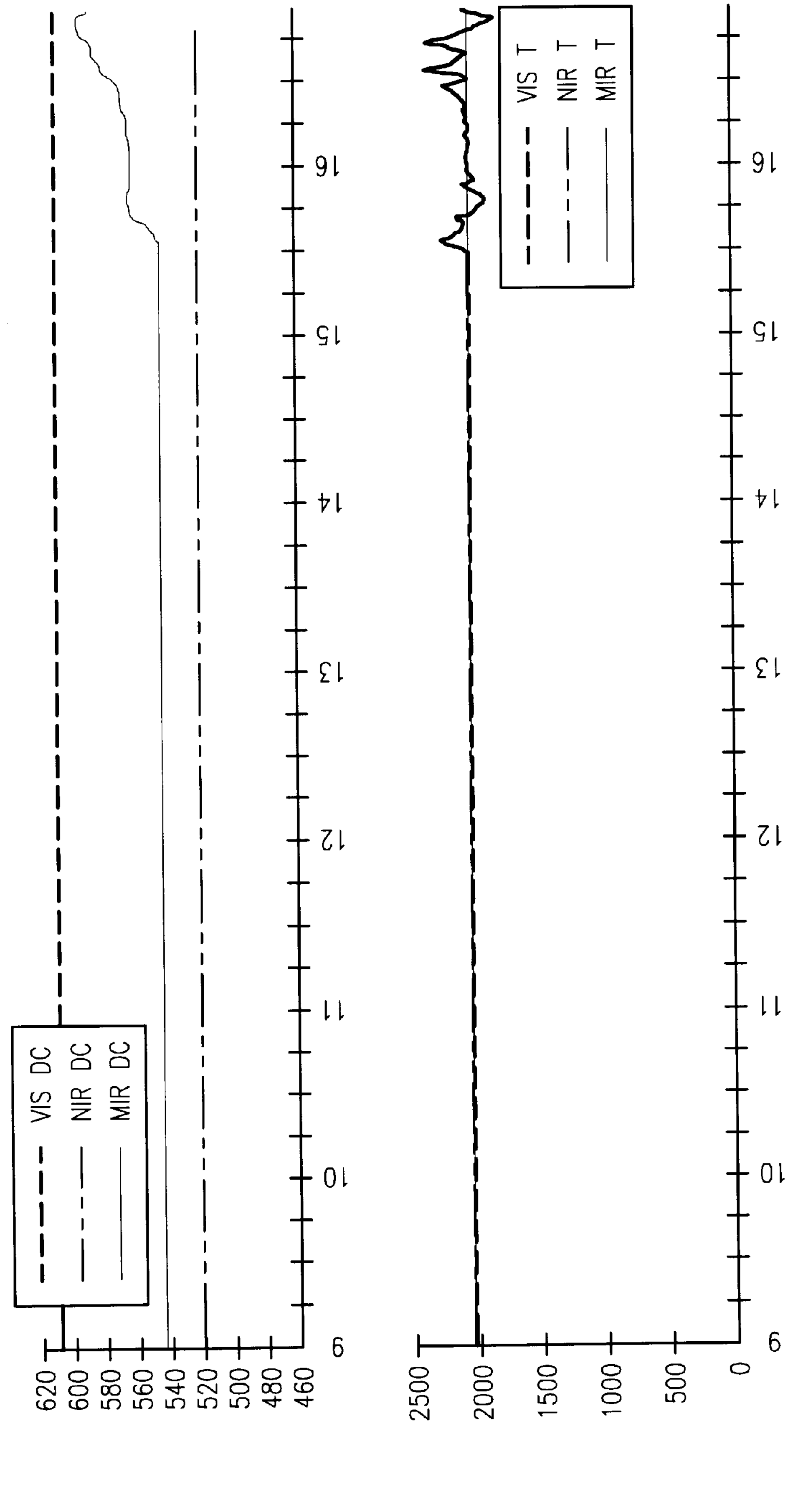
FIG. 20*a* is an exemplary fire signature which upon observation would cause a “fire early warning” condition to be declared.
Figure 21A:
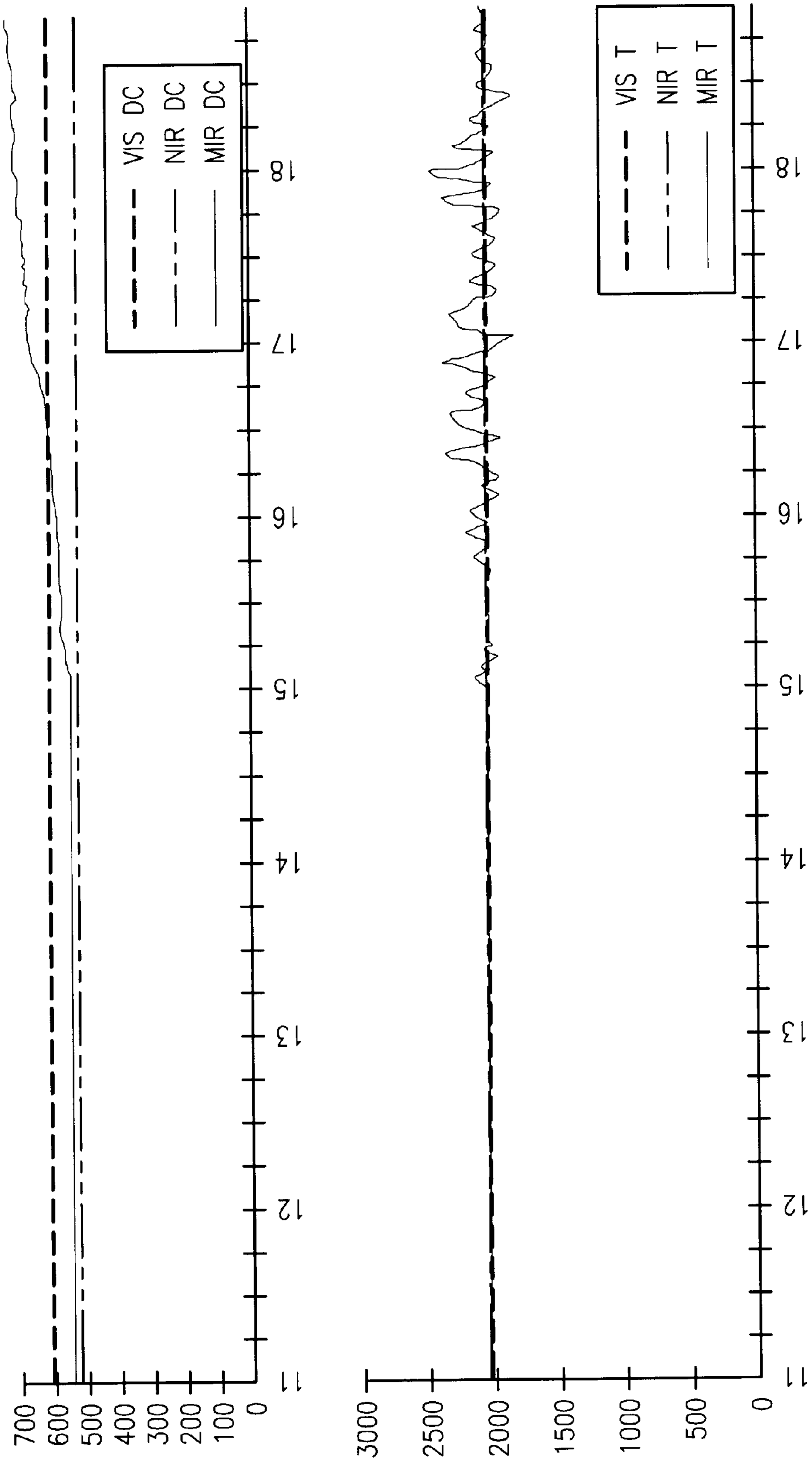
FIG. 21*a* is an exemplary fire signature which upon observation would cause an “alarm” condition to be declared.

A "FirePic™" generator 70 facilitates retrieval of sensor spectral data stored prior to an occurrence of fire. A graphical display of relative spectral intensities versus time preceding the fire provides evidence to enable analysis and determine the true cause of the fire. The "FirePic" data may be stored, for example, in a non-volatile RAM 72. As indicated in FIG. 18, the "FirePic" data may indicate a "FirePic" number and data such as the date, the time, the temperature, the $MIR_{(DC\ and\ T)}$, $NIR_{(DC\ and\ T)}$, and $VIS_{(DC\ and\ T)}$ readings of sensor signal data, the input voltage, and the control switch settings. FIGS. 19, 20, and 21 indicate "alert," "fire early warning," and "alarm" events relating to exemplary fire signatures. FIG. 19*a* represents an exemplary fire signature that would trigger the "alert" relay 58. FIG. 20*a* represents an exemplary fire signature that would trigger the "fire early warning" relay 60. FIG. 21*a* represents an exemplary fire signature that would trigger an "alarm" relay 62. A printout of a graphical display (from the "FirePic" generator, or the "SnapShot" display, or of fire signatures) may be obtained with a printer 76.

In more detail, the spectral data of the optical fire/flame detector—i.e., the digitally converted output values from the visible band (VIS), near band IR (NIR) and wideband IR (WBIR or MIR) sensors—can be digitally recorded (with or without other digital processing information such as parameter settings, etc.) immediately prior to a fire and/or during a fire. The digitized sensor data is maintained in a circular buffer, so that the most recent sensor data over a predefined time period (e.g., eight seconds) is held at any given time. When a detection event occurs, the controller 39 determines that a recording will be made, at which time the data stored in the circular buffer is transferred to a location in a nonvolatile memory.

The type of nonvolatile memory may comprise, for example, a CMOS RAM backed with a lithium battery and shutdown logic, or an SRAM combined with a "shadow" EEPROM (electrically erasable programmable read only memory). Such nonvolatile RAM memory can offer years of storage life in the absence of external power. In addition to storing sensor data in the nonvolatile memory, detection events and parameters may also be recorded, including warning status level. The stored data may then be used for post-fire event analysis. Such data can be used to help determine the cause of the fire and measures can be taken to ensure that the fire does not recur in the future.

While an EEPROM-based system may be used, use of other types of nonvolatile memory provides several advantages over an EEPROM based system. While it is possible to continuously write to volatile RAM during a fire event and, after the fire event is over, store the data in the EEPROM, this is a relatively time consuming process (taking several seconds). Should the fire event cause the electrical power to be interrupted or reset, the stored sensor data is likely to be lost before transfer to the EEPROM is complete. Also, if after a fire event, an operator uses a match, butane lighter, or handheld tester to make sure the detector is working properly, the real fire data in volatile RAM can be overwritten with useless test data.

Thus, in a preferred embodiment, spectral data of the fire/flame detector is stored in nonvolatile, battery-backed RAM, which records substantially faster (i.e., in a matter of milliseconds) than an EEPROM. A large-capacity nonvolatile RAM is preferably used, so that multiple fire events can be stored, each with a predefined amount of data (e.g., eight seconds of data). Moreover, the time and date of each event can be stored, thereby enabling discrimination between real fire data and test data after a fire event. Preferably, added to each data package is more signal processing data including parameters such as, for example, and indication of which warning, alert or alarm stages were declared in the multilevel-response optical fire detector.

The controller 39 initially and routinely after preselected periods of time, such as every ten minutes, performs diagnostic evaluation or tests on select system components, such as checking for continuity through the relay coils, checking to ensure that the control settings are as desired, and so on. Upon detecting some cause for concern, the diagnostic test relating to the area of concern may be performed every thirty seconds or any such preselected period of time. It should be understood that any or all the parameters including reaction times, etc., may be programmed to address particular requirements. A digital serial communication circuit 69 (see FIGS. 11 and 12) controls serial connections of one or more of a plurality of flame detectors 32 to the controller 39 to ensure clear communication through the otherwise noisy environment.

Referring now to FIG. 12, in accordance with an alternative embodiment of the present system, the microprocessor 36 located within the flame detector 32 itself processes all the sensor digital data to determine the nature of the prevailing condition and triggers an appropriate one of the multistage (e.g., two- or three-stage) alarm unit 56. In this embodiment only the “SnapShot” display 68 and its associated memory 68*a* is located external to the detector component 32. The digital communication serial circuit 68 controls serial connections of one or more of a plurality of flame detectors 32 to any peripheral devices such as the printer 76, “SnapShot” display 60, etc.

Figure 22:
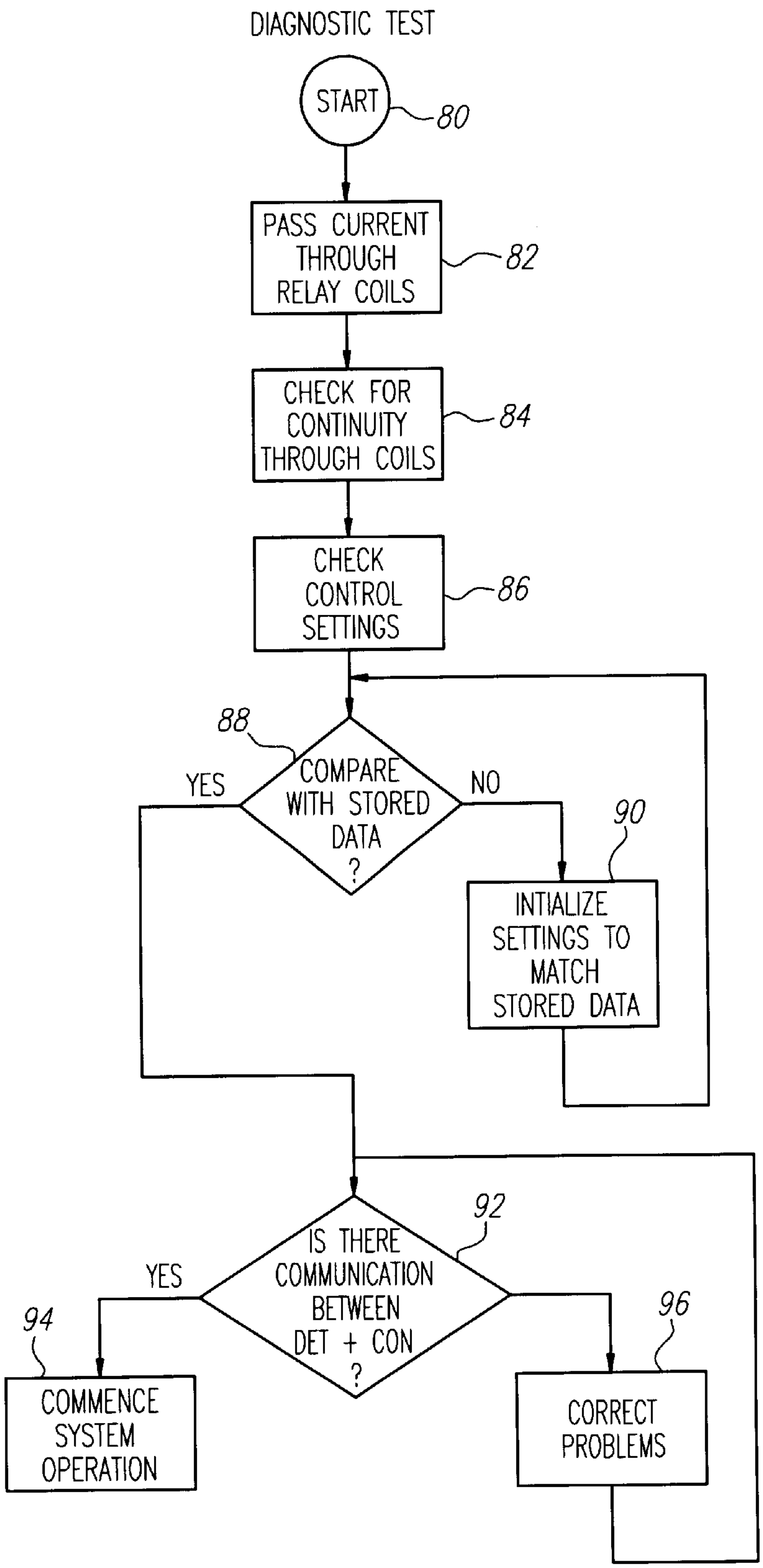
FIG. 22 is a logic flow diagram of processing as may be embodied in the present system, illustrating diagnostic evaluations or tests performed by the system.

The system performs extensive diagnostic evaluations, the logic of which will now be considered with reference to FIG. 22. A start of the diagnostic evaluation operations is indicated by reference numeral 80. To ensure that the “alarm” relays are functioning properly, current is passed through each of the relay coils, as illustrated by a block 82. Continuity of current through the relay coils is determined as illustrated by a block 84.

The diagnostic evaluation proceeds to check the control settings for the various system components. The step is illustrated by a block 86. The control settings are compared against stored data on control settings desired by a user, as indicated by a decision block 88. If the control settings are as desired, the diagnostic evaluation operation proceeds to the next step. If the control settings are not as desired, they are initialized in accordance with the stored data, as indicated by a block 90. The next step in the diagnostic evaluation is a test to determine communication between the detector unit and the controller unit. This step is illustrated by a query block 92. In the event the communications are satisfactory, operation proceeds to a step illustrated by a block 94 that indicates that the system is ready to commence its detection operations. In the event the communications are not satisfactory, steps to correct any existing problems may be taken, as indicated by a block 96. After the communication problems are corrected or solved, operation returns to the query block 92 until communications between the detector and the controller are found to be satisfactory.

Figure 23:
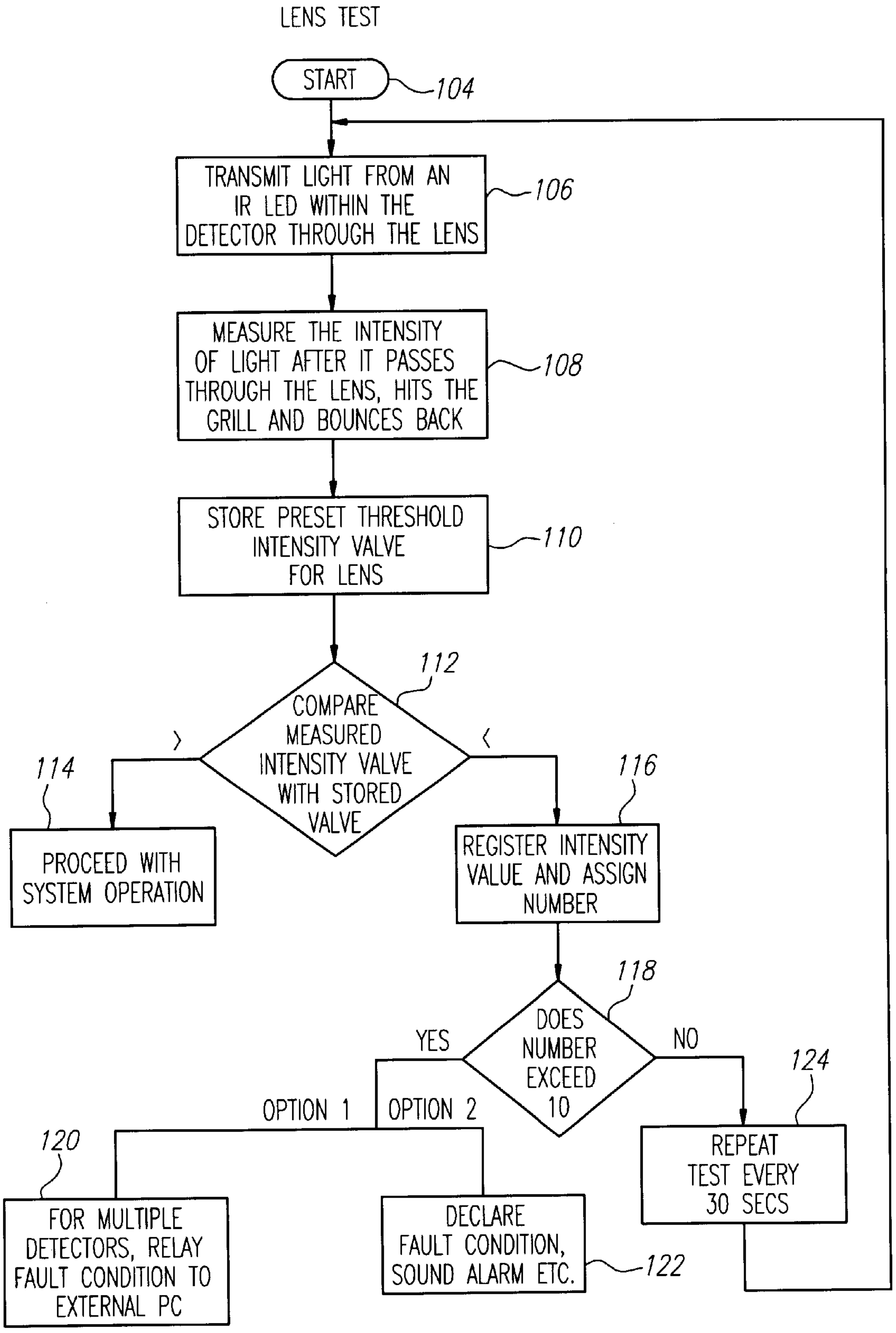
FIG. 23 is a logic flow diagram of processing as may be embodied in the present system, illustrating a lens test performed by the system.

With reference to FIG. 23, a lens test may if desired be performed by the system to ensure its optimum performance, in those embodiments where the housing includes a lens (such as lens 100 shown in FIG. 4) as part of the viewing window 132*b* on the face of the detector 32. Such a lens test, as noted previously, is not ordinarily necessary in embodiments of the invention where no UV sensor is utilized. However, should a lens test be desired, the start of the lens test is indicated at 104 in FIG. 23. Light from an infrared LED or any other infrared source (not shown) is transmitted from within the detector 32 through the lens 100 of the detector 32. This step is illustrated by a block 106. The intensity of light reflected back by the detector grill 102 is measured to determine the transmittance level of the detector lens 100. This step is illustrated by a block 108. Preset threshold intensity values (of transmittance) provided by the lens manufacturer are stored as indicated by a block 110. As illustrated by a decision block 112, the measured intensity values are compared against the stored values to determine if there is any degradation in transmittance characteristics or levels. In the event the measured intensity values are greater than the stored values, the system proceeds to the next step indicated by a block 114. At that point, the overall system operation for detection can commence. In the event the measured intensity values are less than the stored values, indicating degraded transmittance characteristics, operation proceeds to the next step indicated by a block 116.

The measured intensity values are registered in memory and a number is assigned to each registered value. A decision block 118 determines if the number of intensity values registered exceeds the number ten. If the answer is affirmative, the test proceeds to one of two options. Under option one, in the event there are multiple detectors, a fault condition is relayed to an external computer, as illustrated by a block 120. Under option two a fault condition is declared and an alarm is sounded, as illustrated by a block 122. If the answer to decision block 118 is negative, as illustrated by a block 124, the lens test is repeated every thirty seconds.

In addition to the above tests, an additional diagnostic test could also consist of moisture detection to verify the seal integrity of a housing. If a moisture detection test is desired, a moisture detector is preferably located within the housing and provides an output for use by the controller 39 in determining whether the housing seal has been damaged or is leaking.

Figure 24:
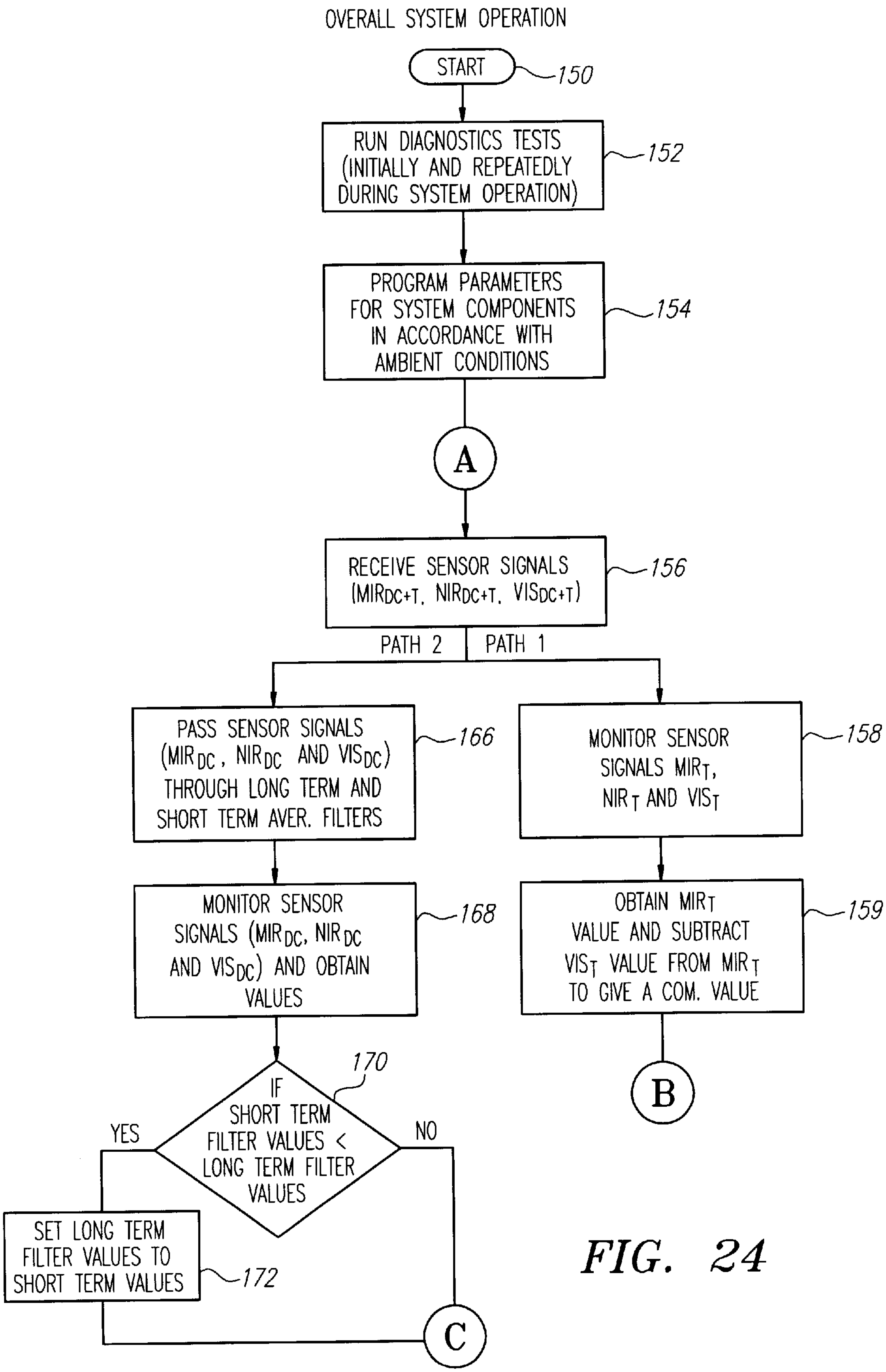
FIG. 24 is a portion of a logic flow diagram of processing as may be embodied in the present system, illustrating a preferred logic flow and sequence of steps performed during overall operation of the system.
Figure 25:
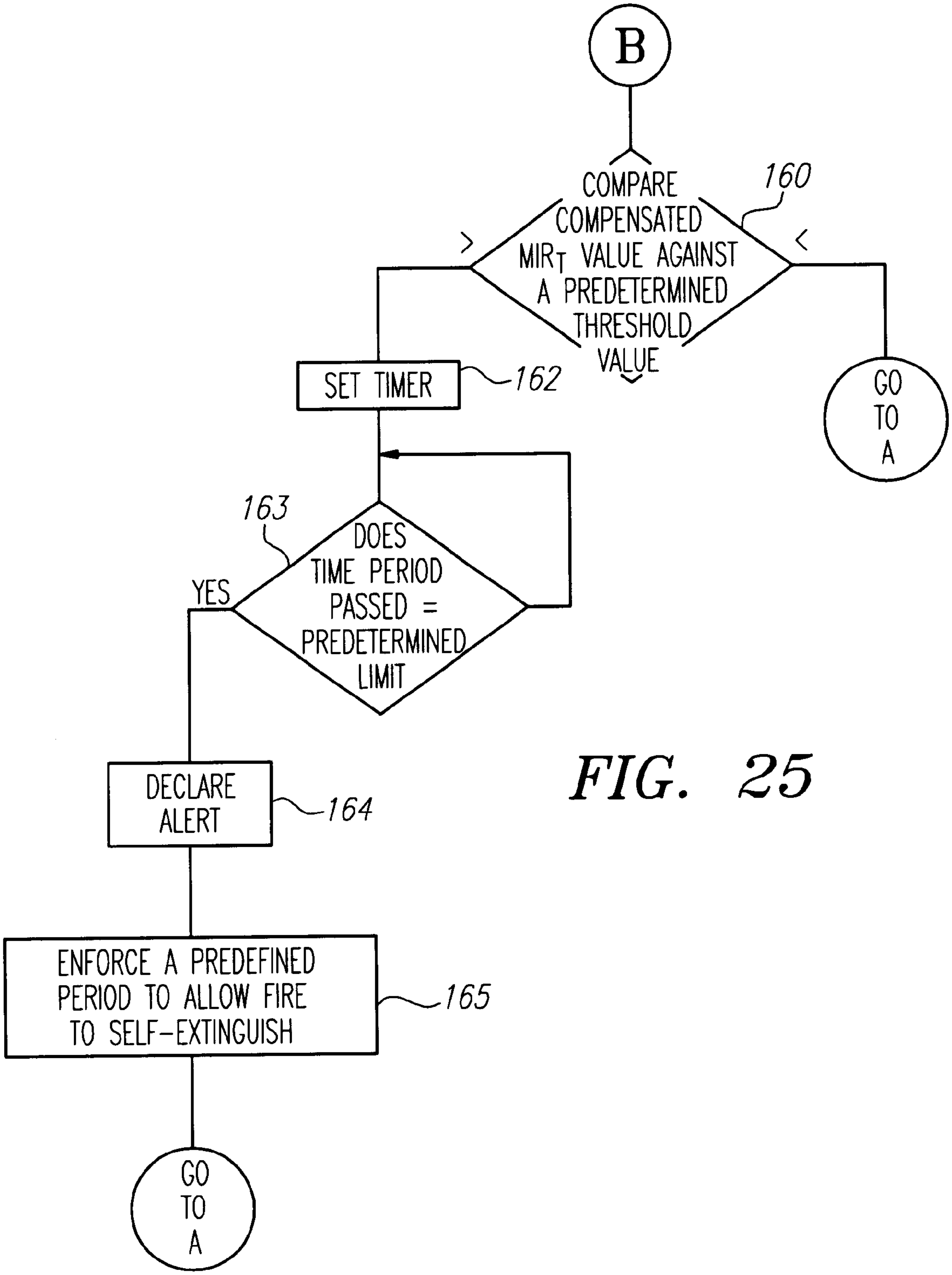
FIG. 25 is a portion of a logic flow diagram of processing as may be embodied in the present system, illustrating a logic flow and continued sequence of steps for detecting an “alert” condition.
Figure 26:
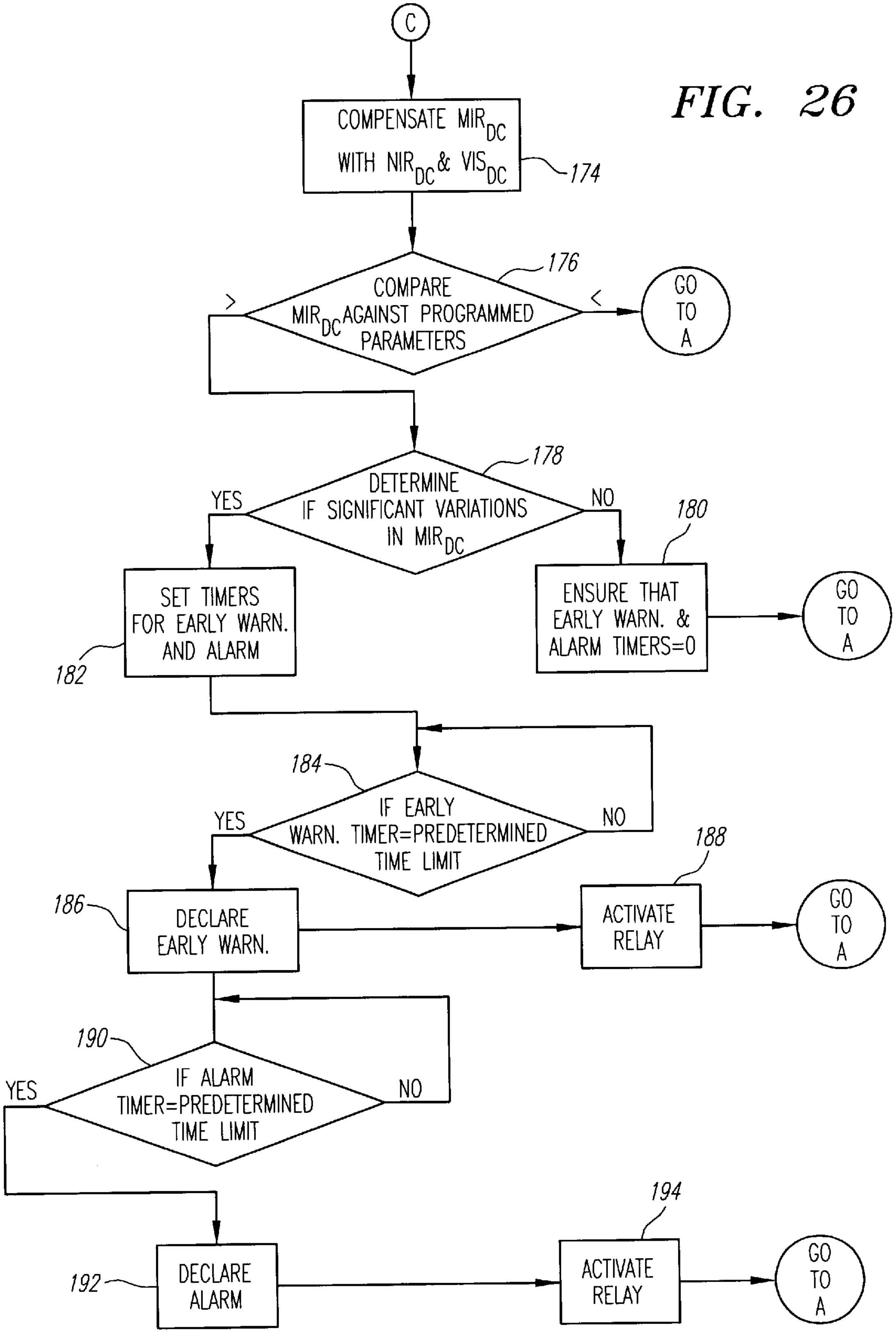
FIG. 26 is a portion of the logic flow diagram of processing as may be embodied in the present system, illustrating a logic flow and continued sequence of steps for detecting a “fire early warning” condition and an “alarm” condition.

With reference to FIGS. 24, 25, and 26, the logic for the overall system operation for detection is described. Once the system is installed at a desired facility, prior to operation of the system the control settings for the various system components are programmed. Referring now to FIG. 24, a start is indicated at a block 150. The system of the present invention runs diagnostic evaluations, such as those described above, at the very outset and repeatedly during system operation to ensure proper functioning of all its system components. This step is illustrated by a block 152. Following the diagnostic evaluations, the parameters for the system components are adjusted in accordance with ambient conditions (e.g., ambient temperature adjustments, ambient light adjustments). A block 154 illustrates this step. Sensor signals from each of the sensors $MIR_{(DC\ and\ T)}$, $NIR_{(DC\ and\ T)}$, and $VIS_{(DC\ and\ T)}$ are received from the sensor array 38, as illustrated by a block 156. At this point operations split into two paths, indicated as a path 1 (for detecting an “alert” condition) and a path 2 (for detecting “fire early warning” and “alarm” conditions).

To determine an “alert” condition, transient sensor signals MIRT, NIRT, and VIST are monitored, as illustrated by a block 158. The MIRT signal value is compensated by subtracting from it the VIST signal value, as illustrated by a block 159.

Referring now to FIG. 25, the compensated MIRT signal value is compared against predetermined threshold values (one or more as desired), as indicated by a decision block 160. If the compensated MIRT signal value exceeds the predetermined threshold value, an “alert” timer is set as indicated by a block 162. In the next step, illustrated by a decision block 163, the system determines if a predetermined time limit has passed. Once the predetermined time limit is passed, an “alert” condition is declared, as illustrated by a block 164. Following that step, another predetermined period of time is enforced or allowed to pass, during which no action is taken, in order to allow the fire to self-extinguish. This step is illustrated by a block 165. After that point, operation loops back to point A, whereby the system again receives sensor signals. Of course, until the predetermined time limit actually expires, operation loops back to the point before decision block 163.

Referring again to FIG. 24, to determine a "fire early warning" condition or an "alarm" condition, sensor signals $MIR_{DC}$, $NIR_{DC}$, and $VIS_{DC}$ are passed through long-term and short-term averaging filters as illustrated by a block 166. These signals are monitored to obtain values as illustrated by a block 168. To eliminate false alarm rejection, in the event the short-term filter output values are less than the long-term filter output values, as illustrated by a decision block 170, the long-term filter output values are jam set (forced) to adopt the short-term filter output values, as illustrated by a block 172.

Referring now to FIG. 26, the sensor signal $MIR_{DC}$ reading is compensated by the sensor signals $NIR_{DC}$ and visible $_{DC}$ readings, as illustrated by a block 174. This step is taken to distinguish a real fire from other sources more likely to emit substantial visible light. Once the $MIR_{DC}$ signal is compensated to eliminate declaring a false alarm, the $MIR_{DC}$ signal value is compared against programmed parameters, as indicated by a decision block 176. In the event the $MIR_{DC}$ signal value is determined to be less than the programmed parameters, operation loops back to point A, beginning the cycle of receiving the sensor signals from the sensor array 38, and so on.

In the event the $MIR_{DC}$ signal value is greater than the programmed parameters, a decision block 178 determines if the variations in the $MIR_{DC}$ signal values are significant. If it is determined that the variations in the $MIR_{DC}$ signal values are not significant, as illustrated by a block 180, the system ensures that the "fire early warning" and "alarm" timers are set to zero. Following that, operation once again loops back to point A.

If it is determined that the variations in $MIR_{DC}$ signal values are significant, the timers for the "fire early warning" and the "alarm" are set to begin counting. This step is illustrated by a block 182. If the "fire early warning" timer indicates that a predetermined time limit has passed, as indicated by a decision block 184, a "fire early warning" condition is declared, as illustrated by a block 186. Once the "fire early warning" condition is declared, the appropriate relay is activated as illustrated by a block 188. At that point, operation may ultimately loop back to point A. Of course, until the predetermined time limit has expired, operation loops back to the point before decision block 184.

Once a "fire early warning" is declared, as illustrated by a decision block 190, the system determines if the "alarm" timer indicates that a predetermined time limit has passed. If not, operation loops back to the point before decision block 190, to ensure that the appropriate time limit has passed. If the "alarm" timer indicates that a predetermined time limit has passed, as indicated by a decision block 190, a "alarm" condition is declared, as illustrated by a block 192. Once the "alarm" condition is declared, the appropriate relay is activated, as illustrated by a block 194. At that point, operation ultimately may loop back to point A.

Figure 27:
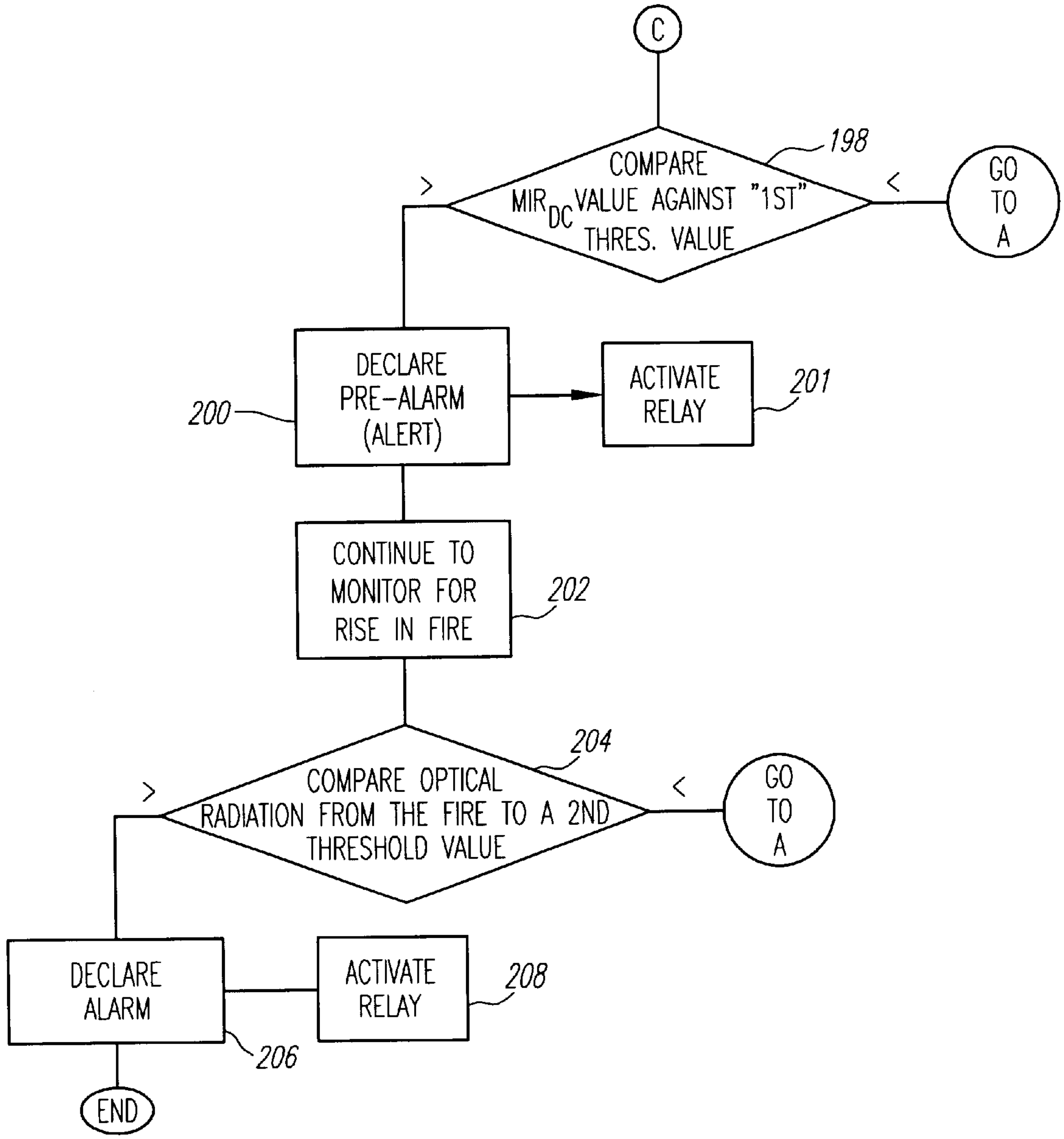
FIG. 27 is a logic flow diagram illustrating operation of a system with a two-stage alarm relay.

Referring now to FIG. 27, starting at point C, operation of the system in accordance with its two-stage alarm embodiment compares the $MIR_{DC}$ signal value against a first predetermined threshold value, as indicated by decision block 198. The first predetermined threshold value corresponds to a "small" fire of a size considered to be a hazard. If the $MIR_{DC}$ signal value is less than the first predetermined threshold value, operation loops back to point A, where the system continues to read signal values. If the $MIR_{DC}$ signal value exceeds the first predetermined threshold value (stored in memory), the system declares a "pre-alarm" (or "alert") condition as indicated by a block 200. Subsequently or immediately, the system activates the appropriate "alert" relay, as indicated by a block 201, enabling personnel at the monitored facility to investigate the fire, and ceases all ambient considerations. The system continues to monitor for a rise in the fire, as indicated by a block 202. This may be done by reading optical radiation amounts emitted by the fire. It should be recognized that other ways of monitoring a rise in fire known to those skilled in the art may alternatively be used. As indicated by decision block 204, the system compares the optical radiation amounts emitted by the fire against a second predetermined threshold amount (stored in memory). If the optical radiation amount emitted by the fire exceeds the second threshold amount, the system declares an "alarm" condition as indicated by a block 206, and activates the appropriate relay and suppression agents, as indicated by a block 208.

It should be recognized that the system could compare readings against more than two energy thresholds. The energy thresholds can be empirically determined by performing fire tests of the sizes and at distance desired by the monitored facility. Also, the specific thresholds used may vary depending on the choice of sensor, amplification of signals, etc. For example, in a clean room environment with chemicals, an alcohol fire having a four-inch diameter viewed at a distance of eight feet has an energy output of 3 kilowatts (kW) and may be predetermined as the first threshold. Similarly, a fire having an eight-inch diameter viewed from a distance of eight feet has an energy output of 13 kW and may be predetermined as the second threshold.

While some embodiments (such as the fire detection system of FIG. 11) have been described with a controller external to the flame detector, it will be appreciated that the functionality of the controller can be located within the flame detector. Having an external controller can be efficient where multiple detectors are deployed in the same locality, so that the multiple detectors can share the same controller and therefore be implemented with reduced cost. In some situations it may be preferable for each fire detector to have its own controller, and to have all of the controller electronics along with the sensor electronics enclosed within a self-contained unit.

Figure 35:
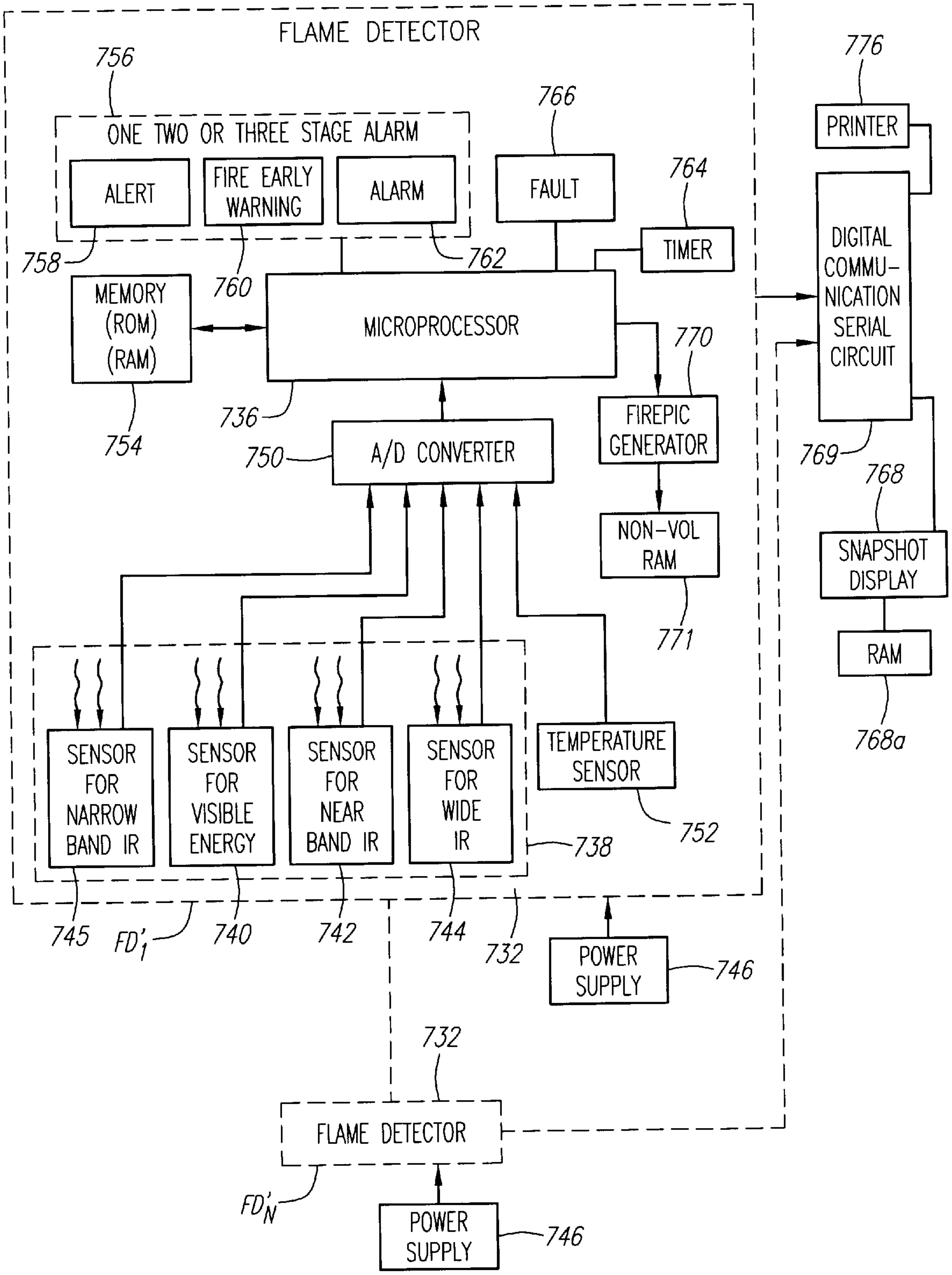
FIG. 35 is a block diagram representation of another embodiment of a flame/fire detection system, wherein a wide band infrared sensor, near band infrared sensor, visible band sensor and narrow band infrared sensor (such as a 4.3 micron sensor) are employed to detect a fire, spark, or flame.

In accordance with an alternative embodiment illustrated in FIG. 35, a narrow band sensor 745, such as, e.g., a 4.3 micron sensor, is employed in connection with a wide band IR sensor or sensor array, to identify fires by detecting a unique narrow band spectral emissions radiated from hot $CO_2$ (carbon dioxide) fumes produced by the fire, thereby providing further verification an existing fire situation.

The embodiment depicted in FIG. 35 is similar in many respects to that depicted in FIG. 11. Where functionality of components in FIG. 35 is similar to that of FIG. 11, the components have been given similar reference numerals, except that in FIG. 35 the components are labeled with series "7xx" reference numerals corresponding to components labeled as "xx" in FIG. 11. Although the functionality of various components in FIG. 35 may generally be the same as the corresponding components in FIG. 11, implementation details may be different to the inclusion in FIG. 11 of a narrow band sensor 745, as described further herein.

The flame detector 732 shown in FIG. 35, similar to the flame detector 32 depicted in FIG. 11, comprises a sensor array 738 including a wideband IR sensor 744, a near band IR sensor 742, and a visible band sensor 740. In addition, the sensor array 738 in FIG. 35 also comprises a narrow band IR sensor 745, preferably a 4.3 micron sensor, which covers the frequency band in which hydrocarbon-based fires tend to produce an energy spike. Narrow band spectral emissions at a wavelength of approximately 4.3 microns are typically radiated from hot $CO_2$ (carbon dioxide) fumes produced by a hydrocarbon-based fire.

Similar to the operation of the flame detector 32 depicted in FIG. 11, in the flame detector shown in FIG. 35 sensor data is continuously converted by the A/D converter 750 to digital data, and the sensor digital data is regularly transmitted to the controller 739. The controller 739 analyzes the sensor digital data and determines if there is any sign of sparks, flames, or fire by, among other things, comparing the radiant energy sensed by the visible band sensor 740 and nearband IR sensor 742 against the radiant energy sensed by the wideband IR sensor 744. The radiant energy sensed by the visible band sensor 740 and nearband IR sensor 742 (i.e., the A/D sampled outputs of the visible band sensor 740 and nearband IR sensor 742) is digitally subtracted from the radiant energy sensed by a wide band IR sensor 744 (i.e., the A/D sampled output of the wideband IR sensor), resulting in a "compensated" measured energy level. The compensated measured energy level is compared against a predetermined threshold level. If the predetermined threshold level is exceeded, then further verification can be accomplished by analyzing the radiant energy sensed by the 4.3 micron sensor 745. If the further verification indicates that a fire or other dangerous heat source may be present, then a possible fire situation is declared. The visible, nearband IR, wideband IR and narrowband IR (i.e., 4.3 micron) sensor outputs are then compared against false alarm profiles to verify that known false alarm sources have not caused the measured energy level to exceed the threshold.

Figure 36:
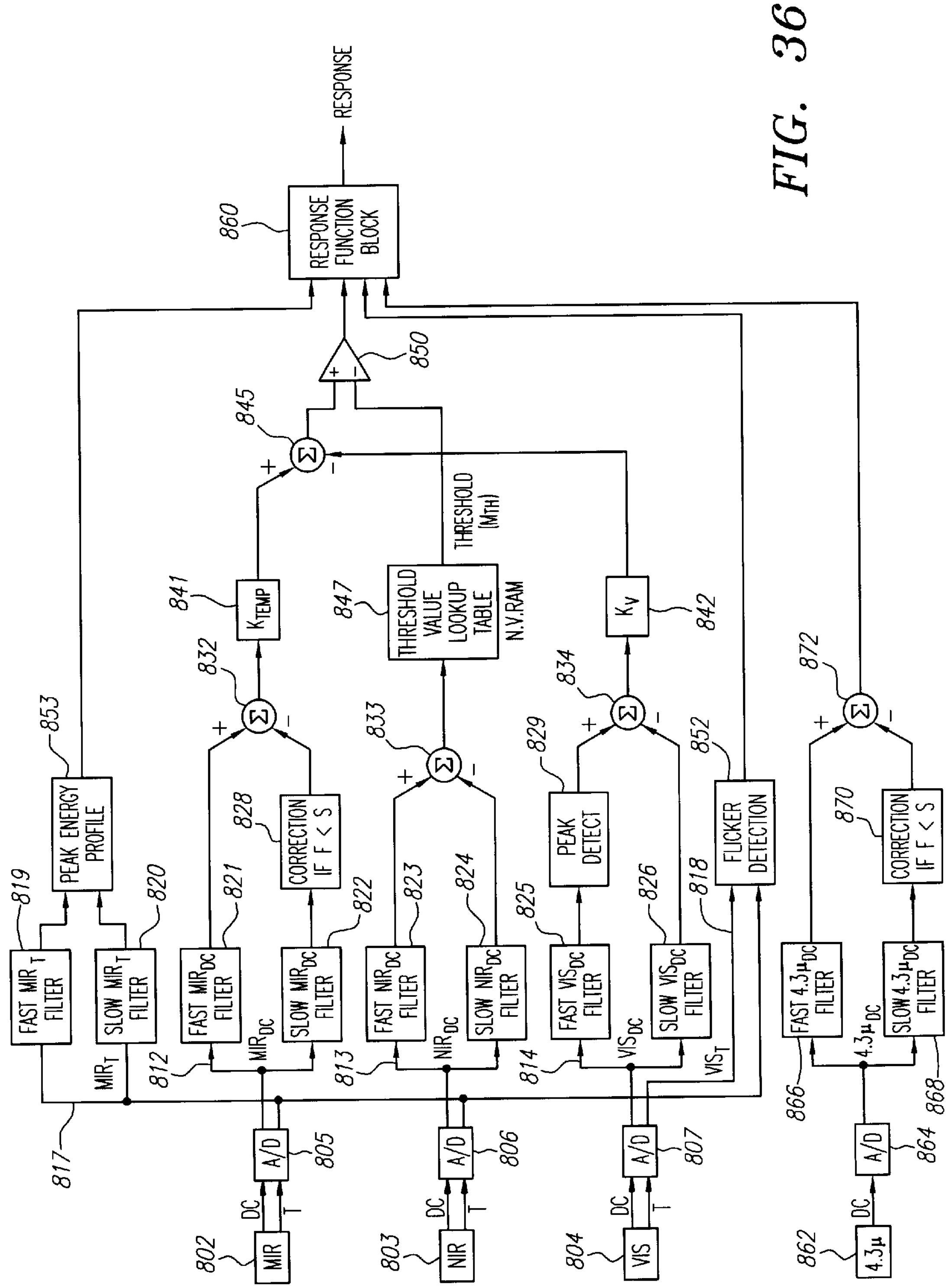
FIG. 36 is a functional diagram illustrating a preferred fire discrimination algorithm used in the embodiment of FIG. 35.

FIG. 36 is a block diagram showing one embodiment in accordance with various principles of the flame detector 732 shown in FIG. 35. FIG. 36 illustrates a wide band IR sensor 802 outputting a wide band IR DC signal and a wide band IR transient signal, a near band IR sensor 803 outputting a near band IR DC signal and a near band IR transient signal, and a visible band sensor 804 outputting a visible band DC signal and a visible band IR signal. Processing of these signals is accomplished in a manner generally similar to that described with respect to FIG. 28 previously herein. Additionally, a DC signal from a narrowband IR sensor 862 (in the example shown in FIG. 36, a 4.3 micron sensor) is sampled and converted into the digital domain by an A/D converter 864. In a preferred embodiment, a single physical A/D converter is shared among all four sensors 802, 803, 804 and 864, but functionally operates the same as what are shown in FIG. 36 as multiple A/D converters 805, 806, 807 and 864 individually connected to the different sensors 802, 803, 804 and 862.

The A/D converter 864 outputs a digitally sampled sensor signal designated as 4.3 $\mu_{DC}$ in FIG. 36, which signal represents the "raw" DC component of the DC signal from the narrowband IR (4.3 micron) sensor 862. The 4.3 $\mu_{DC}$ signal is provided to a "fast" digital filter 866 and to a "slow" digital filter 868. The "fast" digital filter 866 has a relatively fast time constant, and the "slow" digital filter 868 has a relatively slow time constant. The slow digital filter 868 outputs a slow filtered signal that (with adjustment or correction, in some cases) is used as a "baseline" for comparison against a fast filtered signal that is output from the fast digital filter 368. The "fast" digital filter 868 and "slow" digital filter 866 may each comprise a low pass filter, with the low pass filter of the "fast" digital filter having a higher cutoff frequency than that of the "slow" digital filter.

Subtractor 872 operates to generate a comparison signal between the fast filtered signal and the slow filtered signal of the digitized 4.3 $\mu_{DC}$ signal, with adjustments as noted below. At predetermined intervals of time (although it may be done continuously as well), the slow filtered signal of the digitized 4.3 $\mu_{DC}$ signal is subtracted from the fast filtered signal of the digitized 4.3 $\mu_{DC}$ signal to arrive at a difference signal designated in FIG. 36 as $\Delta$4.3 $\mu_{DC}$. In essence, the slow filtered signal represents a steady state or DC baseline for comparison, and the fast filtered signal represents a more rapidly occurring change in the radiant energy detected by the narrowband IR (i.e., 4.3 micron) sensor 862. The difference signal $\Delta$4.3 $\mu_{DC}$ therefore represents the change in radiant energy for the 4.3$\mu$ frequency band with respect to a measured baseline that varies gradually over time.

The output of the slow or fast digital filter may be adjusted prior to being applied to a subtractor 872. In particular, a compensation is made in compensation function block 870 to the output of the slow digital filter 868 of the narrowband IR (i.e., 4.3$\mu$) sensor 862 input. In the compensation function block 870, the output of the slow digital filter 868 is forced to the same value as the output of the fast digital filter 866 if the output of the fast digital filter 866 is less than the output of the slow digital filter 868.

One purpose of compensation function block 872 is to ensure the output of subtractor 870 will always be positive, which will ensure proper monitoring where a fire suddenly loses energy (such as where it is doused with fire suppressant) or else a source of the radiant energy is removed from the view of the 4.3$\mu$ sensor 862. Thus, the fire detector will be able to more easily determine if a temporarily suppressed fire is going to self-extinguish or is starting to regrow, in which case further treatment may be required.

The response function block 860 monitors the output of the subtractor 870 to qualify detection of the dangerous fire situation described above. In particular, a rise in the 4.3 micron difference signal $\Delta$4.3 $\mu_{DC}$ is indicative of the existence of a hydrocarbon fire, whereas stability (i.e., no rise) in the 4.3 micron difference signal $\Delta$4.3 $\mu_{DC}$ is indicative of the absence of a hydrocarbon fire. Based on the rise (or lack thereof) of the 4.3 micron difference signal $\Delta$4.3 $\mu_{DC}$, the detection of a dangerous fire situation may be qualified, such as, e.g., by confirming or denying detection of a dangerous fire situation, or by varying the response to a detected dangerous fire situation.

In a preferred embodiment, the 4.3 micron difference signal $\Delta$4.3 $\mu_{DC}$ is used in the fire detection process in two ways. First, the 4.3 micron difference signal $\Delta$4.3 $\mu_{DC}$ is used as an additional fire confirmation criterion. To do so, the 4.3 micron difference signal $\Delta$4.3 $\mu_{DC}$ is tested against a 4.3 micron difference signal threshold $\Delta$4.3 $\mu_{TH}$, and only if the 4.3 micron difference signal $\Delta$4.3 $\mu_{DC}$ exceeds the threshold signal $\Delta$4.3 $\mu_{TH}$ will a fire be declared.

The second way in which the 4.3 micron difference signal $\Delta$4.3 $\mu_{DC}$ is utilized is to adjust the wideband energy threshold value $M_{TH}$ (described previously herein) and/or any other wideband energy threshold value (such as $M_{TH2}$, also previously described herein). A relatively high value of the 4.3 micron difference signal $\Delta$4.3 $\mu_{DC}$ is indicative of the existence of an actual fire; therefore, the wideband IR threshold value $M_{TH}$ is preferably reduced when the 4.3 micron difference signal $\Delta$4.3 $\mu_{DC}$ is relatively high. Conversely, a relatively low value of the 4.3 micron difference signal $\Delta$4.3 $\mu_{DC}$ is indicative of the lack of an actual fire, particularly a hyrdrocarbon fire, and so no adjustment to the wideband IR threshold value $M_{TH}$ is made.

In implementation, the wideband IR threshold value $M_{TH}$ may be reduced by a preset fraction of the 4.3 micron energy—that is, a preset fraction of the 4.3 micron difference signal $\Delta 4.3\ \mu_{DC}$, according to a formula such as follows:

$$M_{TH}(\text{adjusted})=M_{TH}(\text{base})-K^{*}\Delta 4.3\ \mu_{DC}$$

where K is a constant. In a presently preferred embodiment, K is 0.25, so that 25% of the 4.3 micron energy as indicated by the 4.3 micron difference signal $\Delta 4.3\ \mu_{DC}$ is used as a reduction of the wideband IR threshold value $M_{TH}$.

Preferably, the amount by which the wideband IR threshold value $M_{TH}$ can be reduced is limited, so that the fire detector does not false alarm in the absence of an actual fire source or similar dangerous circumstance. For example, in a presently preferred embodiment, the amount which the wideband IR threshold value $M_{TH}$ can be reduced is to one-half of its original (i.e., base) value.

In a preferred embodiment, operation of the narrow band (i.e., 4.3 micron) sensor 745 can be enabled or disabled through a selectable parameter (which may be one of a group of selectable parameters) that may be set manually, or else re-programmed remotely or otherwise. The 4.3 micron sensor may be enabled for fire detection applications in which it desired to require confirmation of a fire by the existence of a 4.3 micron energy spike, while it may be disabled for fire detection applications in which no confirmation of a fire is desired using the existence or non-existence of a 4.3 micron energy spike.

In a preferred embodiment, the 4.3 micron sensor and other sensors are placed in a sensor array such as described with respect to FIG. 6 earlier herein, or else as described in U.S. Provisional Application Ser. No. 60/151,191 (attorney docket 244/004) entitled "Fire Detector With Protected Sensors" filed concurrently herewith, and hereby incorporated by reference as if set forth fully herein.

Certain alternative embodiments involve use of different types of sensors for the primary wide band IR (WBIR) sensor. In a preferred embodiment, the WBIR sensor is manufactured from lead sulfide (PbS), which has a high sensitivity to wide band IR over the necessary operational temperature ranges, in addition to having relatively low cost, proven reliability, and ready availability. Other sensors can also be used to sense wide band IR in certain fire detection applications.

There are two main classes of practical sensors that can be used for wide band IR fire detection. The first class includes photon detectors, which have time constants typically in the microsecond range, and the second class includes thermal detectors, which have time constants typically in the millisecond range.

Photon detectors may include any of a number of quantum photodetectors such as photoconductive (or photoresistive) detectors or photovoltaic detectors. A photoconductive (or photoresistive) sensor is one in which a change in the number of incident photons causes a fluctuation in the number of free charge carriers in the semiconductor material. The electrical conductivity of the responsive element is inversely proportional the number of photons. This change is conductivity is monitored and amplified electrically. A photovoltaic sensor is one in which a change in the number of photons incident on a p-n junction causes fluctuations in the voltage generated by the junction. This change in voltage is monitored and amplified electrically.

Photon detectors include sensors made from material(s) in the lead salt family such as lead sulfide (PbS), lead telluride (PbTe), lead selenide (PbSe), lead tin telluride (PbSnTe), the doped germanium family (Ge:AuSb, Ge:Cu, Ge:Hg, Ge:Cd, Ge:Zn, Ge—Si:Zn, Ge—Si:Au, etc.), indium antimonide (InSb), indium arsenide (InAs), telluride (Te), mercury cadium telluride (HgCdTe), and other such materials.

Thermal detectors and sensors that can be used for wide band IR sensing include both pyroelectric sensor types and thermopile sensor types. Pyroelectric sensor types include such sensors as deuterated triglycine sulfate (DTGS or TGS), lithium tantalate ($LiTAO_3$), barium titanate ($BaTiO_3$), and the like. Pyroelectric sensors are thermal sensors and use a crystal which develops a charge on opposite crystal faces (similar to a capacitor) when incident radiation causes the crystal temperature to change. Thermopile sensor types are those in which thermovoltaic and generate a voltage when thermal radiation strikes their surface. Usually thermopile sensors are manufactured as a small matrix array. The way they operate is by sensing an output voltage across a junction of dissimilar metals. When the temperature of the junction fluctuates because of changes in the level of incident radiation, the output voltage generated by the junction will fluctuate. This voltage is monitored and amplified electrically.

For any of the above wide band IR sensors, to set the wavelength cutoffs for the desired wide band IR spectral range, appropriate interference type or absorption type filters, or a combination thereof, may be used.

Further information of interest may be found in U.S. Pat. No. 6,064,064, U.S. Pat. No. 6,057,549, U.S. Pat. No. 6,078,050, U.S. patent application Ser. No. 08/866,023, filed on May 30, 1997, each of which is hereby incorporated by reference as if set forth fully herein.

While the present invention has been described in conjunction with specific embodiments thereof, many alternatives, modifications, and variations will be apparent to those skilled in the art in view of the foregoing description. Accordingly, the invention is intended to embrace all such alternatives, modifications, and variations that fall within the spirit and scope of any appended claims.

What is claimed is:

1. A fire detector, comprising:

a wide band infrared sensor;

a narrow band infrared sensor;

first means for detecting when a level of wide band infrared radiant energy detected by the wide band infrared sensor exceeds a wide band infrared energy level threshold, said first means comprising a first filter coupled to the wide band infrared sensor for measuring the level of wide band infrared radiant energy and a first comparator connected to an output of said first filter and to said wide band infrared energy level threshold;

second means for detecting when a level of narrow band infrared radiant energy detected by the narrow band infrared sensor exceeds a narrow band infrared energy level threshold, said second means comprising a second filter coupled to the narrow band infrared sensor for measuring the level of narrow band infrared radiant energy and a second comparator connected to an output of said second filter and to said narrow band infrared energy level threshold; and means responsive to said first and second means for initiating a fire response protocol.

2. The fire detector of claim 1, wherein said means for detecting when a level of wide band infrared radiant energy detected by the wide band infrared sensor exceeds an energy level threshold further comprises a visible band sensor connected to a third filter for measuring a level of visible band radiant energy, and a subtractor whereby said level of visible band radiant energy is subtracted from the output of said first filter.

3. The fire detector of claim 1, further comprising a near band infrared sensor, wherein said energy level threshold is set as a function of a level of energy detected by the near band infrared sensor.

4. The fire detector of claim 1, wherein said narrow band infrared sensor senses radiant energy having a 4.3 micron wavelength.

5. A method of detecting a spark, flame, or fire, comprising the steps of:

sensing wide band infrared energy and narrow band infrared energy;

detecting a spark, flame, or fire based upon the sensed wide band infrared energy;

qualifying the detection of the spark, flame, or fire based on the sensed narrow band infrared energy; and sensing near band infrared energy and visible band energy and eliminating false alarm sources based upon the detected near band infrared energy and the visible band energy.

6. The method of claim 5, wherein the detection of the spark, flame or fire is qualified by either confirming or denying detection of the spark, flame, or fire.

7. The method of claim 5, wherein the detection of the spark, flame or fire is qualified by varying a response to the detection of the spark, flame or fire.

8. The method of claim 5, wherein the narrow band infrared energy sensed is 4.3 microns.

9. A fire detector, comprising:

a fire detector housing;

a sensor array disposed within said fire detector housing, said sensor array including a sensor for visible energy, a sensor for near band infrared energy, a sensor for wideband infrared energy, and a sensor for 4.3 micron narrowband infrared energy, said sensor array outputting a plurality of sensor signals;

a controller coupled to said sensor array for receiving said sensor signals from said sensor array and analyzing spectral data from said sensor signals to detect a fire condition; and a multi-stage alarm system coupled to said controller, said controller selectively activating a one of a plurality of response stages in response to said fire condition.

10. The fire detector of claim 9, wherein said sensor array further comprises an ultra-violet (UV) sensor.

11. The fire detector of claim 9, wherein said controller comprises a microprocessor.

12. The fire detector of claim 9, wherein said fire detector housing comprises a fire detector housing base for secure attachment to a fixed surface and a fire detector housing lid adapted to securely attach to said fire detector housing base, and wherein said sensor array and said controller are contained within a self-enclosed removable electro-optics module adapted to conform in size and shape to a cavity defined by an inner surface of said fire detector housing lid.

13. A method for fire detection, comprising the steps of:

detecting wideband infrared energy using a wideband infrared energy sensor, and outputting a first sensor signal thereby;

detecting visible energy using a visible energy sensor, and outputting a second sensor signal thereby;

detecting near band infrared energy using a near band infrared energy sensor, and outputting a third sensor signal thereby;

detecting 4.3 micron narrowband energy using a 4.3 micron narrowband energy detector, and outputting a fourth sensor signal thereby;

receiving said first, second, third and fourth sensor signals and analyzing data from said sensor signals to detect a fire condition; and selecting one of a plurality of fire response actions in response to said fire condition.

14. The method of claim 13, further comprising the step of detecting ultra-violet light using an ultra-violet light sensor.

15. The method of claim 13, further comprising the step of encapsulating said wideband infrared sensor, said visible sensor, said near band infrared sensor and said 4.3 micron narrowband sensor in a self-enclosed and sealed electro-optics module.

16. The method of claim 15, further comprising the step of disposing said self-enclosed and sealed electro-optics module in a cavity defined by an inner wall of a fire detector housing lid, and securely affixing said fire detector housing lid to a fire detector housing base so as to completely seal said electro-optics module within.

17. A fire detection apparatus, comprising:

a wide band infrared sensor;

a near band infrared sensor;

a visible band sensor;

a narrow band infrared sensor; and a controller receiving processed output signals from said wide band infrared sensor and said narrow band infrared sensor, said controller configured to detect a spark, flame, or fire based upon the sensed wide band infrared energy, to qualify the detection of the spark, flame, or fire based on the sensed narrow band infrared energy, and to eliminate false alarm sources based upon detected near band infrared energy from said near band infrared sensor and detected visible band energy from said visible band sensor.

18. The apparatus of claim 17, wherein the detection of the spark, flame or fire is qualified by either confirming or denying detection of the spark, flame, or fire.

19. The apparatus of claim 17, wherein the detection of the spark, flame or fire is qualified by varying a response to the detection of the spark, flame or fire.

20. The apparatus of claim 17, wherein the narrow band infrared sensor senses radiant energy substantially in the range of 4.3 microns.

* * * * *